US012806862B2

(12) United States Patent
Buller et al.

(10) Patent No.: US 12,806,862 B2
(45) Date of Patent: Nov. 24, 2026

(54) CONTROL SYSTEMS FOR THREE-DIMENSIONAL PRINTING

(71) Applicant: Velo3D, Inc., Campbell, CA (US)

(72) Inventors: Benyamin Buller, Cupertino, CA (US); Erel Milshtein, Cupertino, CA (US)

(73) Assignee: Velo3D, Inc., Campbell, CA (US)

( * ) Notice: Subject to any disclaimer, the term of this patent is extended or adjusted under 35 U.S.C. 154(b) by 269 days.

(21) Appl. No.: 18/225,184

(22) Filed: Jul. 24, 2023

(65) Prior Publication Data

US 2024/0051231 A1 Feb. 15, 2024

Related U.S. Application Data

(63) Continuation of application No. 18/122,199, filed on Mar. 16, 2023, now abandoned, which is a (Continued)

(51) Int. Cl.

| | |
|---|---|
| ***B29C 64/393*** | (2017.01) |
| ***B22F 10/36*** | (2021.01) |
| ***B22F 10/38*** | (2021.01) |
| ***B22F 10/66*** | (2021.01) |
| ***B22F 10/85*** | (2021.01) |
| ***B22F 12/41*** | (2021.01) |
| ***B22F 12/44*** | (2021.01) |

(Continued)

(52) U.S. Cl.

CPC ............ *B29C 64/393* (2017.08); *B22F 10/36* (2021.01); *B22F 10/38* (2021.01); *B22F 10/66* (2021.01); *B22F 10/85* (2021.01); *B22F 12/90* (2021.01); *B23K 26/032* (2013.01); *B23K 26/0876* (2013.01); *B23K 26/342* (2015.10); *B23K 26/36* (2013.01); *B29C 64/153* (2017.08); *B29C 64/268* (2017.08); *B33Y 30/00* (2014.12); *B33Y 40/00* (2014.12); *B33Y 40/20* (2020.01); *B33Y 50/02* (2014.12); *G01B 11/30* (2013.01); *B22F 10/28* (2021.01); *B22F 12/41* (2021.01); *B22F 12/44* (2021.01); *B22F 12/45* (2021.01); *B22F 2202/11* (2013.01); *B22F 2999/00* (2013.01); *B33Y 50/00* (2014.12); *Y02P 10/25* (2015.11)

(58) Field of Classification Search

CPC ... B29C 64/153; B29C 64/268; B29C 64/393; B22F 12/41; B22F 12/44; B22F 12/45; B22F 2202/11; B22F 12/90

See application file for complete search history.

(56) References Cited

U.S. PATENT DOCUMENTS 5,601,737 A * 2/1997 Asahi .................... B08B 7/0042 219/121.84

7,713,454 B2 * 5/2010 Larsson ................ B29C 64/153 425/162

(Continued)

*Primary Examiner* — Seyed Masoud Malekzadeh

(74) *Attorney, Agent, or Firm* — Bryan L. Baysinger; Nicholas P. Stadnyk; Maynard Nexsen PC

(57) ABSTRACT

Provided herein are systems, apparatuses and methods for monitoring a three-dimensional printing process. The three-dimensional printing process can be monitored in-situ and/or in real time. Monitoring of the three-dimensional printing process can be non-invasive. A computer control system can be coupled to one or more detectors and signal processing units to adjust the generation of a three-dimensional object that is formed by the three-dimensional printing.

18 Claims, 25 Drawing Sheets

Related U.S. Application Data continuation of application No. 17/994,082, filed on Nov. 25, 2022, now abandoned, which is a continuation of application No. 17/876,757, filed on Jul. 29, 2022, now abandoned, which is a continuation of application No. 17/725,915, filed on Apr. 21, 2022, now abandoned, which is a continuation of application No. 17/570,736, filed on Jan. 7, 2022, now abandoned, which is a continuation of application No. 17/484,411, filed on Sep. 24, 2021, now abandoned, which is a continuation of application No. 17/346,438, filed on Jun. 14, 2021, now abandoned, which is a continuation of application No. 17/189,565, filed on Mar. 2, 2021, now abandoned, which is a continuation of application No. 17/090,206, filed on Nov. 5, 2020, now abandoned, which is a continuation of application No. 16/939,847, filed on Jul. 27, 2020, now abandoned, which is a continuation of application No. 15/615,029, filed as application No. PCT/US2015/065297 on Dec. 11, 2015, now abandoned.

(60) Provisional application No. 62/091,438, filed on Dec. 12, 2014.

(51) Int. Cl.

| | |
|---|---|
| ***B22F 12/90*** | (2021.01) |
| ***B23K 26/03*** | (2006.01) |
| ***B23K 26/08*** | (2014.01) |
| ***B23K 26/342*** | (2014.01) |
| ***B23K 26/36*** | (2014.01) |
| ***B29C 64/153*** | (2017.01) |
| ***B29C 64/268*** | (2017.01) |
| ***B33Y 30/00*** | (2015.01) |
| ***B33Y 40/00*** | (2020.01) |
| ***B33Y 40/20*** | (2020.01) |
| ***B33Y 50/02*** | (2015.01) |
| ***G01B 11/30*** | (2006.01) |
| *B22F 10/28* | (2021.01) |
| *B22F 12/45* | (2021.01) |
| *B33Y 50/00* | (2015.01) |

(56) References Cited

U.S. PATENT DOCUMENTS

| | | | | |
|---|---|---|---|---|
| 7,850,885 B2 * | 12/2010 | Philippi | B29C 64/214 | 427/202 |
| 8,062,020 B2 * | 11/2011 | Abe | B22F 10/28 | 425/375 |
| 8,137,739 B2 * | 3/2012 | Philippi | B33Y 30/00 | 427/595 |
| 8,488,994 B2 * | 7/2013 | Hanson | B33Y 10/00 | 399/130 |
| 8,562,897 B2 * | 10/2013 | Abe | B22F 10/28 | 425/375 |
| 8,753,105 B2 * | 6/2014 | Scott | B33Y 40/00 | 264/510 |
| 9,757,760 B2 * | 9/2017 | Halder | B29C 64/153 | |
| 9,919,476 B2 * | 3/2018 | Paternoster | B29C 64/153 | |
| 10,035,188 B2 * | 7/2018 | Weilhammer | B29C 64/386 | |
| 2002/0104973 A1 * | 8/2002 | Kerekes | B22F 10/22 | 250/559.2 |
| 2004/0191106 A1 * | 9/2004 | O'Neill | B22F 10/80 | 419/2 |
| 2006/0192322 A1 * | 8/2006 | Abe | B29C 64/153 | 264/497 |
| 2006/0211158 A1 * | 9/2006 | Arai | B23K 26/03 | 257/E21.252 |
| 2007/0196561 A1 * | 8/2007 | Philippi | B29C 64/153 | 118/712 |
| 2009/0185178 A1 * | 7/2009 | Miyoshi | G01N 21/9501 | 356/237.5 |
| 2012/0100031 A1 * | 4/2012 | Ljungblad | B22F 12/50 | 425/78 |
| 2012/0139166 A1 * | 6/2012 | Abe | B22F 10/28 | 264/497 |
| 2013/0168902 A1 * | 7/2013 | Herzog | B22F 10/00 | 264/401 |
| 2013/0186558 A1 * | 7/2013 | Comb | B29C 64/147 | 156/277 |
| 2013/0272746 A1 * | 10/2013 | Hanson | G03G 15/224 | 399/130 |
| 2014/0361464 A1 * | 12/2014 | Holcomb | B22F 1/00 | 219/635 |
| 2015/0034606 A1 * | 2/2015 | Blackmore | B23K 15/02 | 219/76.14 |
| 2015/0037599 A1 * | 2/2015 | Blackmore | B33Y 50/02 | 428/548 |
| 2015/0088295 A1 * | 3/2015 | Hellestam | B28B 17/0081 | 700/118 |
| 2015/0273917 A1 * | 10/2015 | Donaldson | B33Y 50/02 | 347/19 |
| 2016/0114431 A1 * | 4/2016 | Cheverton | B22F 10/31 | 219/76.1 |
| 2016/0193696 A1 * | 7/2016 | Mcfarland | B22F 1/052 | 219/76.12 |
| 2016/0236279 A1 * | 8/2016 | Ashton | B29C 64/153 | |
| 2016/0279706 A1 * | 9/2016 | Domrose | B22F 10/28 | |
| 2016/0303687 A1 * | 10/2016 | Ljungblad | B22F 12/41 | |
| 2017/0259337 A1 * | 9/2017 | Furukawa | B29C 64/371 | |
| 2017/0259504 A1 * | 9/2017 | Lin | B33Y 30/00 | |
| 2017/0266878 A1 * | 9/2017 | Furukawa | B22F 3/105 | |
| 2017/0297110 A1 * | 10/2017 | Echigo | B29C 64/214 | |
| 2017/0304894 A1 * | 10/2017 | Buller | B22F 12/45 | |
| 2018/0178286 A1 * | 6/2018 | Martin | B22F 10/28 | |

* cited by examiner

CONTROL SYSTEMS FOR THREE-DIMENSIONAL PRINTING

CROSS-REFERENCE

This application is a continuation of U.S. patent application Ser. No. 18/122,199 filed Mar. 16, 2023, which is a continuation of U.S. patent application Ser. No. 17/994,082 filed Nov. 25, 2022, which is a continuation of U.S. patent application Ser. No. 17/876,757 filed Jul. 29, 2022, which is a continuation of U.S. patent application Ser. No. 17/725,915 filed Apr. 21, 2022, which is a continuation of U.S. patent application Ser. No. 17/570,736 filed Jan. 7, 2022, which is a continuation of U.S. patent application Ser. No. 17/484,411 filed Sep. 24, 2021, which is a continuation of U.S. patent application Ser. No. 17/346,438 filed Jun. 14, 2021, which is a continuation of U.S. patent application Ser. No. 17/189,565 filed Mar. 2, 2021, which is a continuation of U.S. patent application Ser. No. 17/090,206 filed Nov. 5, 2020, which is a continuation of U.S. patent application Ser. No. 16/939,847 filed Jul. 27, 2020, which is a continuation of U.S. patent application Ser. No. 15/615,029 filed Jun. 6, 2017, which claims priority to PCT Patent Application PCT/US15/65297, filed Dec. 11, 2015, which claims priority to U.S. Patent Application Ser. No. 62/091,438, filed on Dec. 12, 2014, each of which is entirely incorporated herein by reference.

BACKGROUND

Three-dimensional (3D) printing (e.g., additive manufacturing) is a process for making a three-dimensional (3D) object of any shape from a design. The design may be in the form of a data source such as an electronic data source, or may be in the form of a hard copy. The hard copy may be a two dimensional representation of a 3D object. The data source may be an electronic 3D model. 3D printing may be accomplished through an additive process in which successive layers of material are laid down one on top of each other. This process may be controlled (e.g., computer controlled and/or manually controlled). A 3D printer can be an industrial robot.

3D printing can generate custom parts quickly and efficiently. A variety of materials can be used in a 3D printing process including elemental metal, metal alloy, ceramic, elemental carbon, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

A large number of additive processes are currently available. They may differ in the manner layers are deposited to create the materialized structure. They may vary in the material or materials that are used to generate the designed structure. Some methods melt or soften material to produce the layers. Examples for 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

The 3D printing process may be controlled (e.g., monitored and/or directed) by a controller. In some instances, one or more apparatuses within the 3D printing system may be controlled by a controller. The control may benefit from various inputs related to the process of the 3D printing (e.g., real-time input signals) which may consequently result in a better outcome of the 3D printing process. The better outcome may comprise better precision and/or overall quality of the printed 3D object. The better outcome may comprise better adherence to desirable material properties. Better outcome may comprise a lower degree of failure during the 3D printing process. The control may include in-situ visualization of the printed 3D object (e.g., in real time). The control may include monitoring (e.g., in situ and/or in real-time) of debris (e.g., debris type and/or levels) in various positions within the chamber in which the 3D object is being printed (e.g., an optical window of the chamber, or an atmosphere of the chamber). The control may relate to the energy (e.g., temperature) at various positions of the chamber. The control may relate to the energy and/or material profile of the 3D object. The energy may be heat energy. The control may relate to a metrology (e.g., distance measurement) relative to various positions of the chamber. The various positions of the chamber may include the material bed and/or the exposed surface of the material bed. The control may relate to relative distances of objects within the enclosure. The control may relate to the roughness (or flatness) of a surface. The surface may be an exposed surface of the material bed and/or a surface of the 3D object.

SUMMARY

Although there are three-dimensional printing systems presently available, recognized herein are various issues with such systems. At least some or even most of such systems are not capable of additively printing 3D objects in a manner that reduces or minimizes the number of operations. This can lead to substantial inefficiencies during printing, which can lead to wasted material, energy and/or longer processing times. The 3D printing process disclosed herein may be automatically and/or remotely controlled. The control can include computer control. The control may include receiving input from one or more sensors. The control may comprise detection and/or monitor systems. The 3D printing process may comprise quality control of the printed 3D object. The 3D printing process disclosed herein may include optimizing the number of operation, time of each operation, amount of energy required for each operation, and/or amount of material used in each operation. The present disclosure provides control systems that can enable the efficient formation of 3D objects. Such control systems can provide feedback control for optimizing the formation of a 3D object. This can provide for the formation of 3D objects with reduced or minimized material loss and shorter processing times. Control systems provided herein can also enable the formation of 3D objects at high accuracy.

In an aspect, a method for printing at least one three-dimensional object comprises: (a) forming a material bed disposed adjacent to a platform, wherein the material bed contacts the platform, wherein the platform includes at least one device comprising (i) a first sensor, wherein the first sensor is neither a weight sensor nor a thermocouple or (ii) an energy source that provides a directional energy beam; (b) forming the three-dimensional object from at least a portion of the material bed under at least one formation parameter; (c) detecting an output signal from a second sensor that is in sensing communication with the material bed or the three-dimensional object; and (c) evaluating the formation parameter in (c) based on the output signal.

The first sensor and second sensor may be the same sensor. The first sensor and the second sensor may be different sensors. The method may further comprise adjusting the formation parameter in (b) based on the evaluating to provide an adjustment formation parameter, and repeating (b) using the adjustment formation parameter. The platform may support the material bed. The step (b) may comprise transforming a powder material in the material bed by using a transforming energy beam to form the three dimensional object. The forming in step (b) may comprise transforming a powder material by using the transforming energy beam. The transforming may comprise fusing. The fusing may comprise melting or sintering. Forming may comprise transforming a powder material in the material bed by using the transforming energy beam to form a transformed material that hardens into at least a portion of the three dimensional object. The method may further comprise subsequent to step (d), adjusting at least one characteristic of the transforming energy beam (e.g., as disclosed herein). The at least one characteristic can comprise (i) a power delivered by the transforming energy beam, (ii) a footprint of the transforming energy beam on an exposed surface of the material bed, (iii) a focus parameter of the transforming energy beam, (iv) a pulsing sequence of the transforming energy beam, (v) a rate of movement of the transforming energy beam along the path, or (vi) a rate of formation of the at least a portion of the three-dimensional object.

In another aspect, a system for printing one or more three-dimensional objects (e.g., a three-dimensional object) comprises: (a) a platform that accepts a material bed, wherein at least a portion of the material bed is used to form at least a portion of a three-dimensional object, wherein the material bed contacts the platform; (b) a generating device that generates a signal, which generating device comprises (i) a first sensor that senses one or more input signals and generates a first output signal, wherein the first sensor is neither a weight sensor nor a thermocouple, or (ii) an energy source that provides a directional energy beam, wherein at least one of the first sensor and the energy source are embedded in the platform; (c) a forming device (or a mechanism) used to generate the three-dimensional object under at least one formation parameter using three-dimensional printing, wherein the forming device is disposed adjacent to the material bed; (d) a second sensor that generates an output signal, which second sensor is disposed adjacent to the material bed; and (e) a controller comprising a processing unit that is programed to: (i) process the output signal to generate a result indicative of the formation parameter; and (ii) direct the forming device to alter at least one function of the forming device based on the result.

The first sensor and second sensor may be the same sensor. The first sensor and the second sensor may be different sensors. The first sensor may be embedded in the platform. The energy source can be embedded in the platform. The first sensor may not be embedded in the platform. The energy source may not be embedded in the platform. In some instances, both the first sensor and the energy source may be embedded in the platform. Sometimes, the output signal may be generated during the three-dimensional printing. The first sensor may be stationary. The first sensor may be moveable. The first sensor can be coupled to a scanner that translates the sensor. The first sensor may be part of a multiplicity (or plurality) of sensors. The multiplicity of sensors may comprise a sensor array or a sensor matrix. The controller may be further operatively coupled to the sensor. The three-dimensional printing may comprise additive manufacturing. The three-dimensional printing may comprise selective laser melting or selective laser sintering. "Contacts the platform" may comprise directly contacts the platform. The material bed directly may contact at least a portion of a surface of the platform. The first sensor can be selected from the group consisting of a sound wave sensor, electromagnetic beam sensor, and magnetic field sensor. The energy source may comprise an electromagnetic beam generator, a sound wave generator, or a magnetic field generator. The electromagnetic beam can be a collimated beam. The electromagnetic beam can be a laser beam. The electromagnetic beam can be an X-ray beam. The electromagnetic beam can be an infrared beam. The sound wave can be an ultrasound wave. The sound wave can be a radio wave. The sound wave can be non-audible sound by an average human. The electromagnetic beam can be non-visible by an average human. The first sensor and the energy source can be a transceiver. The energy beam can be sensed by the first sensor. An alteration of the energy beam may be sensed by the first sensor. The first sensor may sense an input signal that comprises an alteration of the energy beam, and subsequently may generates the output signal. The first sensor can comprise a spectrum analyzer. The platform can comprise a surface that directly contacts the material bed, wherein the surface is non-planar. The platform can comprise a surface that directly contacts the material bed, and wherein the surface is planar. The forming device may comprise an energy source. The mechanism may comprise a layer dispensing mechanism or any component thereof (e.g., material dispensing mechanism, material removal mechanism, leveling mechanism, or any combination thereof).

In another aspect, an apparatus for printing one or more three-dimensional objects (e.g., a three-dimensional object) comprises a controller that is programmed to: (a) direct a processing unit to process an output signal received from a sensor and generate a result indicative of a formation parameter during formation of the three-dimensional object, wherein the sensor senses an input signal during formation of the one three-dimensional object by a three-dimensional printing methodology, wherein the sensor is neither a weight sensor nor a thermocouple, wherein the controller is operatively coupled to the sensor, and to the processing unit; and (b) direct a mechanism used in a three-dimensional printing methodology to alter a function of the mechanism based on the result, wherein the controller is operatively coupled to the mechanism, wherein the three-dimensional is printed adjacent to a platform, wherein the platform comprises the sensor.

The mechanism can comprise an energy source, a material dispensing mechanism, or a leveling mechanism. The function can comprise an operation of the mechanism. The function can comprise a characteristic of a function of the mechanism.

In another aspect, an apparatus for printing one or more three-dimensional objects (e.g., a 3D object) comprising a controller that is programed to: (a) direct a processing unit to process an output signal received from a sensor and generate a result indicative of a formation parameter during formation of the three-dimensional object, wherein the sensor senses an input signal generated by an energy source, which input signal is generated during formation of the three-dimensional object by three-dimensional printing, wherein the sensor is neither a weight sensor nor a thermocouple, wherein the energy source is a directional energy source, wherein the controller is operatively coupled to the sensor, to the energy source, and to the processing unit; and (b) direct a mechanism used in a three-dimensional printing methodology to alter a function of the mechanism based on the result, wherein the controller is operatively coupled to the mechanism, wherein the three-dimensional is printed adjacent to a platform, wherein the platform comprises the sensor or the energy source.

In another aspect, an apparatus for printing one or more three-dimensional objects (e.g., a three-dimensional object) comprises a platform for accepting a material bed, which platform includes at least one device comprising a sensor or an energy source, wherein the material bed contacts the platform, wherein at least a portion of the material bed is used to generate the three-dimensional object using three-dimensional printing, wherein the sensor is neither a weight sensor nor a thermocouple, and wherein the energy source is a directional energy source.

Contacts can comprises directly contacts or indirectly contracts (e.g., indirectly through a coating, or a surface). The material bed can directly contact at least a portion of a surface of the platform. The sensor can exclude a temperature sensor (e.g., a certain type of temperature sensor). The sensor may be selected from the group consisting of a sound wave sensor, electromagnetic beam sensor, and magnetic field sensor. The energy source can exclude a radiative heat source. The energy source can exclude a dispersive heat source. The energy source can exclude a cooling source. The energy source can exclude a dispersive cooling source. The energy source may include an infrared (IR) beam array (e.g., IR laser array). In some embodiments, the energy source may exclude an IR beam array. The energy source can comprise an electromagnetic beam generator, a sound wave generator, or a magnetic field generator. The electromagnetic beam can comprise a collimated beam. The electromagnetic beam can comprise a laser beam. The electromagnetic beam can comprise an X-ray beam. The electromagnetic beam can comprise an infrared beam. The sound wave can comprise an ultrasound wave. The sound wave can comprise a radio wave. The sound wave may be a sound that is non-audible by an average human. The electromagnetic beam may be non-visible by an average human. The platform may comprise one or more transmitters (e.g., energy sources). The energy source can generate a signal that is sensed by the sensor. The sensor may sense an alteration in the energy beam. The sensor may subsequently generate the output signal. The sensor may comprise a transceiver. The sensor may comprise a sound sensor, electromagnetic radiation sensor, magnetic field sensor, electric field sensor, or magnetic field sensor. The sensor can comprise a spectrum analyzer. The sensor may be coupled to a spectrum analyzer. The apparatus may comprise a multiplicity of sensors. The sensor may comprise a sensor array or matrix. The multiplicity of sensors may be arranged in an array or matrix (e.g., 2D or 3D). The platform may comprise a surface that directly contacts the material bed. The surface may be non-planar. The platform may comprise a surface that directly contacts the material bed. The surface may comprise a flat or a planar surface.

In some aspects, a method for printing one or more three-dimensional objects (e.g., a 3D object) comprises: (a) generating the three-dimensional object by three-dimensional printing, wherein the material bed is disposed in an atmosphere that forms a plasma; (b) detecting the plasma; and (c) evaluating an adjustment of the generating according to the detecting.

The method may further comprise repeating step (a) and adjusting the generating in (a) based on the detecting. The generating may comprise transforming the at least a portion of a material bed by using an energy beam. The generating may comprise transforming a powder material within the material bed by using an energy beam. The adjustment may comprise adjusting at least one characteristic of the energy beam (e.g., as disclosed herein).

In some aspects, a system for printing one or more three-dimensional objects (e.g., a 3D object) comprises: (a) an enclosure for generating the three-dimensional object from at least a portion of a material bed by a three-dimensional printing; (b) an atmosphere disposed within the enclosure, which atmosphere comprises a plasma; (c) a plasma sensor that senses the plasma and generates an output signal, which plasma sensor is disposed adjacent to the enclosure; and (d) a controller that comprises a processing unit, which controller is programed to evaluate the output signal to determine any adjustment to the three-dimensional printing. The controller may further operatively couple to the plasma sensor. The system may further comprise a mechanism that is used in the three-dimensional printing to generate the three-dimensional object. The mechanism may be disposed adjacent to the enclosure. The controller may be operatively coupled to the mechanism. The controller may be programmed to and direct the mechanism to alter at least one function of the mechanism based on the output signal evaluation.

In another aspect, an apparatus for printing one or more three-dimensional objects (e.g., a 3D object) comprises a controller that is programed to: (a) direct a processing unit to process a plasma generated signal that is detected by a plasma sensor and generate a result, which plasma is formed in an enclosure in which the three-dimensional object is formed by three-dimensional printing, wherein the controller is operatively coupled to the sensor and to the processing unit; and (b) evaluate the result to determine any adjustment to the three-dimensional printing, wherein the controller is operatively coupled to the three-dimensional printing. The controller can direct a mechanism used in the three-dimensional printing to alter a function of the mechanism based on the result. The controller may be operatively coupled to the mechanism. The plasma can be formed during a formation of the three-dimensional object.

In another aspect, an apparatus for printing one or more three-dimensional objects (e.g., a 3D object) comprises: an enclosure for generating a three-dimensional object from at least a portion of a material bed by three-dimensional printing, which enclosure has an atmosphere that comprises a plasma; and a plasma sensor that senses the plasma, which plasma sensor is disposed adjacent to the enclosure.

The atmosphere comprises a gas, wherein plasma can be generated from the gas. The plasma can be formed during a formation of the three-dimensional object. The plasma can be formed during the three-dimensional printing. Wherein adjacent can comprise inside, outside, or within the walls of the enclosure. The enclosure can comprise a chamber. The chamber can be isolated from the ambient environment. The gas can be an inert gas. The gas can be depleted in a species that reacts with a material that forms the material bed during the three-dimensional printing. The gas can be depleted in a species that reacts with a material that forms the material bed. An output from the plasma sensor may facilitate an evaluation of the temperature of a position of the material bed that corresponds to a position of the plasma. An output from the plasma sensor may facilitate an evaluation of the temperature of a corresponding position of the material bed. The corresponding position may relate to, influence, or facilitate the generation of the plasma. The corresponding position may cause the generation of the plasma. The corresponding position can comprise the temperature in the corresponding position. The corresponding position can comprise the energy in the corresponding position. The corresponding position can comprise the electric charge or magnetic charge in the corresponding position. An output from the plasma sensor may facilitate an evaluation of the temperature of a position of the material bed that corresponds to a position of the plasma. The plasma sensor may sense the electromagnetic radiation of the plasma. The plasma sensor can comprise a spectrum analyzer. The plasma sensor may collect the electromagnetic radiation at a predefined wavelength regiment. The plasma sensor may sense the electromagnetic radiation of the plasma. The plasma sensor can comprise, or be coupled to, a spectrometers or monochromator. The predefined wavelength regiment is from at least about 5 nanometers to at most about 500 nanometers.

In another aspect, a method for printing one or more three-dimensional objects (e.g., a 3D object) comprises: (a) forming the three-dimensional object from a particulate material by using three-dimensional printing; (b) generating a wave having a wavelength that is greater than an average or median fundamental length scale of the particulate material; (c) detecting at least one signal indicative of an alteration of the wave; and (d) evaluating the ate least one signal to determine an adjustment to the three-dimensional printing.

The method may further comprise repeating step (a) and adjusting the forming in (a) based on the detecting. In some instances, step (c) may further comprise generating an image of the at least a portion of the three-dimensional object by using the at least one signal. The generating can comprise transforming at least a portion of a material bed that comprises the particulate material by using an energy beam. The adjustment can comprise adjusting at least one characteristic of the energy beam (e.g., as disclosed herein).

In another aspect, a system for printing one or more three-dimensional objects (e.g., a 3D object) comprises: (a) a material bed that comprises a particulate material of which at least a portion is used to generate the three-dimensional object by three-dimensional printing, which material bed is disposed in an enclosure; (b) a wave source that generates a wave having a wavelength that is greater than an average or median fundamental length scale of the particulate material, wherein the wave source is disposed adjacent to the enclosure; (c) a wave sensor that detects an input signal indicative of an alteration of the wave and produces an output signal, wherein the wave sensor is disposed adjacent to the enclosure; and (d) a controller that comprises a processing unit, and is programed to evaluate the output signal to determine any adjustment to the three-dimensional printing. The system may further comprise a mechanism that is used in the three-dimensional printing, wherein the mechanism is disposed adjacent to the enclosure and is coupled to the controller, wherein the controller is programmed to direct the mechanism to alter at least one function based on the evaluation (e.g., by the processing unit). The mechanism can comprise an energy source that generates an energy that transforms the particulate material to form the at least a portion of the three-dimensional object. The controller may further be operatively coupled to the sensor.

In another aspect, an apparatus for printing one or more three-dimensional objects (e.g., a 3D object) comprises a controller that is programed to: (a) direct a wave source to generate a wave having a wavelength that is greater than the average or median fundamental length scale of a particulate material disposed in a material bed, wherein at least a portion of the particulate material is used to form the three-dimensional object using three-dimensional printing; (b) direct at least one processing unit to process a first signal indicative of an alteration of the wave and generate a first result, which first signal is detected by a wave detector, wherein the controller is operatively coupled to the wave source and to the wave detector; and (c) evaluate the first result to determine any adjustment to the three-dimensional printing.

The controller may direct a mechanism used in the three-dimensional printing to alter at least one function based on the evaluation. The controller may be operatively coupled to the mechanism. The at least one first signal may further comprise the wave. The direct in steps (a) can comprise direct the processing unit. Evaluate in step (c) may comprise evaluation by the processing unit. The controller can further be programed to: (i) prior to step (b) direct a magnetic field source to generate a magnetic field that engulfs the three-dimensional object; and (ii) in step (b) direct the processing unit to further process a second signal comprising the magnetic field that is altered and generate a result, which second signal is detected by a magnetic field detector, wherein the controller is operatively coupled to the magnetic field source and to the magnetic field detector. The controller can further be programed to: direct the mechanism used in the three-dimensional printing to alter a function (of the mechanism) according to the result. The controller may further be programed to: (i) prior to step (b) direct an electric field source to generate an electric field that engulfs the three-dimensional object; and (ii) in step (b) direct the processing unit to further process a second signal comprising an alteration in the electric field and generate a result, which second signal is detected by an electric field detector, wherein the controller is operatively coupled to the electric field source and to the electric field detector. The controller can further be programed to: direct the mechanism used in the three-dimensional printing methodology to alter at least one function (of the mechanism) according to the result.

In another aspect, an apparatus for printing one or more three-dimensional objects (e.g., a 3D object) comprises: (a) a material bed that comprises a particulate material of which at least a portion is used to generate the three-dimensional object by three-dimensional printing, which material bed is disposed in an enclosure; (b) a wave source that generates a wave having a wavelength that is greater than an average or median fundamental length scale of the particulate material; and (c) a wave detector that detects at least one first signal comprising an alteration in the wave, wherein the wave source and the wave detector are disposed adjacent to the enclosure.

The at least one first signal may further comprise the wave (e.g., unaltered). The wave can be an electromagnetic wave. The electromagnetic wave can be an X-ray wave. The wave can be a sound wave. The sound wave can be ultrasound. The sound wave can be a radio wave. The altered wave can be the wave that is altered in intensity, frequency, and/or modulation. The apparatus may further comprise a magnetic field source that generates a magnetic field; and a magnetic field detector that detects at least one second signal comprising an alteration in the magnetic field, which magnetic field source and magnetic field detector are disposed adjacent to the enclosure. The apparatus may further comprise an electric field source that generates an electric field; and an electric filed detector that detects at least one third signal comprising an alteration in the electric field, which electric field source and electric field detector are disposed adjacent to the enclosure. The material bed may be disposed adjacent to a platform. The platform can comprise the wave generator and/or the wave detector. The wave generator and/or the wave detector may contact the material bed. The contact may be direct or indirect contact. The indirect contact may be through at least one surface. The at least one surface may be a coating. The coating may be a protective coating. An output of the wave detector may facilitate an evaluation of a shape of the at least a portion of the three-dimensional object. The evaluation may be a real-time evaluation (e.g., during the 3D printing). The evaluation may be an evaluation at a predetermined time. The predetermined time can comprise subsequent to a completion of a layer of hardened material as part of the three-dimensional object. Adjacent can comprise within, outside, or within a wall of the enclosure. At least one of the wave detector and the wave source can be disposed in the platform. A surface of the platform may directly contact the material bed. A surface of the platform may indirectly contact the material bed.

In another aspect, a method for printing one or more three-dimensional objects comprising: (a) generating at least a portion of a three-dimensional object by a three-dimensional printing methodology; (b) producing a magnetic field that penetrates the material bed; (c) detecting at least one signal comprising the magnetic field that is altered; and (d) evaluating an adjustment of the generating according the detecting in (c).

The method may further comprise repeating step (a) and adjusting the generating in (a) based on the detecting in (c). Step (c) may further comprise generating an image of the at least a portion of the three-dimensional object by using the at least one signal. The generating in step (a) can comprise transforming at least a portion of a material bed by using an energy beam. The generating in step (a) can comprise transforming a powder material by using an energy beam. The adjustment in step (d) can comprise adjusting at least one characteristic of the energy beam (e.g., as disclosed herein).

In another aspect, a system for printing one or more three-dimensional objects comprises: (a) a material bed that comprises a particulate material, wherein at least a portion of the material bed is used to generate at least one three-dimensional object by a three-dimensional printing methodology, wherein the material bed is disposed in an enclosure; (b) a magnetic field source that generates a magnetic field; wherein the magnetic field source is disposed adjacent to the enclosure; (c) a magnetic field sensor that detects an input signal comprising the magnetic field that is altered and generates an output signal, wherein the magnetic field detector is disposed adjacent to the enclosure; (d) a mechanism that is used in the three-dimensional printing methodology to generate the at least a portion of the three-dimensional object, wherein the mechanism is disposed adjacent to the enclosure; (e) a processing unit operatively coupled to the sensor to processes the output signal and generate a result; and (f) a controller that is operatively coupled to the processing unit, and the mechanism, and is programed to direct the: (i) processing unit to process the output signal to generate the result; and (ii) mechanism to alter a function of the mechanism based on the result.

In another aspect, an apparatus for printing one or more three-dimensional objects comprises a controller that is programed to: (a) direct a magnetic field source to generate a magnetic field that penetrates a material bed, wherein at least a portion of the material bed is used to generate at least one three-dimensional object using a three-dimensional printing methodology; and (b) direct a processing unit to process a signal comprising the magnetic field that is altered and generate a result, which signal is detected by a magnetic field detector, wherein the controller is operatively coupled to the magnetic field source and to the magnetic field detector, and (c) direct a mechanism used in the three-dimensional printing methodology to alter a function of the mechanism based on the result, wherein the controller is operatively coupled to the mechanism. The signal can further comprise the magnetic field.

The processing unit can comprise a computer, wherein the controller is operatively coupled to the computer. The processing (e.g., by a processing unit) can be conducted at real time, predetermined time, after fabrication of the at least one three-dimensional object, subsequent to a completion of a layer of material as part of the at least a portion of the three-dimensional object, or at a whim.

In another aspect, an apparatus for printing one or more three-dimensional objects comprises: (a) a material bed that comprises a particulate material, wherein at least a portion of the material bed is used to generate at least one three-dimensional object by a three-dimensional printing methodology; (b) a magnetic field source that generates a magnetic field; and (c) a magnetic field detector that detects at least one signal comprising an altered magnetic field that is the magnetic field that is altered, wherein the material bed is disposed in an enclosure, wherein the magnetic field source and the magnetic field detector are disposed adjacent to the enclosure.

The detector may further detect the magnetic field (e.g., the non-altered magnetic field, or the magnetic field prior to its alteration). The material bed can be disposed adjacent to a platform. The platform can comprise the magnetic field generator or the magnetic field detector. The magnetic field generator and/or the magnetic field detector may contact the material bed. The output of the magnetic field detector may facilitate an evaluation of a shape of the at least a portion of the at least one three-dimensional object. The shape may be a three-dimensional shape or a cross-section thereof. The evaluation may be a real-time evaluation. The evaluation may be an evaluation at a predetermined time and/or at a whim. The predetermined time can comprise at time subsequent to a completion of forming a layer of material as part of the at least a portion of the three-dimensional object. The predetermined time can comprise subsequent to a completion of at least one three-dimensional object. Adjacent can comprise within, outside, within a wall of the enclosure, or any combination or permutation thereof. The magnetic field generator can be disposed within the enclosure. The magnetic field generator can be disposed outside of the enclosure. The magnetic field generator can be disposed within a wall of the enclosure. The magnetic field detector can be disposed within the enclosure. The magnetic field detector can be disposed outside of the enclosure. The magnetic field detector can be disposed within a wall of the enclosure. The material bed can be disposed adjacent to a platform. At least one of the magnetic field detector and the magnetic field generator can be disposed in the platform. A surface of the platform may directly or indirectly contact the material bed.

In another aspect, a method for printing one or more three-dimensional objects (e.g., a 3D object) comprises: (a)

forming the three-dimensional object by a three-dimensional printing in an enclosure, and generating a first energy beam directed towards the optical window of the enclosure; (b) detecting one or more signals comprising an alteration in the first energy beam, wherein the alteration in the first energy is indicative of a change in the cleanliness of the optical window; and (d) evaluating a procedure according to the detecting in (b), which procedure comprises an adjustment of the forming, or a cleaning of the optical window.

The method may further comprise repeating step (a) and performing the procedure according to the evaluating in (d). The forming can comprise transforming at least a portion of a material bed by using a second energy beam. The forming can comprise transforming at least a portion of the material bed by using a second energy beam. The forming can comprise transforming a powder material by using a second energy beam. The adjustment in step (d) can comprise adjusting at least one characteristic of the second energy beam (e.g., as disclosed herein).

In another aspect, a system for printing one or more three-dimensional objects (e.g., a 3D object) comprises: (a) an enclosure comprising an optical window, in which enclosure the three-dimensional object is generated by three-dimensional printing; (b) a first energy source that generates a first energy beam directed to the optical window, wherein the energy source is disposed adjacent to the enclosure; (c) an energy sensor that detects an input signal comprising an alteration in the energy beam to generate an output signal, wherein the alteration in the energy beam is indicative of a change in the cleanliness of the optical window, wherein the energy source is disposed adjacent to the enclosure; and (d) a controller that comprises a processing unit, and is programed to direct the processing unit to process the output signal to evaluate the output signal to determine any adjustment to the three-dimensional printing. The system may further comprise a mechanism that is used in the three-dimensional printing, which mechanism is disposed adjacent to the enclosure. The controller may be operatively coupled to the mechanism and direct the mechanism to alter at least one (of its) function based on the evaluation.

In another aspect, an apparatus for printing one or more three-dimensional objects (e.g., a 3D object) comprises a controller that is programed to: (a) direct an energy source to generate an energy beam directed towards an optical window that is disposed in an enclosure in which a three-dimensional object is generated by three-dimensional printing, wherein the controller is operatively coupled to the energy source; (b) direct at least one processing unit to process a signal indicative of an alteration in the energy beam, wherein the alteration in the energy beam is indicative of a change in the cleanliness of an optical window, wherein the controller is operatively coupled to the processing unit; and (c) evaluate a result to determine any adjustment to the three-dimensional printing based on the alteration.

The controller may further direct a mechanism used in the three-dimensional printing to alter at least one (of its) function based on the evaluation, wherein the controller is operatively coupled to the mechanism. The signal can be detected by an energy beam detector. The controller can be operatively coupled to the energy beam detector. The signal may further comprise the energy beam (e.g., unaltered energy beam). The energy beam can be an electromagnetic beam. The alteration can comprise intensity and/or direction alteration.

In another aspect, an apparatus for printing one or more three-dimensional objects (e.g., 3D object) comprises: (a) an enclosure comprising an optical window, in which enclosure the three-dimensional object is generated by three-dimensional printing; (b) a first energy source that generates a first energy beam directed to the optical window; (c) an energy beam detector that detects one or more signals comprising an alteration in the energy beam, wherein the alteration in the energy beam is indicative of a change in the cleanliness of the optical window, wherein the energy source and the energy beam detector are disposed adjacent to the enclosure.

The one or more signals may further comprise the energy beam (e.g., unaltered). The energy beam can be an electromagnetic beam. The altered can comprise varied, changed, modified, revised, attuned, or modulated. The altered can comprise modulated. The altered can comprise intensity and/or direction alteration of the electromagnetic beam (e.g., as generated by the source). The detector can be disposed outside of the enclosure. The detector can be disposed within the enclosure. The detector can be disposed along a line that travels from a projection position of the electromagnetic beam to a target position of the electromagnetic beam. The target position can be a target position of the projection. The detector can comprise a spectrum analyzer. The electromagnetic beam can be directed at a grazing angle relative to, or perpendicular to an exposed surface of the optical window. The electromagnetic beam can be directed at a non-grazing angle relative to an exposed surface of the optical window. The apparatus may further comprise a second energy source that generates a second energy beam that transforms at least a portion of a material bed to form the at least one three-dimensional object, which material bed can be disposed in the enclosure, which second energy source can be disposed adjacent to the enclosure. The change in the cleanliness of the optical window can be used to adjust at least one characteristic of a second energy beam. The at least one characteristic can comprise a power delivered by the second energy beam, a cross section of the second energy beam, a focus parameter of the second energy beam, a pulsing sequence of the second energy beam, a rate of movement of the second energy beam, or any combination thereof. The second energy beam may travel along a path (e.g., predetermined and/or controlled by the controller). Controlled may comprise regulated and/or directed. The at least one characteristic can comprise a power delivered by the second energy beam, a footprint of the second energy beam on an exposed surface of the material bed, a focus parameter of the second energy beam, a pulsing sequence of the second energy beam, a rate of movement of the second energy beam along the path, or a rate of formation of the three-dimensional object. The change in the cleanliness of the optical window can be used to determine the initiation of a cleaning procedure of the optical window. The cleaning procedure can comprise physical and/or chemical removal of debris. The cleaning procedure can comprise ablation of the debris.

In another aspect, a method for printing one or more three-dimensional objects (e.g., a 3D object) comprises: (a) generating at least a portion of the three-dimensional object by three-dimensional printing from at least a portion of a material bed that is disposed adjacent to an enclosure; (b) measuring a distance relative to an exposed surface of the material bed; and (c) evaluating an adjustment of the three-dimensional printing according to the measuring.

The method may further comprise repeating step (a) and adjusting the 3D printing based on the evaluating. The generating can comprise transforming the at least a portion of the material bed by using an energy beam. The adjustment can comprise adjusting at least one characteristic of the energy beam (e.g., as disclosed herein). The adjustment can comprise adjusting at least one mechanism used in the three-dimensional printing. The at least one mechanism can comprise the layer dispensing mechanism. The at least one mechanism can comprise the material dispensing mechanism, leveling mechanism, or material removal mechanism. The at least one mechanism can comprise at least two of the group consisting of material dispensing mechanism, leveling mechanism, and material removal mechanism. The adjustment can comprise adjusting at least one parameter of the three-dimensional printing. The at least one parameter can comprise an amount of material dispensed into the material bed, a level of an exposed surface of the material bed, or an amount of energy injected into the material bed during the generating.

In another aspect, a system for printing one or more three-dimensional objects (e.g., a 3D object) comprising: (a) a platform for accepting a material bed disposed within an enclosure, wherein at least a portion of the material bed is used to generate the three-dimensional object by three-dimensional printing; (b) a sensor that is used to measure a distance relative to an exposed surface of the material bed and generates an output signal, wherein the sensor is disposed adjacent to the enclosure; and (c) a controller that comprises a processing unit and is programed to direct the processing unit to process the output signal evaluate an adjustment in the three-dimensional printing. The system may further comprise a mechanism that is used in the three-dimensional printing, wherein the mechanism is disposed adjacent to the enclosure and is operatively coupled to the controller, which controller is programmed to direct the mechanism to alter at least one (of its) function based on the evaluation.

In another aspect, an apparatus for printing one or more three-dimensional objects (e.g., a 3D object) comprises a controller that is programed to (a) direct a processing unit to process a signal received from a sensor that is used to measure a distance relative to an exposed surface of a material bed and generate a result, wherein at least a portion of the material bed is used to generate the three-dimensional object by three-dimensional printing, wherein the controller is operatively coupled to the material bed and to the one or more sensors; and (b) evaluate the result to determine any adjustment to the three-dimensional printing. The apparatus may further direct a mechanism used in the three-dimensional printing to alter at least one (of its) function based on the result, which controller is operatively coupled to the mechanism.

In another aspect, an apparatus for printing one or more three-dimensional objects (e.g., a 3D object) comprising a platform for accepting a material bed disposed within an enclosure, wherein at least a portion of the material bed is used to generate the three-dimensional object by three-dimensional printing, wherein the enclosure comprises one or more sensors that are used to measure a distance relative to an exposed surface of the material bed, wherein the one or more sensors are disposed adjacent to the enclosure.

The distance can be a distance from a mechanism comprising a component of the layer dispensing mechanism (e.g., recoater). The component can comprise a material dispensing mechanism, a leveling mechanism, or a material removal mechanism. The component can comprise an opening of the component. The material dispensing mechanism (e.g., material dispenser) can comprise an exit opening port through which the material exits the material dispensing mechanism and travels to the material bed. The leveling mechanism can comprise a blade or an air knife. The component can comprise a material exit opening, a material entrance opening, a blade, or an air knife. The component can comprise a surface of the component. The surface can be the surface that neighbors the exposed surface of the material bed. The surface can be the surface that faces the exposed surface of the material bed. The surface can be the surface that is closest to the exposed surface of the material bed. Neighbors can comprise above the exposed surface of the powder bed, wherein above is in a direction opposite to the gravitational field. Neighbors can comprise above the exposed surface of the powder bed, wherein above is in a direction opposite to the platform. The distance can be a distance from a mechanism can comprise a source of the energy beam. Adjacent can comprise within, outside, or in a wall of the enclosure. The one or more sensors can be disposed above the exposed surface of the material bed, wherein above is in a direction opposite to the direction of the platform. The one or more sensors can be disposed above the exposed surface of the material bed, wherein above is in a direction opposite to the direction of the gravitational field. The one or more sensors can comprise metrological sensors. An output of the one or more sensors can be used to evaluate a planarity of the exposed surface of the material bed. An output of the one or more sensors can be used to evaluate a roughness of the exposed surface of the material bed. An output of the one or more sensors can be used to evaluate a position the exposed surface of the material bed. The position can be a vertical position.

In another aspect, a method for printing one or more three-dimensional objects (e.g., a three-dimensional object) comprises: (a) forming the three-dimensional object in an enclosure comprising an atmosphere; (b) generating a first energy beam that travels in the atmosphere; (c) detecting an alteration (e.g., variance, or change) in the first energy beam, wherein the indicative of a change in the cleanliness of the atmosphere; and (d) evaluating an adjustment of the forming in (a) according to the measuring.

The method may further comprise repeating step (a) and adjusting the forming in (a) based on the evaluating. The forming in step (a) may comprise three-dimensional printing. The forming in step (a) can comprise transforming at least a portion of a material bed by using a second energy beam. The forming in step (a) can comprise transforming at least a portion of a powder material within the material bed by using a second energy beam. The adjustment (e.g., in step (d)) can comprise adjusting at least one characteristic of the second energy beam (e.g., as disclosed herein). The adjustment can comprise adjusting at least one mechanism involved in (e.g., effectuating) the three-dimensional printing. The at least one mechanism can comprise the layer dispensing mechanism (or any component thereof). The at least one mechanism can comprise the material dispensing mechanism, material removal mechanism, or leveling mechanism. The adjustment can comprise adjusting at least one parameter of the three-dimensional printing. The at least one parameter can comprise an amount of material (e.g., pre-transformed material) dispensed into the material bed, a level (e.g., height) of an exposed surface of the material bed, or an amount of energy injected into the material bed during the generating (e.g., by the second energy beam).

In another aspect, a system for printing one or more three-dimensional objects (e.g., a three-dimensional object) comprises: (a) an enclosure that comprises an atmosphere, wherein the three-dimensional object is formed in the enclosure using three-dimensional printing; (b) a first energy source that generates a first energy beam that travels through at least a portion of the atmosphere, which energy source is disposed adjacent to the enclosure; (c) a sensor that (i) detects an alteration in the first energy beam indicative of a change in the cleanliness of the atmosphere and (ii) generate an output signal; wherein the sensor is disposed adjacent to the enclosure; and (d) a controller that comprises a processor, which processor is programed to evaluate the output signal to determine any adjustment to the three-dimensional printing. The system may further comprise a mechanism that is used in the three-dimensional printing. The mechanism may be disposed adjacent to the enclosure. The processor may further direct the mechanism to alter a function of the mechanism based on the evaluation. The mechanism may be operatively coupled to the controller.

In another aspect, an apparatus for printing one or more three-dimensional objects (e.g., a three-dimensional object) comprises a controller that is programed to: (a) direct a first energy source to project a first energy beam into an atmosphere of an enclosure in which the three-dimensional object is printed by three-dimensional printing; (b) direct a processing unit to process at least one signal that is detected by at least one sensor which signal is indicative of an alternation in the first energy beam indicative of a change in the cleanliness of the atmosphere of the enclosure, wherein the controller is operatively coupled to the first energy source and to the one or more sensors; and (c) evaluate the first result to determine any adjustment to the three-dimensional printing. The controller may further adjust the three-dimensional printing. The adjustment may comprise further programing the controller to direct a mechanism used in the three-dimensional printing to alter at least one (of its) function based on the evaluation in (c). The controller may be operatively coupled to the mechanism.

The at least one signal may comprise the first (e.g., unaltered) energy beam. The evaluation may comprise directing at least one processing unit. The controller can be operatively coupled to the at least one processing unit. The processing unit can comprise a computer. The controller can be operatively coupled to the computer. The processing can be conducted at real time, predetermined time, after fabrication of the three-dimensional object, subsequent to a completion of a layer of material as part of the three-dimensional object, at a whim, or any combination thereof. The apparatus can further comprise a material bed and a second energy source that generates a second energy beam, which second energy beam transforms at least a portion of a material bed to form the three-dimensional object. The second energy source and/or beam can be operatively coupled to the controller. The evaluation can be used to adjust at least one characteristic of the second energy beam.

In another aspect, an apparatus for printing one or more three-dimensional objects (e.g., a 3D object) comprises: (a) an enclosure that has an atmosphere, wherein a three-dimensional object is formed in the enclosure; (b) a first energy source that generates a first energy beam, which energy source is disposed adjacent to the enclosure and travels through the atmosphere of the enclosure; (c) at least one sensor that detects an alteration of the first energy beam, wherein the alteration indicates a change in the cleanliness of the atmosphere.

The atmosphere can comprise a gas. The at least one sensor can sense the first (e.g., unaltered) energy beam. The alteration of the first energy beam can comprise intensity alteration or direction alteration. The first energy beam can be an electromagnetic beam. The first energy beam can be a collimated beam. Adjacent can comprise inside, outside, or within a wall of the enclosure. The first energy source can be disposed within the enclosure. The first energy source can be embedded within a wall of the enclosure. The first energy source can be disposed outside of the enclosure. The detector can be disposed within the enclosure. The detector can be embedded within a wall of the enclosure. The detector can be disposed outside of the enclosure. The detector can be disposed substantially along a line that travels from a projection position of the first energy beam to a target position of the first energy beam. The detector can be disposed at a position that is not along a line that travels from a projection position of the first energy beam to a target position of the first energy beam. The target position can be a target of the projection. The detector can comprise a spectrum analyzer. The altered first energy beam can be used in an evaluation of the cleanliness of the atmosphere. The evaluation can comprise an evaluation in real time, predetermined time, after fabrication of the three-dimensional object, subsequent to a completion of a layer of material (e.g., hardened material) as part of the three-dimensional object, or at a whim. The evaluation can be used to determine an initiation of an atmosphere cleaning procedure. The cleaning procedure can comprise purging the atmosphere. The cleaning procedure can comprise irradiating the atmosphere. The cleaning procedure can comprise physically and/or chemically removing debris from the atmosphere. The apparatus may further comprise a material bed and a second energy source that generates a second energy beam that transforms at least a portion of the material bed to form the three-dimensional object. The second energy source can be disposed within the enclosure. The evaluation may be of an adjustment of at least one characteristic of the second energy beam. The at least one characteristic of the second energy beam can comprise a power delivered by the second energy beam, a footprint of the second energy beam on an exposed surface of the material bed, a focus parameter of the second energy beam, a pulsing sequence of the second energy beam, a rate of movement of the second energy beam along a path, or a rate of formation of the three-dimensional object.

In another aspect, a method for printing one or more three-dimensional objects (e.g., a 3D object) comprises: (a) forming the three-dimensional object by three-dimensional printing in an enclosure, that comprises an atmosphere; (b) detecting particles in the atmosphere; and (d) evaluating an adjustment of the forming in (a) according to the detecting.

The method may further comprise repeating step (a) and adjusting the forming in step (a) based on the evaluating in (d). The forming can comprise transforming a material (e.g., powder) material disposed in the enclosure by using an energy beam. The forming can comprise transforming at least a portion of a material bed by using an energy beam. The adjustment can comprise adjusting at least one characteristic of the energy beam (e.g., as disclosed herein).

In another aspect, a system for printing one or more three-dimensional objects (e.g., a 3D object) comprising: (a) an enclosure in which the three-dimensional object is formed by three-dimensional printing, which enclosure comprises an atmosphere; (b) a sensor that detects particles in the atmosphere and generates an output signal, wherein the detector is disposed adjacent to the enclosure; and (c) a controller that comprises a processing unit that is programed to evaluate the output signal to determine at least one of: (i) any adjustment to the three-dimensional printing and (ii) initiation of an atmosphere cleaning procedure. The system may further comprise a mechanism that is used in the three-dimensional printing, wherein the mechanism is disposed adjacent to the enclosure. The processing unit may be operatively coupled to the mechanism. The three-dimensional printing may comprise operation of the mechanism.

The processing unit may direct in option (i) the mechanism to alter at least one (of its) function.

In another aspect, an apparatus for printing one or more three-dimensional objects (e.g., a 3D object) comprises a controller that is programed to direct at least one processing unit to evaluate an output signal from a particle sensor to determine any adjustment to three-dimensional printing of the three-dimensional object, wherein the output signal corresponds to at least one particle in an atmosphere of an enclosure, wherein the output signal is indicative of a change in the cleanliness of the atmosphere, wherein the controller is operatively coupled to the particle sensor, and wherein the controller comprises the at least one processing unit. The controller may be programmed to direct a mechanism used in the three-dimensional printing to alter at least one (of its) function based on the evaluation. The controller may be operatively coupled to the mechanism. The mechanism can comprise a second energy source, a material dispensing mechanism, a leveling mechanism, or a material removal mechanism. The function can comprise an operation.

In another aspect, an apparatus for printing one or more three-dimensional objects (e.g., a 3D object) comprising: (a) an enclosure in which the three-dimensional object is formed by three-dimensional printing, which enclosure comprises an atmosphere; and (b) a sensor that detects one or more particles in the atmosphere, which sensor is disposed adjacent to the enclosure.

The atmosphere can comprise a gas. The detector can detect one or more particles (e.g., residing in the atmosphere). The detector can detect the one or more particles during a particular (e.g., predetermined) span of time (e.g., time window). The detector can detect the nature (e.g., type) of the particles. An output of the detector can be used in an evaluation of a cleanliness of the atmosphere (e.g., determination of how clean is the atmosphere). The evaluation can be used to initiate an atmosphere cleaning procedure. The cleaning procedure can comprise purging the atmosphere. The cleaning procedure can comprise irradiating the atmosphere. The cleaning procedure can comprise physically or chemically removing debris from the atmosphere. The apparatus can further comprise a material bed and an energy beam that transforms at least a portion of the material bed to form the three-dimensional object. An output of the detector can be used to adjust at least one characteristic of the energy beam. The at least one characteristic of the energy beam can comprise a power (or power per unit area) delivered by the energy beam to the at least a portion of the material bed, a dwell time of the energy beam at a position of the material bed (e.g., exposed surface of the material bed), a footprint of the energy beam on an exposed surface of the material bed, a focus parameter of the energy beam, a pulsing sequence of the energy beam, a rate of movement of the energy beam along a path, or a rate of formation of the three-dimensional object.

In another aspect, a method for printing one or more three-dimensional objects (e.g., a 3D object) comprises: (a) forming at least a portion of the three-dimensional object from at least a portion of a material bed; (b) generating an energy beam that is directed towards an exposes surface of the material bed; (c) detecting one or more signals comprising a scattering of the energy beam from the exposed surface; and (d) evaluating a roughness of the exposes surface based on the detecting. The method may further comprise repeating step (a) and adjusting the forming in step (a) based on the detecting in step (c). In another aspect, a system for printing one or more three-dimensional objects (e.g., a 3D object) comprises: (a) a material bed comprising an exposed surface; (b) an energy source that generates an energy beam directed towards the exposed surface, wherein the energy source is disposed adjacent to the material bed; (c) an energy sensor that detects an input signal from the exposed surface and generates an output signal, which input signal comprises a scattering and/or an alteration of the energy beam, which input signal is used to evaluate a roughness of the exposes surface, wherein the energy sensor is disposed adjacent to the material bed; and (c) a controller that comprises a processing unit that evaluates the output signal to determine any adjustment to the three-dimensional printing. The system may further comprise a mechanism that is used in the three-dimensional printing. The mechanism may be disposed adjacent to the material bed. The controller may be operatively coupled to the mechanism. The controller may direct the mechanism to alter at least one (of its) function based on the evaluation.

In another aspect, an apparatus for printing one or more three-dimensional objects (e.g., a 3D object) comprises: a controller that (a) is programed to direct an energy source to generate an energy beam that is directed towards an exposed surface of a material bed, wherein a three-dimensional object is formed from at least a portion of the material bed by three-dimensional printing, wherein the energy source is operatively coupled to the controller; and (b) comprises a processing unit to evaluate a signal comprising an alteration in the energy beam and/or a scattering of the energy beam from the exposed surface to determine a roughness of the exposes surface, which sensor is sensed by a detector, wherein the detector is operatively coupled to the controller.

The evaluation can comprise providing an image output that can comprise an image, which image is generated using the signal (e.g., optical signal). The evaluation in step (b) can comprise processing the image output. The evaluation can comprise image processing. At least one signal may further comprise the first energy beam (e.g., that is not altered and/or scattered).

In another aspect, an apparatus for printing one or more three-dimensional objects (e.g., a 3D object) comprises: (a) a material bed comprising an exposed surface; (b) an energy source generating an energy beam that is directed towards the exposes surface, wherein the energy source is disposed adjacent to the material bed; and (c) an energy detector (e.g., sensor) that detects one or more signals comprising an alteration in the energy beam and/or a scattering of the energy beam from the exposed surface, which one or more signals are used to evaluate a roughness of the exposes surface, wherein the energy beam detector is disposed adjacent to the material bed.

Adjacent can be above or below an exposed surface of the material bed. The material bed can be disposed within an enclosure. The energy detector can be disposed adjacent to the enclosure. Wherein adjacent can comprise in the enclosure, outside of the enclosure, or within a wall of the enclosure. The apparatus may further comprise an image output that can include at least one image, which image is generated using the one or more signals. The evaluation in (b) can comprise processing the image output. The processing can comprise image processing. The energy beam can be an electromagnetic beam. The detector can comprise a spectrum analyzer. The detector can comprise an optical detector. The optical detector can comprise a camera (e.g., stills and/or video). The apparatus may further comprise an image processor. The image processing can be utilized to adjust a leveling of the exposed surface. The apparatus may further comprise a leveling. The image processing can be utilized to adjust the operation of the leveling mechanism.

The image processing can be utilized to adjust the rate of leveling by the leveling mechanism. The image processing can be utilized to adjust a target level of the material bed according to which the leveling mechanism and/or material removal mechanism may level the exposed surface of the material bed. The leveling mechanism can comprise a blade or an air knife. The material removal mechanism may comprise a force that attracts the pre-transformed material away from the material bed towards the material removal mechanism. The force may comprise vacuum, physical (e.g., mechanical), magnetic, or electric force. The apparatus may further comprise a material dispensing mechanism. The material dispensing mechanism can comprise at least one opening through which material exits the material dispensing mechanism. The image processing can be utilized to adjust the operation of the material dispensing mechanism, material removal mechanism, leveling mechanism, or any combination or permutation thereof. The image processing can be utilized to adjust the rate of material dispensed by the material dispensing mechanism.

In another aspect, a method for measuring surface roughness of a three-dimensional object comprises: (a) generating a first energy beam directed towards a surface of the three-dimensional object that comprises a feature indicative of a three-dimensional printing methodology; (b) detecting at least one signal comprising a scattering of the first energy beam from the surface; and (c) evaluating a roughness of the surface. The feature can comprise one or more layers of material. The layers may comprise successively arranged melt pools.

In another aspect, a system for measuring surface roughness of a three-dimensional object comprises: (a) a first energy source that generates a first energy beam directed towards a surface of the three-dimensional object that comprises a feature indicative of a three-dimensional printing methodology, wherein the first energy source is disposed adjacent to the three-dimensional object; and (b) an energy sensor that detects an input signal comprising an alteration of the first energy beam and/or a scattering of the first energy beam from the surface, wherein the energy sensor is disposed adjacent to the three-dimensional object; and (d) a controller that comprises a processing unit, which processing unit is programed to evaluate the output signal to determine the roughness of the surface. In another aspect, an apparatus for measuring surface roughness of a three-dimensional object comprising a controller that: (a) is programmed to direct an energy source to generate an energy beam directed towards a surface of the three-dimensional object that comprises a feature indicative of a three-dimensional printing methodology, wherein the energy source is operatively coupled to the controller; (b) comprises a processing unit that evaluates a signal to determine a roughness of the surface, which signal comprises an alteration of the energy beam or scattering of the energy beam from the surface, which signal is sensed by a sensor, wherein the energy beam, and the sensor are operatively coupled to the controller.

The evaluation in step (b) can comprise providing at least one image output that can comprise at least one image. The image can be generated using the at least one signal. The evaluation can comprise processing the image output. The processing can comprise image processing. The processing can comprise triangulation. The roughness may be from about a nano scale to about micro scale roughness, as compared to the average surface. The roughness may be of a Ra value of at least about 0.1 micrometers. The energy beam may comprise a collimated light. The processing may comprise using an algorithm that comprises Lambert's emission law. The result may be used to evaluate an adjustment of at least one characteristic (e.g., as disclosed herein) of a second energy beam that is used to generate the three-dimensional object (e.g., in a subsequent usage of the three-dimensional printing methodology).

In another aspect, an apparatus for measuring surface roughness of a three-dimensional object comprises: (a) an energy source that generates an energy beam directed towards a surface of the three-dimensional object that comprises a feature indicative of a three-dimensional printing methodology, wherein the first energy source is disposed adjacent to the three-dimensional object; and (b) an energy detector (e.g., sensor) that detects a signal comprising an alteration of the first energy beam and/or a scattering of the first energy beam from the surface, which signal is used to evaluate a roughness of the surface, wherein the energy sensor is disposed adjacent to the three-dimensional object.

The apparatus may further comprise an enclosure. The first energy source, the three-dimensional object, and/or the energy beam sensor may be disposed adjacent to (e.g., within) the enclosure. Adjacent can comprise within or outside of the enclosure. At least one of the first energy source and the energy sensor may be disposed within a wall of the enclosure. The enclosure can be open to the ambient environment. The enclosure can be isolated from the ambient environment. The apparatus may further comprise an image output that can comprise at least one image. The image can be generated using the at least one signal. The evaluation can comprise processing the image output. The processing can comprise image processing. The signal may further comprise the first energy beam (e.g., as non-altered, or before its alteration). The first energy beam can be an electromagnetic beam. The detector can comprise a spectrum analyzer. The detector can comprise an optical detector. The optical detector can comprise a camera. The apparatus may further comprise an image processor. The image processing can be used to evaluate a further processing of the three-dimensional object. The further processing can comprise polishing, trimming, or cutting. The polishing may comprise chemical or physical polishing. The physical polishing may comprise blasting. The blasting can comprise solid blasting, gas blasting, or liquid blasting. The solid blasting can comprise sand blasting. The gas blasting can comprise air blasting. The liquid blasting can comprise water blasting. The blasting can comprise mechanical blasting. The apparatus may further comprise a material bed and a second energy beam that transforms at least a portion of the material bed to form at least a portion of the three-dimensional object. The image processing can be used to evaluate an adjustment of at least one characteristic of the second energy beam.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods above or elsewhere herein.

In another aspect, a method for three-dimensional printing comprises (a) providing a powder adjacent to a base, wherein the powder comprises individual particles having a material selected from the group consisting of polymer, metal, ceramic and carbon; (b) additively generating at least a portion of the three-dimensional object from the powder; (c) collecting signals from the three-dimensional object or the powder by at least one detector in sensing communication with the three-dimensional object or the powder and; (d) processing the signals collected by the at least one detector to determine (i) a state or property of the three-dimensional object or the powder, and/or (ii) a state or progression of the additively generating.

In another aspect, a method for detecting a discontinuity in a three-dimensional object comprises (a) providing a three-dimensional object that is generated from and disposed in a powder, wherein said powder includes individual particles having a material selected from the group consisting of polymer, metal, ceramic and carbon; (b) directing a first ultrasound signal to an interface between said three-dimensional object or portion thereof and said powder; (c) receiving a second ultrasound signal from said interface subsequent to directing said first ultrasound signal; and (d) detecting a discontinuity in said three-dimensional object at said interface based on said second ultrasound signal.

In another aspect, a method of additively generating a three-dimensional object comprises (a) providing a powder adjacent to a base, wherein said powder comprises individual particles having a material selected from the group consisting of polymer, metal, ceramic and carbon; (b) directing an energy beam to said powder to additively generate said three-dimensional object or portion thereof, wherein said energy beam is directed to a location on said powder that is selected in accordance with a model of said three-dimensional object; (c) detecting one or more signals emitted from or adjacent to said location; and (d) generating a spatial or material profile of said three-dimensional object and/or said powder from said one or more signals.

In an aspect, a method for generating a three-dimensional object comprises (a) providing a powder adjacent to a base, wherein said powder comprises individual particles having a material selected from the group consisting of polymer, metal, ceramic and carbon; (b) directing an energy beam to said powder to additively form said three-dimensional object or portion thereof, which energy beam is directed along a pattern that is selected in accordance with a model design of said three-dimensional object; (c) collecting signals from said three-dimensional object or said powder by at least one detector in sensing communication with said three-dimensional object or said powder; (d) processing said signals collected by said at least one detector to determine a deviation of said three-dimensional object or portion thereof from said model design; and (e) altering said pattern of (b) as necessary to reduce or maintain said deviation.

In an aspect, a system for additively generating a three-dimensional object comprises: a base that accepts a powder that includes individual particles having a material selected from the group consisting of polymer, metal, ceramic and carbon; a powder source that supplies the powder to the base, an energy source that provides an energy bean to the powder, a detector that collects one or more signals from the three-dimensional object or the powder; and a controller that is operatively coupled to the energy source and the detector, wherein the controller is programmed to (i) supply of said energy beam from said energy source to said powder along a pattern that is selected in accordance with a model design of said three-dimensional object, (ii) process said one or more signals collected by said detector to determine a deviation of said three-dimensional object or portion thereof from said model design, and (iii) alter said pattern as necessary to reduce or maintain said deviation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also “Figure” and “FIG.” herein), of which:

Figure 1:
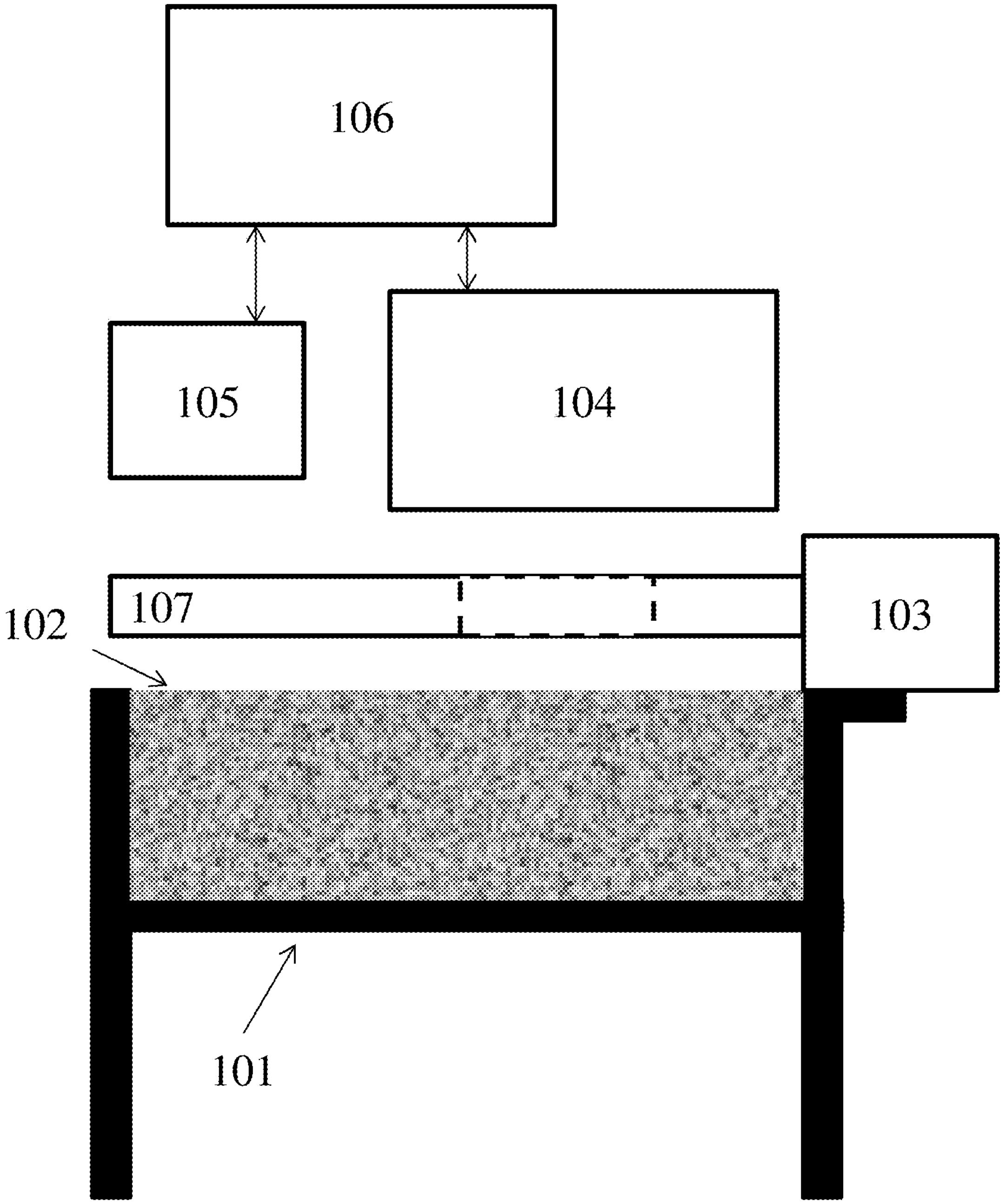
FIG. 1 shows a schematic of a system and apparatuses for forming a three-dimensional part by a three-dimensional printing process and monitoring of this process.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an" and "the" are not intended to refer to only a singular entity, but include the general class of which a specific example may be used for illustration. The terminology herein is used to describe specific embodiments of the invention, but their usage does not delimit the invention.

When ranges are mentioned, the ranges are meant to be inclusive, unless otherwise specified. For example, a range between value1 and value2 is meant to be inclusive and include value1 and value2. The inclusive range will span any value from about value1 to about value2. The term "between" as used herein is meant to be inclusive unless otherwise specified. For example, between X and Y is understood herein to mean from X to Y.

The term "adjacent" or "adjacent to," as used herein, includes 'next to', 'adjoining', 'in contact with,' and 'in proximity to.' In some instances adjacent to may be 'above' or 'below.'

Three-dimensional printing (also "3D printing") generally refers to a process for generating a 3D object. For example, 3D printing may refer to sequential addition of material layer or joining of material layers (or parts of material layers) to form a 3D structure, in a controlled manner. The controlled manner may include automated control. In the 3D printing process, the deposited material can be transformed (e.g., fused, sintered, melted, bound or otherwise connected) to subsequently hardened and form at least a part of the 3D object. Fusing (e.g., sintering or melting) binding, or otherwise connecting the material is collectively referred to herein as transforming the material (e.g., powder material). Fusing the material may include melting or sintering the material. Binding can comprise chemical bonding. Chemical bonding can comprise covalent bonding. Examples of 3D printing include additive printing (e.g., layer by layer printing, or additive manufacturing). 3D printing may include layered manufacturing. 3D printing may include rapid prototyping. 3D printing may include solid freeform fabrication. 3D printing may include direct material deposition. The 3D printing may further comprise subtractive printing.

3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP), or laminated object manufacturing (LOM).

3D printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

The methods, apparatuses, and systems of the present disclosure can be used to form 3D objects for various uses and applications. Such uses and applications include, without limitation, electronics, components of electronics (e.g., casings), machines, parts of machines, tools, implants, prosthetics, fashion items, clothing, shoes, or jewelry. The implants may be directed (e.g., integrated) to a hard, a soft tissue, or to a combination of hard and soft tissues. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides systems, apparatuses, and/or methods for 3D printing of a desired 3D object from an un-transformed material (e.g., powder material). The object can be pre-ordered, pre-designed, pre-modeled, or designed in real time (i.e., during the process of 3D printing). The 3D printing method can be an additive method in which a first layer is printed, and thereafter a volume of a material is added to the first layer as separate sequential layer (or parts thereof). Each additional sequential layer (or part thereof) can be added to the previous layer by transforming (e.g., fusing (e.g., melting)) a fraction of the powder material and subsequently hardening the transformed material to form at least a portion of the 3D object. The hardening can be actively induced (e.g., by cooling) or can occur without intervention.

A Fundamental length scale may be a diameter, spherical equivalent diameter, diameter of a bounding circle, or the largest of height, width and length of an object (e.g., 3D object or a particle). The fundamental length scale (herein abbreviated as "FLS") of the printed 3D object can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases the FLS of the printed 3D object may be in between any of the afore-mentioned FLSs (e.g., from about 50 μm to about 1000 m, from about 120 μm to about 1000 m, from about 120 μm to about 10 m, from about 200 μm to about 1 m, or from about 150 μm to about 10 m).

Figure 16:
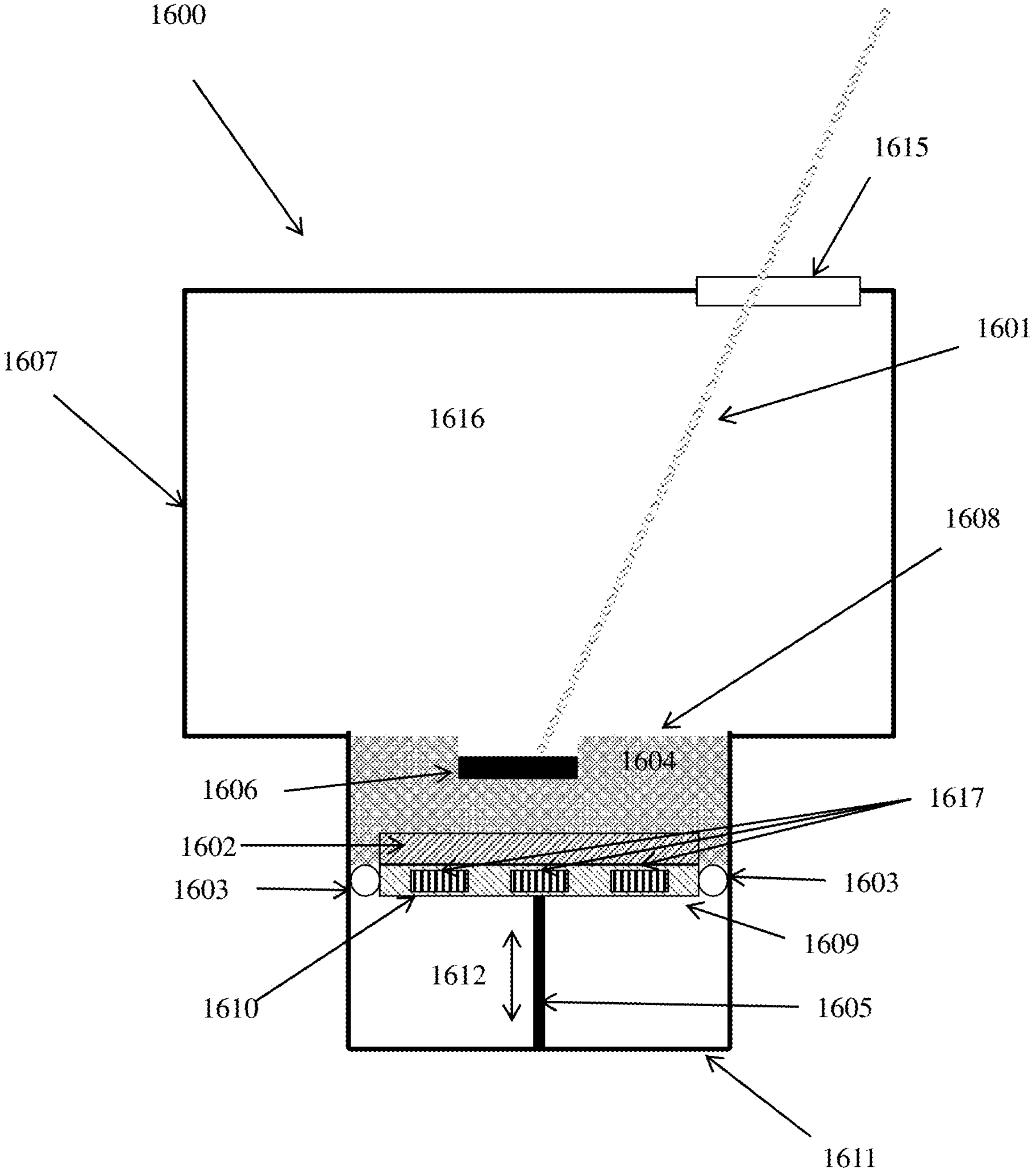
FIG. 16 shows a schematic of a system and apparatuses for forming a three-dimensional object by a three-dimensional printing methodology.
Figure 17:
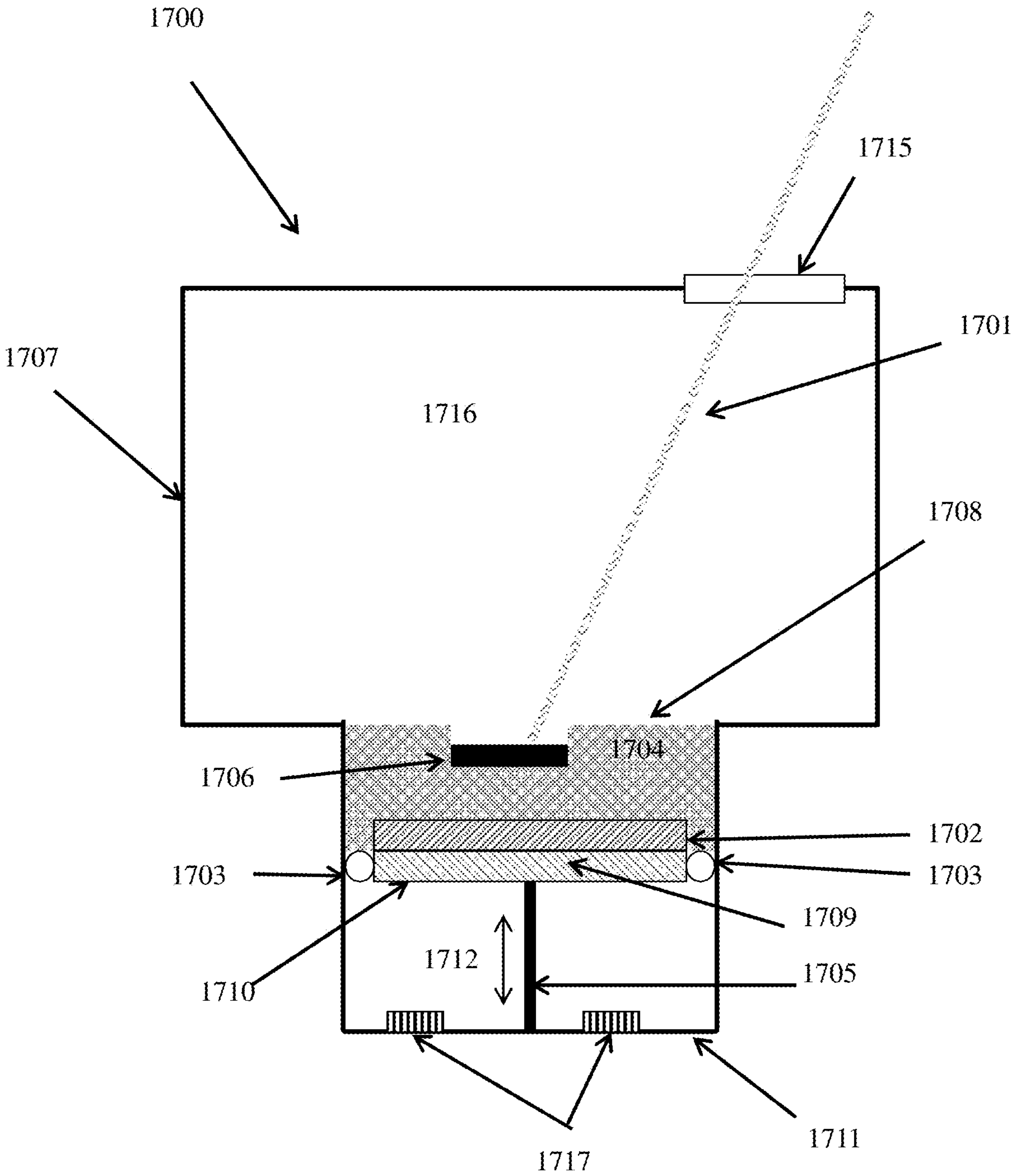
FIG. 17 shows a schematic of a system and apparatuses for forming a three-dimensional object by a three-dimensional printing methodology.

Disclosed herein are detection systems and/or apparatuses. The detection systems and/or apparatuses comprise at least one detector (e.g., sensor). The detection systems and/or apparatuses comprise at least one detector (e.g., sensor) and at least one signal generator. The signal generator may comprise an energy source. The energy source may generate one or more energy beams. The energy source may generate an electromagnetic, charged particle, or sound energy. The energy may be an energy beam. The energy beam may be collimated or dispersed. At times, the detection systems may not include a signal generator. At times, the signal that is detected by the detector is generated during the 3D printing process. At times, the signal that is detected by the detector is present during the 3D printing process. At times, the signal that is detected by the detector is present in the 3D system and/or apparatus (e.g., in the chamber or any parts thereof) before, during, and/or after the 3D printing process. FIG. 7 shows an example of a 3D printing system and apparatus in which the platform (e.g., the base 702) comprises detectors and/or energy sources schematically represented as 717, which directly contact the material bed 704. The systems and/or apparatuses employed by the methods described herein may comprise a multiplicity of sensors and/or detectors. The one or more sensors and/or detectors may be disposed as an array and/or as a matrix. For example, FIG. 7, shows an example of an array of sensors and/or detectors 717. The one or more sensors and/or detectors may be stationary or moving. The one or more sensors and/or detectors can be movable with the aid of a motor and/or a scanner. The one or more sensors and/or detectors can be coupled to the motor and/or scanner. The one or more sensors and/or detectors can be situated above, below, or to the side of the material bed. Above may be a direction opposite to the direction of the gravitational field and/or bottom of the enclosure. Below may be in the direction of the gravitational field and/or bottom of the enclosure (e.g., FIG. 6, 611). FIG. 17 shows an example of a system and apparatuses that can be used in the methods described herein, depicting sensors and/or detectors 1717 that are disposed at the bottom of the enclosure 1707. The one or more sensors and/or detectors may be embedded in any part of the enclosure. The one or more sensors and/or detectors may be situated above, below, or to the side of the platform (e.g., in FIG. 7 the platform includes a substrate 709 and a base 702). The one or more sensors and/or detectors may be embedded in the platform. For example, the one or more sensors and/or detectors may be embedded in the base. The one or more sensors and/or detectors may be embedded in the base while contacting (directly or indirectly) the material bed. Indirectly may comprise having one or more intervening surfaces and/or coatings (e.g., non-stick coating). FIG. 16 shows an example of a system and apparatuses that can be used in the methods described herein, in which an array of sensors and/or energy sources 1617 is disposed in the substrate 1609 that is located adjacent to the material bed 1604, and is separated from the material bed by the base 1602. The one or more sensors and/or detectors may be embedded in any wall of the enclosure, in the mechanisms within or outside of the enclosure, in the elevator translating the platform (e.g., FIG. 6, 612). The mechanism may comprise a material dispensing mechanism (e.g., FIG. 6, 616'), material leveling mechanism (e.g., FIG. 6, 617'), cooling member (e.g., FIG. 6, 613), energy source (e.g., FIG. 4, 400), or any combination thereof. The one or more sensors and/or detectors may be disposed inside and/or outside of the enclosure.

At least one surface of the platform (e.g., the surface that directly contacts the material bed) may comprise a self-cleaning surface. The self-cleaning surface may comprise a geometry that reduces (e.g., deters or hinders) adhesion to it. The self-cleaning surface may comprise a material that reduces adhesion of the transformed material and/or the non-transformed material (e.g., powder) to the surface. The self-cleaning surface may comprise a planar or non-planar surface. The self-cleaning surface may comprise a non-tacky surface. The self-cleaning surface may comprise lotus or shark-skin micro or nano-structure. The surface of the substrate may comprise protrusions or depressions that reduce adherence to the surface. At least one surface of the platform (e.g., the surface that directly contacts the material bed) may comprise tacky surface. The tacky surface may comprise a geometry that increases adhesion to it. The tacky surface may comprise a material that increases adhesion of the transformed material and/or the non-transformed material (e.g., powder) to the surface. The tacky surface may be magnetic. The tacky surface may comprise a planar or non-planar surface. The surface may comprise lotus or shark-skin micro or nano-structure. The surface may comprise protrusions or depressions that reduce adherence to the surface.

At least one of (e.g., both) the source and/or the detector may be embedded in the platform (e.g., in the base), walls of the enclosure, any other part within the enclosure, or any combination thereof. At least one of (e.g., both) the source and/or the detector may be stationary or moveable. At least one of (e.g., both) the source and/or the detector may be above, below, or to the side of the material bed.

Figure 22:
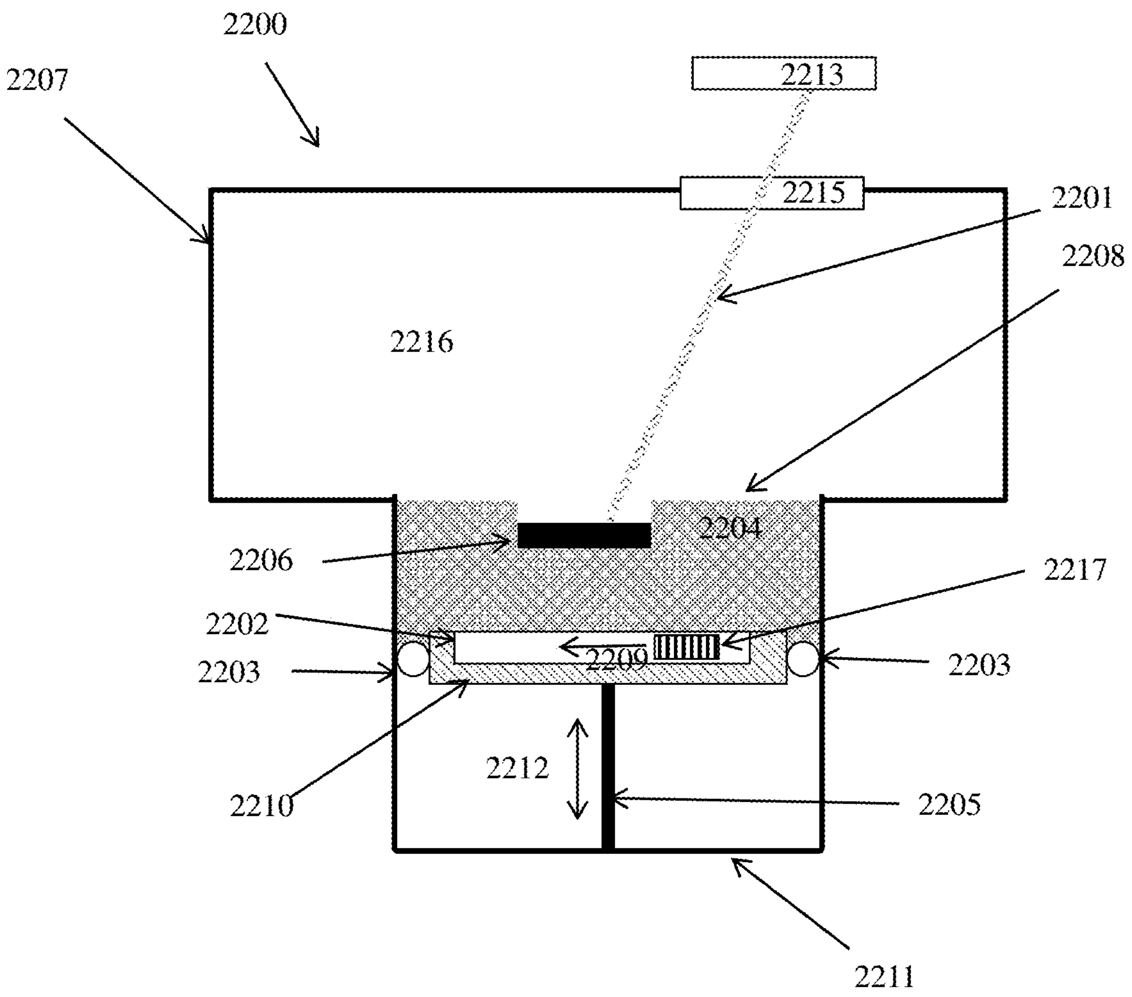
FIG. 22 shows a schematic of a system and apparatuses for forming a three-dimensional object by a three-dimensional printing methodology.

At least one of (e.g., both) the source and/or the detector may be embedded in the platform in a stationary manner (e.g., non-translatable). At least one of (e.g., both) the source and/or the detector may be embedded in the platform and be translatable within the platform. The translation may be in one or more channels (e.g., pipes) that are grafted into the platform. The channels may be covered (e.g., by a coating and/or a surface). The translation may be in a path (e.g., predetermined path) that is controlled (e.g., regulated and/or directed) by the controller. FIG. 22 shows an example of a sensor and/or energy source 2217 that is disposed in a channel 2202, shown as a vertical cross section. The sensor and/or energy source (e.g., transceiver) 2217 may travel along a path 2209. The sensor and/or energy source may be operatively coupled to the controller.

The material used herein may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The ceramic material may comprise cement. The ceramic material may comprise alumina. The material may comprise sand, glass, or stone. In some embodiments, the material may comprise an organic material, for example, a polymer or a resin. The organic material may comprise a hydrocarbon. The polymer may comprise styrene. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The solid material may comprise powder material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) or wires. The material may be an un-transformed material (e.g., powder), a transformed material (e.g., molten material), a hardened material (e.g., solid material), or any combination thereof.

At least parts of the layer can be transformed to a transformed material that may subsequently form at least a fraction (also used herein "a portion," or "a part") of a hardened (e.g., solidified) 3D object. At times a layer of transformed or hardened material may comprise a cross section of a 3D object (e.g., a horizontal cross section). At times a layer of transformed or hardened material may comprise a deviation from a cross section of a 3D object. The deviation may include vertical or horizontal deviation. An un-transformed material may be a powder material. An un-transformed material layer (or a portion thereof) can have a thickness of at least about 5 micrometers (μm), 10 μm, 50 μm, 100 μm, 150 μm, 200 μm, 300 μm, 400 μm, 500 μm, 600 μm, 700 μm, 80 μm, 900 μm, or 1000 μm. An un-transformed material layer (or a portion thereof) can have a thickness of at most about 1000 μm, 900 μm, 800 μm, 700 μm, 600 μm, 500 μm, 450 μm, 400 μm, 350 μm, 300 μm, 250 μm, 200 μm, 150 μm, 100 μm, 75 μm, 50 μm, 40 μm, 30 μm, 20 μm, 10 μm, or 5 μm. An un-transformed material layer (or a portion thereof) may have any value in between the aforementioned layer thickness values (e.g., from about 1000 μm to about 5 μm, 800 μm to about 5 μm, 600 μm to about 20 μm, 300 μm to about 30 μm, or 1000 μm to about 10 μm). The material composition of at least one layer within the material bed may differ from the material composition within at least one other layer in the material bed. The difference (e.g., variation) may comprise difference in crystal or grain structure. The variation may comprise variation in grain orientation, variation in material density, variation in the degree of compound segregation to grain boundaries, variation in the degree of element segregation to grain boundaries, variation in material phase, variation in metallurgical phase, variation in material porosity, variation in crystal phase, and variation in crystal structure. The microstructure of the printed object may comprise planar structure, cellular structure, columnar dendritic structure, or equiaxed dendritic structure.

The un-transformed materials of at least one layer in the material bed may differ in the fundamental length scale of its particles (e.g., powder particles) from the FLS of the un-transformed material within at least one other layer in the material bed. A layer may comprise two or more material types at any combination. For example, two or more elemental metals, two or more metal alloys, two or more ceramics, two or more allotropes of elemental carbon. For example an elemental metal and a metal alloy, an elemental metal and a ceramic, an elemental metal and an allotrope of elemental carbon, a metal alloy and a ceramic, a metal alloy and an allotrope of elemental carbon, a ceramic and an allotrope of elemental carbon. All the layers of un-transformed material deposited during the 3D printing process may be of the same material composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In a multiplicity (e.g., mixture) of un-transformed (e.g., powder) materials, one un-transformed material may be used as support (i.e., supportive powder), as an insulator, as a cooling member (e.g., heat sink), or as any combination thereof.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size disclosed herein. The one or more intervening layers can have a thickness less than or equal to about 1 millimeter (mm), 0.5 mm, or 0.1 mm. In an example, a first layer is adjacent to a second layer when the first layer is in direct contact with the second layer. In another example, a first layer is adjacent to a second layer when the first layer is separated from the second layer by a third layer.

The un-transformed material (e.g., powder material) can be chosen such that the material is the desired and/or otherwise predetermined material for the 3D object. In some cases, a layer of the 3D object comprises a single type of material. In some examples, a layer of the 3D object may comprise a single elemental metal type, or a single metal alloy type. In some examples, a layer within the 3D object may comprise several types of material (e.g., an elemental metal and an alloy, an alloy and a ceramic, an alloy and an allotrope of elemental carbon). In certain embodiments each type of material comprises only a single member of that type. For example: a single member of elemental metal (e.g., iron), a single member of metal alloy (e.g., stainless steel), a single member of ceramic material (e.g., silicon carbide or tungsten carbide), or a single member (e.g., an allotrope) of elemental carbon (e.g., graphite). In some cases, a layer of the 3D object comprises more than one type of material. In some cases, a layer of the 3D object comprises more than one member of a material type.

The elemental metal can be an alkali metal, an alkaline earth metal, a transition metal, a rare earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

The metal alloy can be an iron based alloy, nickel based alloy, cobalt based allow, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, ipad), air conditioning, generators, furniture, musical equipment, art, jewelry, cooking equipment, or sport gear. The metal (e.g., alloy or elemental) may comprise an alloy used for products for human or veterinary applications comprising implants, or prosthetics. The metal alloy may comprise an alloy used for applications in the fields comprising human or veterinary surgery, implants (e.g., dental), or prosthetics.

The alloy may include a super alloy. The alloy may include a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron alloy comprises Elinvar, Fernico, Ferroalloys, Inver, Iron hydride, Kovar, Spiegeleisen, Staballoy (stainless steel), or Steel. In some instances the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may include cast iron, or pig iron. The steel may include Bulat steel, Chromoly, Crucible steel, Damascus steel, Hadfield steel, High speed steel, HSLA steel, Maraging steel, Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may include 316L, or 316LVM. The steel may include 17-4 Precipitation Hardening steel (also known as type 630, a chromium-copper precipitation hardening stainless steel, 17-4PH steel).

The titanium-based alloys may include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances the titanium base alloy includes Ti-6Al-4V or Ti-6Al-7Nb.

The Nickel alloy may include Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The brass may include Nickel hydride, Stainless or Coin silver. The cobalt alloy may include Megallium, Stellite (e. g. Talonite), Ultimet, or Vitallium. The chromium alloy may include chromium hydroxide, or Nichrome.

The aluminum alloy may include AA-8000, Al—Li (aluminum-lithium), Alnico, Duralumin, Hiduminium, Kryron Magnalium, Nambe, Scandium-aluminum, or Y alloy. The magnesium alloy may be Elektron, Magnox, or T-Mg—Al—Zn (Bergman phase) alloy.

The copper alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu, or Speculum metal.

In some examples the material (e.g., powder material) comprises a material wherein its constituents (e.g., atoms or molecules) readily lose their outer shell electrons, resulting in a free flowing cloud of electrons within their otherwise solid arrangement. In some examples the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^8$ S/m, $5*10^8$ S/m, $1*10^7$ S/m, $5*10^7$ S/m, or $1*10^8$ S/m. The symbol "*" designates the mathematical operation "times," or "multiplied by." The high electrical conductivity can be any value between the aforementioned electrical conductivity values (e.g., from about $1*10^5$ S/m to about $1*10^8$ S/m). The low electrical resistivity may be at most about $1*10^{-5}$ ohm times meter (Ω*m), $5*10^{-6}$ Ω*m, $1*10^{-6}$ Ω*m, $5*10^{-7}$ Ω*m, $1*10^{-7}$ Ω*m, $5*10^{-8}$ Ω*m, or $1*10^{-8}$ Ω*m. The low electrical resistivity can be any value between the aforementioned electrical resistivity values (e.g., from about $1\times10^{-5}$ Ω*m to about $1\times10^{-8}$ Ω*m). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the aforementioned thermal conductivity values (e.g., from about 20 W/mK to about 1000 W/mK). The high density may be at least about 1.5 grams per cubic centimeter ($g/cm^3$), 2 $g/cm^3$, 3 $g/cm^3$, 4 $g/cm^3$, 5 $g/cm^3$, 6 $g/cm^3$, 7 $g/cm^3$, 8 $g/cm^3$, 9 $g/cm^3$, 10 $g/cm^3$, 11 $g/cm^3$, 12 $g/cm^3$, 13 $g/cm^3$, 14 $g/cm^3$, 15 $g/cm^3$, 16 $g/cm^3$, 17 $g/cm^3$, 18 $g/cm^3$, 19 $g/cm^3$, 20 $g/cm^3$, or 25 $g/cm^3$. The high density can be any value between the aforementioned density values (e.g., from about 1 g/cm 3 to about 25 $g/cm^3$).

A metallic material (e.g., elemental metal or metal alloy) can comprise small amounts of non-metallic materials, such as, for example, oxygen, sulfur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (on the basis of weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (on the basis of weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

The material may comprise a powder material. The material may comprise a solid material. The material may comprise one or more particles or clusters. The term "powder," as used herein, generally refers to a solid having fine particles. The particles may be solid particles. The powder may be a granulate material. The powder may also be referred to as "particulate material." Powders may be granular materials. The powder particles may comprise nanoparticles, microparticles, and/or mesoparticles. In some examples, a powder comprising particles having an average or a mean FLS of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, or 100 μm. The particles comprising the powder may have an average or mean FLS of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases the powder may have an average or mean FLS between any of the values (e.g., from about 5 nm to about 100 μm, from about 1 μm to about 100 μm, from about 15 μm to about 45 μm, from about 5 μm to about 80 μm, from about 20 μm to about 80 μm, or from about 500 nm to about 50 μm). In some examples, powders are particles having an average or mean FLS ranging from about 1 nanometers (nm) to about 1000 micrometers (microns), 500 microns, 400 microns, 300 microns, 200 microns, 100 microns, 50 microns, 40 microns, 30 microns, 20 microns, 10 microns, 1 micron, 500 nanometers (nm), 400 nm, 300 nm, 200 nm, 100 nm, 50 nm, 40 nm, 30 nm, 20 nm, or 10 nm.

The powder can be composed of individual particles. The individual particles can be spherical, oval, prismatic, cubic, or irregularly shaped. The particles can have a FLS. The powder can be composed of a homogenously shaped particle mixture such that all of the particles have substantially the same shape and FLS magnitude within at most 1%, 5%, 8%, 10%, 15%, 20%, 25%, 30%, 35%, 40%, 50%, 60%, or 70%, distribution of FLS. In some cases the powder can be a heterogeneous mixture such that the particles have variable shape and/or FLS magnitude.

Powders can be formed of a material selected from polymer, elemental metal, metal alloy, ceramic and elemental carbon. For example, the powder can be formed from nickel, Inconel, maraging steel, and/or stainless steel. In an example, a powder is formed of individual carbon particles (e.g., graphite). In another example, a powder is formed of individual titanium, AlOx or SiOx particles.

Figure 6:
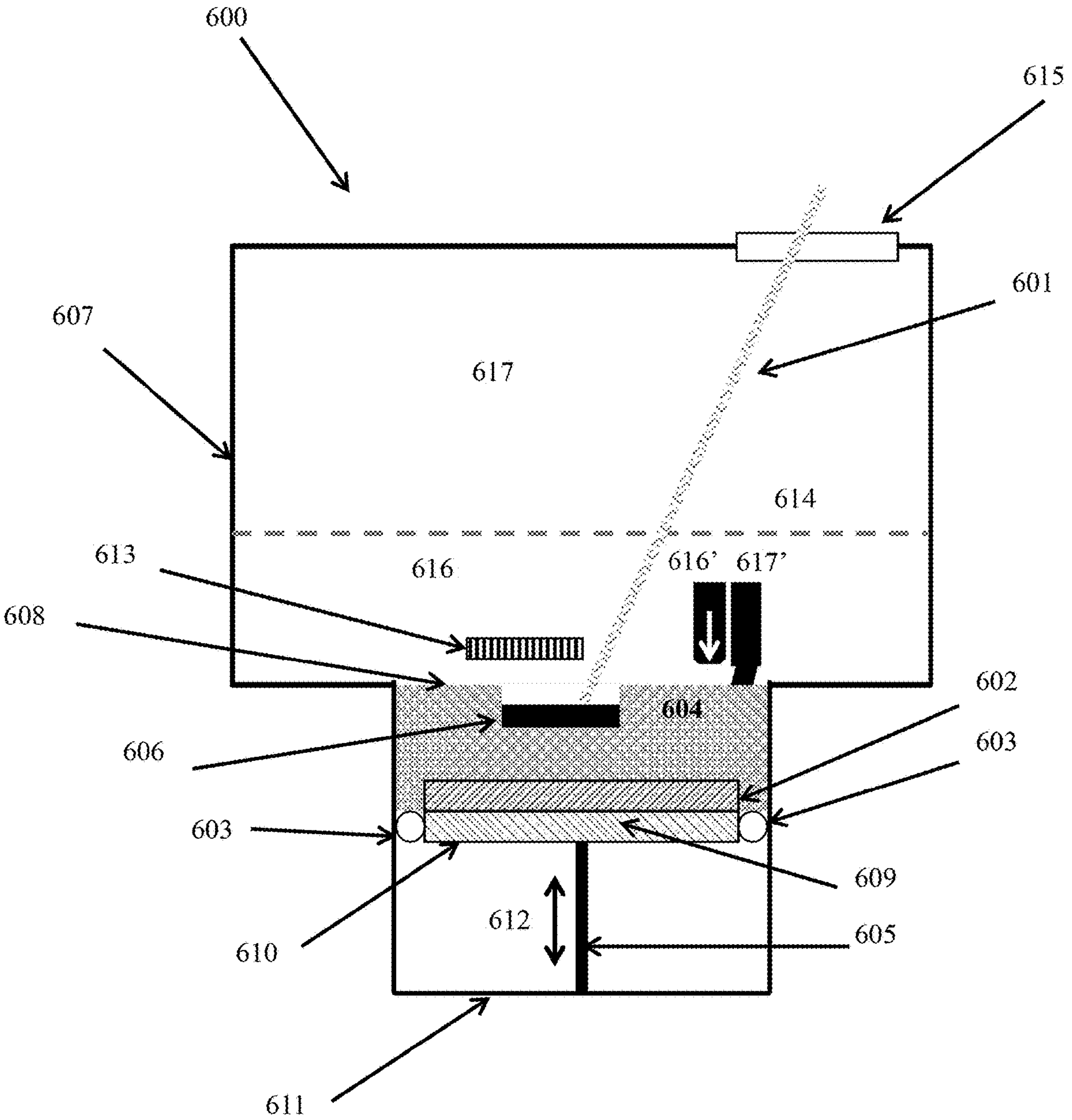
FIG. 6 shows a schematic of a system and apparatuses for forming a three-dimensional object by a three-dimensional printing methodology.
Figure 7:
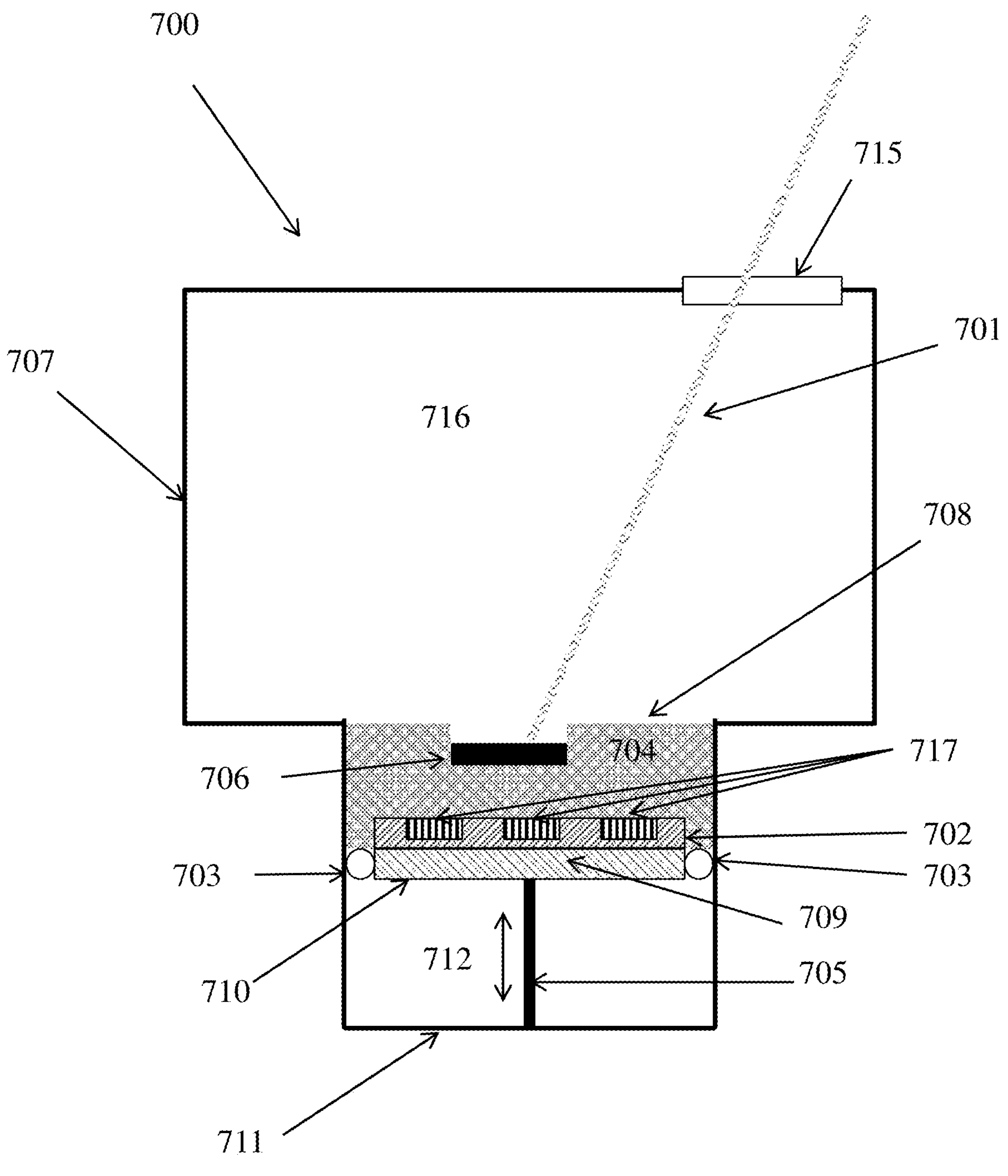
FIG. 7 shows a schematic of a system and apparatuses for forming a three-dimensional object by a three-dimensional printing methodology.

FIG. 6 depicts an example of a system that can be used to generate a 3D object using a 3D printing process disclosed herein. The system can include an enclosure (e.g., a chamber 607). At least a fraction of the components in the system can be enclosed in the chamber. At least a fraction of the chamber can be filled with a gas to create a gaseous environment (i.e., an atmosphere). The gas can be an inert gas (e.g., Argon, Neon, Helium, Nitrogen). The chamber can be filled with another gas or mixture of gases. The gas can be a non-reactive gas (e.g., an inert gas). The gaseous environment can comprise argon, nitrogen, helium, neon, krypton, xenon, hydrogen, carbon monoxide, or carbon dioxide. The pressure in the chamber can be at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or more. The pressure in the chamber can be at least 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at most $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at a range between any of the aforementioned pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The pressure can be measured by a pressure gauge. The pressure can be measured at ambient temperature (e.g., R.T.). In some cases the pressure in the chamber can be standard atmospheric pressure. In some cases the pressure in the chamber can be ambient pressure (i.e., neutral pressure). In some examples, the chamber can be under vacuum pressure. In some examples, the chamber can be under a positive pressure (i.e., above ambient pressure).

The chamber can comprise two or more gaseous layers. The gaseous layers can be separated by molecular weight or density such that a first gas with a first molecular weight or density is located in a first region below the imaginary line FIG. 6, 614, and a second gas with a second molecular weight or density is located in a second region of the chamber above the imaginary line 614. The first molecular weight or density may be smaller than the second molecular weight or density. The first molecular weight or density may be larger than the second molecular weight or density. The gaseous layers can be separated by temperature. The first gas can be in a lower region of the chamber relative to the second gas. The second gas and the first gas can be in adjacent locations. The second gas can be on top of, over, and/or above the first gas. In some cases the first gas can be argon and the second gas can be helium. The molecular weight or density of the first gas can be at least about 1.5*, 2*, 3*, 4*, 5*, 10*, 15*, 20*, 25*, 30*, 35*, 40*, 50*, 55*, 60*, 70*, 75*, 80*, 90*, 100*, 200*, 300*, 400*, or 500* larger or greater than the molecular weight or density of the second gas (e.g., measured at ambient temperature). "*" used herein designates the mathematical operation "times." The molecular weight of the first gas can be higher than the molecular weight of air. The molecular weight or density of the first gas can be higher than the molecular weight or density of oxygen gas (e.g., $O_2$). The molecular weight or density of the first gas can be higher than the molecular weight or density of nitrogen gas (e.g., N 2). At times, the molecular weight or density of the first gas may be lower than that of oxygen gas or nitrogen gas.

The first gas with the relatively higher molecular weight or density can fill a region of the system where at least a fraction of the powder is stored. The second gas with the relatively lower molecular weight or density can fill a region of the system and/or apparatus (e.g., 604) where the 3D object is formed. The material layer can be supported on a substrate (e.g., 609). The substrate can have a circular, rectangular, square, or irregularly shaped cross-section. The substrate may comprise a base disposed above the substrate. The substrate may comprise a base (e.g., 602) disposed between the substrate and a material layer (or a space to be occupied by a material layer). A thermal control unit (e.g., a cooling member such as a heat sink or a cooling plate, a heating plate, or a thermostat 613) can be provided inside of the region where the 3D object is formed or adjacent to (e.g., above) the region where the 3D object is formed. Additionally or alternatively, the thermal control unit can be provided outside of the region where the 3D object is formed (e.g., at a predetermined distance). In some cases the thermal control unit can form at least one section of a boundary region where the 3D object is formed (e.g., the container accommodating the powder bed).

The concentration of oxygen and/or humidity in the enclosure (e.g., chamber) can be minimized (e.g., below a predetermined threshold value). For example, the gas composition of the chamber can contain a level of oxygen and/or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chamber can contain an oxygen and/or humidity level between any of the aforementioned values (e.g., from about 100 ppb to about 0.001 ppm, from about 1 ppb to about 0.01 ppm, or from about loom to about 0.1 ppm). The gas composition may be measures by one or more sensors (e.g., an oxygen and/or humidity sensor.). In some cases, the chamber can be opened at the completion of a formation of a 3D object. When the chamber is opened, ambient air containing oxygen and/or humidity can enter the chamber. Exposure of one or more components inside of the chamber to air can be reduced by, for example, flowing an inert gas while the chamber is open (e.g., to prevent entry of ambient air), or by flowing a heavy gas (e.g., argon) that rests on the surface of the powder bed. In some cases, components that absorb oxygen and/or humidity on to their surface(s) can be sealed while the chamber is open.

The chamber can be configured such that gas inside of the chamber has a relatively low leak rate from the chamber to an environment outside of the chamber. In some cases the leak rate can be at most about 100 milliTorr/minute (mTorr/min), 50 mTorr/min, 25 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the aforementioned leak rates (e.g., from about 0.0001 mTorr/min to about, 100 mTorr/min, from about 1 mTorr/min to about, 100 mTorr/min, or from about 1 mTorr/min to about, 100 mTorr/min). The leak rate may be measured by one or more pressure gauges and/or sensors (e.g., at ambient temperature). The enclosure can be sealed such that the leak rate of gas from inside the chamber to an environment outside of the chamber is low (e.g., below a certain level). The seals can comprise O-rings, rubber seals, metal seals, load-locks, or bellows on a piston. In some cases the chamber can have a controller configured to detect leaks above a specified leak rate (e.g., by using at least one sensor). The sensor may be coupled to a controller. In some instances, the controller is able to identify and/or control (e.g., direct and/or regulate). For example, the controller may be able to identify a leak by detecting a decrease in pressure in side of the chamber over a given time interval.

One or more of the system components can be contained in the enclosure (e.g., chamber). The enclosure can include a reaction space that is suitable for introducing precursor to form a 3D object, such as powder material. The enclosure can contain the platform. In some cases the enclosure can be a vacuum chamber, a positive pressure chamber, or an ambient pressure chamber. The enclosure can comprise a gaseous environment with a controlled pressure, temperature, and/or gas composition. The gas composition in the environment contained by the enclosure can comprise a substantially oxygen free environment. For example, the gas composition can contain at most at most about 100,000 parts per million (ppm), 10,000 ppm, 1000 ppm, 500 ppm, 400 ppm, 200 ppm, 100 ppm, 50 ppm, 10 ppm, 5 ppm, 1 ppm, 100,000 parts per billion (ppb), 10,000 ppb, 1000 ppb, 500 ppb, 400 ppb, 200 ppb, 100 ppb, 50 ppb, 10 ppb, 5 ppb, 1 ppb, 100,000 parts per trillion (ppt), 10,000 ppt, 1000 ppt, 500 ppt, 400 ppt, 200 ppt, 100 ppt, 50 ppt, 10 ppt, 5 ppt, or 1 ppt oxygen. The gas composition in the environment contained within the enclosure can comprise a substantially moisture (e.g., water) free environment. The gaseous environment can comprise at most about 100,000 ppm, 10,000 ppm, 1000 ppm, 500 ppm, 400 ppm, 200 ppm, 100 ppm, 50 ppm, 10 ppm, 5 ppm, 1 ppm, 100,000 ppb, 10,000 ppb, 1000 ppb, 500 ppb, 400 ppb, 200 ppb, 100 ppb, 50 ppb, 10 ppb, 5 ppb, 1 ppb, 100,000 ppt, 10,000 ppt, 1000 ppt, 500 ppt, 400 ppt, 200 ppt, 100 ppt, 50 ppt, 10 ppt, 5 ppt, or 1 ppt water. The gaseous environment can comprise a gas selected from the group consisting of argon, nitrogen, helium, neon, krypton, xenon, hydrogen, carbon monoxide, carbon dioxide, and oxygen. The gaseous environment can comprise air. The chamber pressure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 760 Torr, 1000 Torr, 1100 Torr, 2 bar, 3 bar, 4 bar, 5 bar, or 10 bar. The chamber pressure can be of any value between the afore-mentioned chamber pressure values (e.g., from about $10^{-7}$ Torr to about 10 bar, from about $10^{-7}$ Torr to about 1 bar, or from about 1 bar to about 10 bar). In some cases the enclosure pressure can be standard atmospheric pressure. The gas can be an ultrahigh purity gas. For example, the ultrahigh purity gas can be at least about 99%, 99.9%, 99.99%, or 99.999% pure. The gas may comprise less than about 2 ppm oxygen, less than about 3 ppm moisture, less than about 1 ppm hydrocarbons, or less than about 6 ppm nitrogen.

The enclosure can be maintained under vacuum or under an inert, dry, non-reactive and/or oxygen reduced (or otherwise controlled) atmosphere (e.g., a nitrogen ($N_2$), helium (He), or argon (Ar) atmosphere). In some examples, the enclosure is under vacuum. In some examples, the enclosure is under pressure of at most about 1 Torr, $10^{-3}$ Torr, $10^{-6}$ Torr, or $10^{-8}$ Torr. The atmosphere can be provided by providing an inert, dry, non-reactive, and/or oxygen reduced gas (e.g., Ar) and/or flowing the gas through the chamber.

In some examples, a pressure system is in fluid communication with the enclosure. The pressure system can be configured to regulate the pressure in the enclosure. In some examples, the pressure system includes one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves, such as throttle valves. The pressure system can include a pressure sensor for measuring the pressure of the chamber and relaying the pressure to the controller, which can regulate the pressure with the aid of one or more vacuum pumps of the pressure system. The pressure sensor can be coupled to a control system. The pressure can be electronically or manually controlled.

The system and/or apparatus components described herein can be adapted and configured to generate a 3D object. The 3D object can be generated through a 3D printing process. A first layer of material can be provided adjacent to a platform (e.g., base, substrate, and/or bottom of the enclosure). A platform can be formed of a previously formed layer of the 3D object or any other surface upon which a layer or bed of material is spread, held, placed, or supported. The first layer of hardened material can be formed in the material bed without a platform, without one or more auxiliary support features (e.g., rods), and/or without other supporting structure other than the un-transformed material (e.g., within the material bed. E.g., powder). Subsequent layers can be formed such that at least one portion of the subsequent layer melts, sinters, fuses, binds and/or otherwise connects to the at least a portion of a previously formed layer. In some instances, the at least a portion of the previously formed layer that is transformed and subsequently hardens into a hardened material, acts as a platform for formation of the 3D object. In some cases the first layer of hardened material comprises at least a portion of the platform. The un-transformed material may comprise any material type described herein. The un-transformed material layer can comprise particles of homogeneous or heterogeneous size and/or shape.

A platform can be a sheet. A platform can be flexible. A platform can be a sheet that is not a bulk material. A platform can be a substantially thin fabric of fibers, a net, a mesh or other substantially thin structure that can form a carrier on which one or more three-dimensional objects are formed.

The term "platform," as used herein, generally refers to any work piece on which an object is formed on or from. A platform (or platform plate) can include, without limitation, silicon, germanium, silica, sapphire, zinc oxide, carbon (e.g., graphene), SiC, AlN, GaN, spinel, coated silicon, silicon on oxide, silicon carbide on oxide, glass, gallium nitride, indium nitride, titanium dioxide, aluminum nitride, a ceramic material (e.g., alumina, AlN), a metallic material (e.g., molybdenum, tungsten, copper, aluminum), and combinations (or alloys) thereof. In some cases, a platform is part of a susceptor. In some examples, a platform is formed of steel, stainless steel, or a titanium alloy.

The 3D printing system and/or apparatus may comprise at least one detector (e.g., sensor). The sensor may be embedded in the enclosure or any part thereof. The sensor may be embedded in the platform (e.g., base, substrate, or bottom of the enclosure). The sensors may make up the platform. The sensor may be embedded in the wall of the enclosure. The platform may be a building platform and/or a supportive platform. The platform may be planar, flat, smooth, rough, non-flat, or any combination thereof. In some examples, at least one sensor may contact the material bed. The at least one sensor may contact the untransformed material. The at least one sensor may be included in the platform surface that contacts the material bed. In some examples, the at least one sensor may not contact the material bed. In some examples, the at least one sensor may not be embedded in the enclosure or any part thereof (e.g., the platform). In some embodiments, the at least one sensor may reside outside of the enclosure.

The un-transformed material within the material bed (e.g., powder) can be configured to provide support to the 3D object. For example, the supportive powder may be of the same type of powder from which the 3D object is generated, of a different type, or any combination thereof. In some instances, a low flowability powder can be capable of supporting a 3D object better than a high flowability powder. A low flowability powder can be achieved inter alia with a powder composed of relatively small particles, with particles of non-uniform size or with particles that attract each other. The powder may be of low, medium, or high flowability. The powder material may have compressibility of at least about 1%, 2%, 3%, 4%, 5%, 6%, 7%, 8%, 9%, or 10% in response to an applied force of 15 kilo Pascals (kPa). The powder may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The powder may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The powder may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The powder may have basic flow energy in between the above listed values of basic flow energy (e.g., from about 100 mj to about 1000 mJ, from about 100 mj to about 600 mJ, or from about 500 mj to about 1000 mJ). The powder may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The powder may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The powder may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

The 3D object can have one or more auxiliary features. The auxiliary feature(s) can be supported by the material (e.g., powder) bed. The term "auxiliary features," as used herein, generally refers to features that are part of a printed 3D object, but are not part of the desired, intended, designed, ordered, modeled, or final 3D object. Auxiliary features (e.g., auxiliary supports) may provide structural support during and/or subsequent to the formation of the 3D object. Auxiliary features may enable the removal or energy from the 3D object that is being formed. Examples of auxiliary features comprise heat fins, wires, anchors, handles, supports, pillars, columns, frame, footing, scaffold, flange, projection, protrusion, mold (a.k.a. mould), or other stabilization features. In some instances, the auxiliary support is a scaffold that encloses the 3D object or part thereof. The scaffold may comprise lightly sintered or lightly fused powder material. The 3D object can have auxiliary features that can be supported by the material bed (e.g., powder bed) and not touch the base, substrate, container accommodating the material bed, or the bottom of the enclosure. The 3D part (3D object) in a complete or partially formed state can be completely supported by the material bed (e.g., without touching the substrate, base, container accommodating the powder bed, or enclosure). The 3D object in a complete or partially formed state can be completely supported by the powder bed (e.g., without touching anything except the powder bed). The 3D object in a complete or partially formed state can be suspended in the powder bed without resting on any additional support structures. In some cases, the 3D object in a complete or partially formed (i.e., nascent) state can freely float (e.g., anchorless) in the material bed.

The printed 3D object may be printed without the use of auxiliary features, may be printed using a reduced amount of auxiliary features, or printed using spaced apart auxiliary features. In some embodiments, the printed 3D object may be devoid of one or more auxiliary support features or auxiliary support feature marks that are indicative of a presence or removal of the auxiliary support features. The 3D object may be devoid of one or more auxiliary support features and of one or more marks of an auxiliary feature (including a base structure) that was removed (e.g., subsequent to, or contemporaneous with, the generation of the 3D object). The printed 3D object may comprise a single auxiliary support mark. The single auxiliary feature (e.g., auxiliary support or auxiliary structure) may be a platform (e.g., a building platform such as a base or substrate), or a mold. The auxiliary support may be adhered to the platform or mold. The 3D object may comprise marks belonging to one or more auxiliary structures. The 3D object may comprise two or more marks belonging to auxiliary features. The 3D object may be devoid of marks pertaining to an auxiliary support. The 3D object may be devoid of an auxiliary support. The mark may comprise variation in grain orientation, variation in layering orientation, layering thickness, material density, the degree of compound segregation to grain boundaries, material porosity, the degree of element segregation to grain boundaries, material phase, metallurgical phase, crystal phase, or crystal structure; wherein the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support (e.g., by a mold). For example, a mark may be a point of discontinuity that is not explained by the geometry of the 3D object, which does not include any auxiliary supports. A mark may be a surface feature that cannot be explained by the geometry of a 3D object, which does not include any auxiliary supports (e.g., a mold). The two or more auxiliary features or auxiliary support feature marks may be spaced apart by a spacing distance of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of at most 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of any value between the aforementioned auxiliary support space values (e.g., from 1.5 mm to 500 mm, from 2 mm to 100 mm, from 15 mm to 50 mm, or from 45 mm to 200 mm). Collectively referred to herein as the "auxiliary feature spacing distance."

Provided herein are systems, apparatuses, and methods for monitoring a manufacturing process. The manufacturing process can be a three-dimensional printing process. The manufacturing process can be an additive manufacturing process. The manufacturing process can be monitored in real time. In some cases, the manufacturing process can be monitored non-invasively such that the manufacturing process is undisturbed while one or more measurements are collected to monitor the manufacturing process. The manufacturing process can be monitored (e.g., adjusted, regulated, and/or directed) with a feedback loop. The adjustment may arise when an error (e.g. deviation, non-uniformity, adverse condition, and/or mistake) is detected, the error can be corrected. The adjustment may arise when a collected signal (e.g., by a detector) deviates from an emitted signal (e.g., by an energy source). The correction may include adjusting a characteristic of the energy beam that is used in the generation of the three-dimensional object. The correction may include a location on a material (e.g., powder) bed at which energy is supplied, the rate at which energy is supplied, or the powder at which energy is supplied. The error can be identified by comparing one or more measurements to a model of the three-dimensional object. The model can be a computation model comprising parameters that can define a correct state and/or condition at one or more intermediate and/or complete stages in the manufacturing process. In some cases the error can be analyzed and/or quantified. In some cases, when the error exceeds a predetermined threshold, the manufacturing process can be aborted, or paused.

In some cases, the manufacturing process can be an additive printing process. A one, two, and/or three-dimensional object can be generated in the additive printing process by sequentially providing energy to one or more powder layers. FIG. 1 shows a schematic of a system that can additively generate a three-dimensional object (not shown). The system can comprise a platform (e.g., a base) 101. The platform can be a support structure. The platform 101 can accept a pre-transformed material (e.g., powder) to provide a material bed 102. The material bed 102 can include particles having a material selected from the group consisting of polymer, elemental metal, metal alloy, ceramic, and elemental carbon (e.g., an allotrope of elemental carbon). In some cases the material can be a mixture of particles of different materials and/or particle sizes. The particles can have a spherical, prismatic, or irregular shape. The particles can have a monodisperse size distribution such that all of the particles have substantially equal dimension, where dimension is a fundamental length scale of the particle shape (e.g., diameter, spherical equivalent diameter, length, or width). In some cases, the particles can have a polydisperse size distribution such that the at least a fraction of the particles have different dimensions. The particles can have a diameter of at most about 100 micrometers (μm), 75 μm, 50 μm, 40 μm, 30 μm, 20 μm, 10 μm, 9 μm, 8 μm, 7 μm, 6 μm, 5 μm, 4 μm, 3 μm, 2 μm, 1 μm, 0.5 μm, 0.1 μm, 0.05 μm, 0.01 μm, or 0.005 μm. In some cases, the particles can have a diameter greater than 100.

The system can further comprise a pre-transformed material source 103 (e.g., material dispenser). The pre-transformed material source can be adjacent to the material bed 102. Pre-transformed material source can be adjacent to an exposed surface of the material bed. Adjacent can be above, below, or to the side. The pre-transformed material source can be a container or reservoir configured to hold a volume of pre-transformed material. Pre-transformed material from the pre-transformed material source can be moved from the pre-transformed material source to the material bed. Pre-transformed material from the pre-transformed material source can be arranged in a layer on a surface of the material bed. The layer can have a uniform or non-uniform thickness. Pre-transformed material layers can be provided from the pre-transformed material source on a surface of the material bed sequentially to generate at least one 3D object (or parts thereof) in an additive manufacturing process. Pre-transformed material (e.g., powder) can be moved from the pre-transformed material source to the material bed by a leveling mechanism, for example, a rake, plough, or roller. The pre-transformed material source may be included in a layer dispensing mechanism. The layer dispensing mechanism (e.g., recoater) may include at least two of a material removal mechanism, a material leveling mechanism, and a material dispensing mechanism. An example of a layer dispensing mechanism and any parts thereof can be found in PCT application number PCT/US15/36802 titled "APPARATUSES, SYSTEMS AND METHODS FOR THREE-DIMENSIONAL PRINTING" that was filed on Jun. 19, 2015, which is entirely incorporated herein by reference. The leveling mechanism may shear the material bed using a blade and/or an air knife. The material removal system may level (e.g., make planar and/or make flat) the exposed surface of the material bed without contacting the exposed surface of the material bed. The material removal system may level the exposed surface of the material bed without contacting the material bed. Material from the material bed may be attracted to the material removal mechanism using a force comprising a mechanical, vacuum, electric, or magnetic force. The material removal system may be separated from the exposed surface of the material bed by a gap. The gap may be adjustable (e.g., manually or by a control mechanism).

Figure 25A:
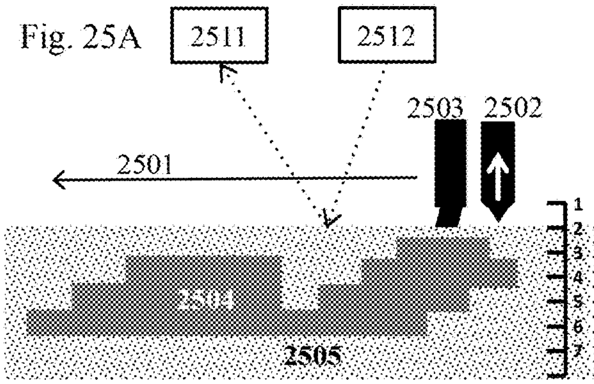
FIGS. 25A-25F show various schematic vertical cross sections of a three-dimensional object in a material bed.
Figure 25D:
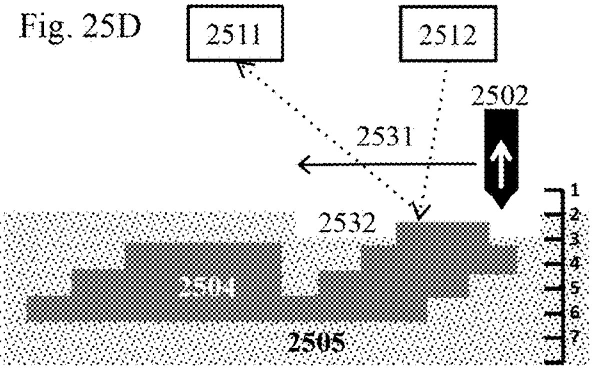
Figure 25B:
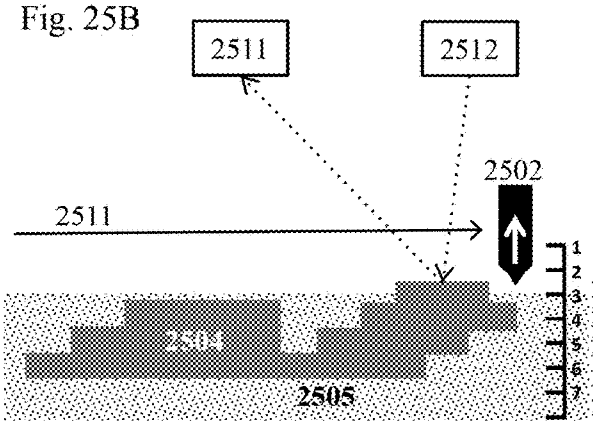
Figure 25E:
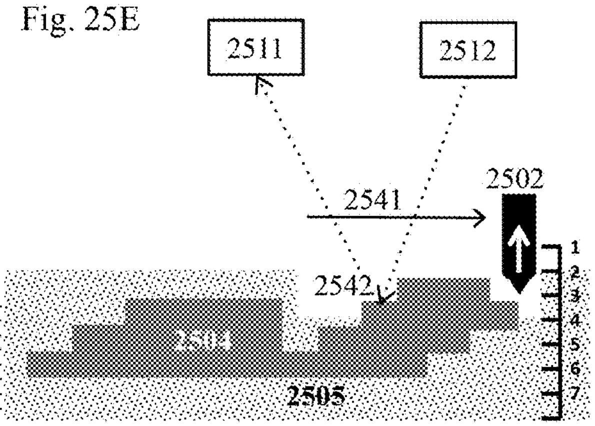
Figure 25C:
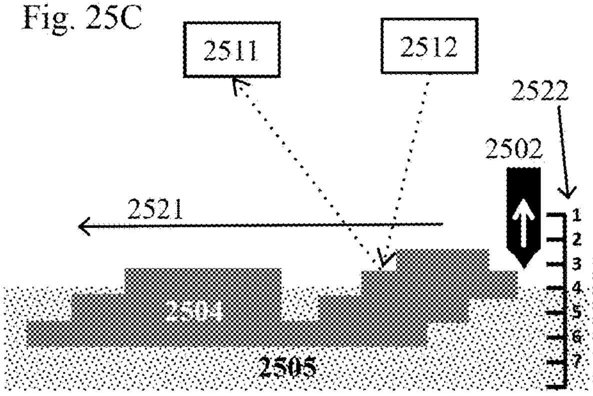
Figure 25F:
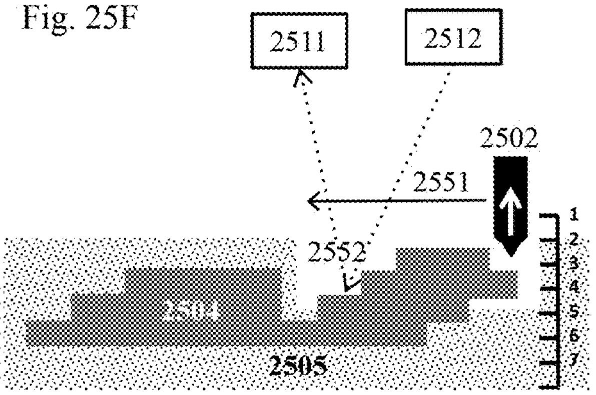

The layer dispensing mechanism may expose the material bed (e.g., powder bed) to reveal at least a portion of a 3D object embedded within a material bed. FIGS. 25A-25F show examples of various stages in the exposure of a portion of a three dimensional object 2504 that is embedded in a material bed 2505. The exposure may comprise using the leveling mechanism and/or the material removal mechanism. The layer dispensing mechanism may remove at least a portion of a layer (e.g., an entire layer). FIG. 25A shows an example of a leveling member 2503 and a material removal mechanism 2502 that level the exposed surface of the material bed by translating the direction 2501. FIG. 25B shows an example of a material removal mechanism 2502 that levels the exposed surface of the material bed by translating the direction 2511, thus exposing a top portion of the 3D object 2504. The layer dispensing mechanism may remove a predetermined height of the material bed. The predetermined height in each removal round may be substantially similar. The predetermined height in at least one removal round may be different from a second removal round. In the examples shown in FIGS. 25A-25B, the layer dispensing mechanism removes one ruler digit, as depicted according to the digits next to ruler 2522. The layer dispensing mechanism may remove a layer of material of a substantially fixed height (e.g., predetermined height) from material bed. The removal may be sequential (e.g., remove one layer height at a time). The removal may be during the printing process of the 3D object. The removal may be subsequent to completion of at least a layer of hardened material. The removal may expose at least a portion of the layer of hardened material. FIGS. 25D-25F show examples in which a portion of the exposed surface of the material bed is removed. The removal may result in a new (e.g., portion of the) exposed surface that is of a lower height as compared to the original exposed surface of the material bed. FIG. 25A shows an example of an initial height of the material bed (e.g., corresponding to digit 2 in the ruler). FIG. 25B shows an example of a subsequent height of the material bed after removal of one layer (e.g., corresponding to digit 3 in the ruler). FIG. 25B shows an example of a position that is irradiated by an energy beam emitted from an energy beam source 2512, which position is disposed within an exposed portion of the 3D object 2504, wherein the 3D object is mostly embedded in the material bed 2505. During and/or after the removal, at least a portion of the 3D object may be revealed. The height of various positions on the exposed 3D object portion may be measured (e.g., using a method described herein), as well as the overall shape of the exposed 3D object section. FIG. 25C shows an example of an energy source 2512 that irradiates an energy beam towards an exposed surface of the 3D object, which energy beam is reflected and sensed by a sensor 2511. The measurements may add up to a layered imaging of the formed 3D object, as layers of the material bed (that were not transformed to form the 3D object) are removed. The sequential removal of layers of the material bed may provide a leveled (e.g., digitized) height image in situ. The leveled image may be formed subsequent to the completion of the 3D printing process. The leveled image may be formed during an intermission of the 3D printing process. After the intermission and creation (e.g., and evaluation) of the leveled image, the 3D object portion can be embedded with a fresh layer of pre-transformed material (e.g., powder) such that it is substantially embedded with the material layer, and the 3D printing process may resume. The energy beam may be the energy beam that transforms at least a portion of the material bed to form a transformed material. The energy beam may be an energy beam different from the energy beam that transforms at least a portion of the material bed to form a transformed material. In some instances, only a portion of the material bed is removed to expose only a portion in an area of the 3D object. The sequence of FIGS. 25D-25F shows an example in which only a portion of the material bed is removed to form a gradually growing void (e.g., 2532, 2542 and 2552) that exposes a portion of the 3D object in sequential layers, wherein the surface of the exposed 3D object may be sequentially sensed (e.g., imaged). The removed (e.g., evacuated) layers (or layer portions) may correspond to the layers of the 3D object. The height of the removed layers (or layer portions) may differ from the height of the layers composing the 3D object. The height of the removed (e.g., evacuated) layers (or layer portions) may correspond to the height of the layers of the 3D object. The height of the removed layers (or layer portions) may differ from the height of the layers of the 3D object.

The system and/or apparatus described herein may comprise at least one energy source. The first energy source may project a first energy (e.g., first energy beam). The first energy beam may travel along a path. The path may be predetermined (e.g., by the controller). The apparatuses may comprise at least a second energy source. The second energy source may generate a second energy (e.g., second energy beam). The first and/or second energy may transform at least a portion of the un-transformed material in the material bed to a transformed material. In some embodiments, the first and/or second energy source may heat but not transform at least a portion of the un-transformed material in the material bed. In some cases, the system can comprise 1, 2, 3, 4, 5, 6, 7, 8, 9, 10, 30, 100, 300, 1000 or more energy beams and/or sources. The system can comprise an array of energy sources (e.g., laser diode array). Alternatively or additionally the target surface, material bed, 3D object (or part thereof), or any combination thereof may be heated by a heating mechanism. The heating mechanism may comprise dispersed energy beams. In some cases the at least one energy source is a single (e.g., first) energy source. FIG. 22 shows an example of a second energy beam 2201 that is generated by a second energy source 2213.

An energy source can be a source configured to deliver energy to an area (e.g., a confined area). An energy source can deliver energy to the confined area through radiative heat transfer. The energy source can project energy (e.g., heat energy, and/or energy beam). The energy (e.g., beam) can interact with at least a portion of the material in the material bed. The energy can heat the material in the material bed before, during and/or after the material is being transformed. The energy can heat at least a fraction of a 3D object at any point during formation of the 3D object. Alternatively or additionally, the material bed may be heated by a heating mechanism projecting energy (e.g., radiative heat and/or energy beam). The energy may include an energy beam and/or dispersed energy (e.g., radiator or lamp). The energy may include radiative heat. The radiative heat may be projected by a heating mechanism comprising a lamp, a strip heater (e.g., mica strip heater, or any combination thereof), a heating rod (e.g., quartz rod), or a radiator (e.g., a panel radiator). The heating mechanism may comprise an inductance heater. The heating mechanism may comprise a resistor (e.g., variable resistor). The resistor may comprise a varistor or rheostat. A multiplicity of resistors may be configured in series, parallel, or any combination thereof. In some cases the system can have a single (e.g., first) energy source. An energy source can be a source configured to deliver energy to an area (e.g., a confined area). An energy source can deliver energy to the confined area through radiative heat transfer (e.g., as described herein).

The energy beam may include a radiation comprising an electromagnetic, or charged particle beam. The energy beam may include radiation comprising electromagnetic, electron, positron, proton, plasma, or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area. In some embodiments, the energy source can be a laser source. The laser source may comprise a $CO_2$, Nd:YAG, Neodymium (e.g., neodymium-glass), or an Ytterbium laser. The energy source may include an energy source capable of delivering energy to a point or to an area. The energy source can provide an energy beam having an energy density of at least about 50 joules/cm$^2$ (J/cm$^2$), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of an value between the aforementioned values (e.g., from about 50 J/cm$^2$ to about 5000 J/cm$^2$, from about 200 J/cm$^2$ to about 1500 J/cm$^2$, from about 1500 J/cm$^2$ to about 2500 J/cm$^2$, from about 100 J/cm$^2$ to about 3000 J/cm$^2$, or from about 2500 J/cm$^2$ to about 5000 J/cm$^2$). In an example a laser can provide light energy at a peak wavelength of at least about 100 nanometer (nm), 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy beam (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy beam may have a power between any of the afore-mentioned laser power values (e.g., from about 0.5 W to about 100 W, from about 1 W to about 10 W, from about 100 W to about 1000 W, or from about 1000 W to about 4000 W).

An energy beam from the energy source(s) can be incident on, or be directed perpendicular to, the target surface. An energy beam from the energy source(s) can be directed at an acute angle within a value of from parallel to perpendicular relative to the target surface. The energy beam can be directed onto a specified area of at least a portion of the source surface and/or target surface for a specified time period. The material in target surface (e.g., powder material such as in a top surface of a powder bed) can absorb the energy from the energy beam and, and as a result, a localized region of the solid material can increase in temperature. The energy beam can be moveable such that it can translate relative to the source surface and/or target surface. The energy source may be movable such that it can translate relative to the target surface. The energy beam(s) can be moved via a scanner (e.g., as disclosed herein). At least two (e.g., all) of the energy sources can be movable with the same scanner. A least two (e.g., all) of the energy beams can be movable with the same scanner. At least two of the energy source(s) and/or beam(s) can be translated independently of each other. In some cases at least two of the energy source(s) and/or beam(s) can be translated at different rates (e.g., velocities). In some cases at least two of the energy source(s) and/or beam(s) can be comprise at least one different characteristic. The characteristics may comprise wavelength, power, amplitude, trajectory, footprint, dwell time, intensity, energy, or charge. The charge can be electrical and/or magnetic charge. The characteristics may be adjustable (e.g., by a controller). The characteristics may be adjustable based on a signal from the detector.

The energy source and/or detector can be an array, or a matrix, of energy sources (e.g., laser diodes). Each of the energy sources in the array, or matrix, can be independently controlled (e.g., by a control mechanism) such that the energy beams can be turned off and on independently. At least a part of the energy sources in the array or matrix can be collectively controlled such that the at least two (e.g., all) of the energy sources can be turned off and on simultaneously. The energy per unit area or intensity of at least two energy sources in the matrix or array can be modulated independently (e.g., by a control mechanism or system). At times, the energy per unit area or intensity of at least two (e.g., all) of the energy sources in the matrix or array can be modulated collectively (e.g., by a control mechanism). The energy source can scan along the source surface and/or target surface by mechanical movement of the energy source (s), one or more adjustable reflective mirrors, or one or more polygon light scanners. The energy source(s) can project energy using a DLP modulator, a one-dimensional scanner, a two-dimensional scanner, or any combination thereof. The energy source(s) can be stationary. The target and/or source surface can translate vertically, horizontally, or in an angle (e.g., planar or compound).

The energy source can be modulated. The energy beam emitted by the energy source can be modulated. The modulator can include amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

An energy beam from the first and/or second energy source can be incident on, or be directed to, a target surface (e.g., the exposed surface of the material bed). The energy beam can be directed to a specified area in the material bed for a specified time period. The material in the material bed can absorb the energy from the energy source (e.g., energy beam and/or dispersed energy), and as a result, a localized region of the material can increase in temperature. The energy source and/or beam can be moveable such that it can translate relative to the surface. In some instances, the energy source may be movable such that it can translate across (e.g., laterally) the top surface of the material bed. The energy beam(s) and/or source(s) can be moved via a scanner. The scanner may comprise a galvanometer scanner, a polygon, a mechanical stage (e.g., X-Y stage), a piezoelectric device, gimble, or any combination of thereof. The galvanometer may comprise a mirror. The scanner may comprise a modulator. The scanner may comprise a polygonal mirror. The scanner can be the same scanner for two or more energy sources and/or beams. At least two (e.g., each) energy source and/or beam may have a separate scanner. The energy sources can be translated independently of each other. In some cases at least two energy sources and/or beams can be translated at different rates, and/or along different paths. For example, the movement of the first energy source may be faster (e.g., greater rate) as compared to the movement of the second energy source. The systems and/or apparatuses disclosed herein may comprise one or more shutters (e.g., safety shutters). The energy beam(s), energy source(s), and/or the platform can be moved by the scanner. The galvanometer scanner may comprise a two-axis galvanometer scanner. The scanner may comprise a modulator (e.g., as described herein). The energy source(s) can project energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The scanner can be included in an optical system that is configured to direct energy from the energy source to a predetermined position on the target surface (e.g., exposed surface of the material bed). The controller can be programmed to control a trajectory of the energy source(s) with the aid of the optical system. The controller can regulate a supply of energy from the energy source to the material (e.g., at the target surface) to form a transformed material.

The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

FIG. 1 shows an example of an energy sources 104. FIG. 6 shows an example of an energy source 601. The system can comprise a plurality of energy sources with different properties. For example, the system can comprise a plurality of energy sources with different powers and/or emission intensities. The system can vary the focus of the energy source (e.g., energy beam) along the beam path. The system can comprise an additional energy source. The additional energy source can be an energy source that complements the one or more energy sources 104.

The one or more energy sources can provide energy to the material bed. In some cases energy can be transferred from the energy source to the powder by an energy beam. At least a portion of the powder can have an increased temperature and/or change of state (e.g. melt) resulting from transfer of the energy from the energy source to the powder. The additional energy source can provide energy to the untransformed material in the material bed, in some cases the additional energy source can provide energy to the pre-transformed material through an energy beam.

One or more additional energy sources can be provided to generate one or more signals upon exposure to the material bed or 3D object. For example, an energy source can be an illumination energy source configured to generate a light scattering signal when incident on the powder and/or at least a fraction of the three-dimensional object. The one or more additional energy sources can generate one more signals that can be detected and processed to measure a property and/or condition of the powder bed and/or at least a portion of the three-dimensional object in the powder bed. In some cases, the one or more additional energy sources can generate one more signals to measure a property and/or condition of a boundary between the powder bed and at least a portion of a three-dimensional object in the powder bed.

Operation of the energy source and one or more additional energy sources can be synchronized. For example, operation of the energy source and one or more additional energy sources can be synchronized such that the energy source and the one or more additional energy sources can be turned on and/or off at the same time and/or consecutively. The energy source can emit an energy beam with a first discrete wavelength and/or range of wavelengths. The one or more additional energy sources can emit an energy beam with a second discrete wavelength and/or range of wavelengths. In some cases, the first discrete wavelength and/or range of wavelengths and the second discrete wavelength and/or range of wavelengths can be different. In some cases the first discrete wavelength and/or range of wavelengths and the second discrete wavelength and/or range of wavelengths can be different from each other by at least about 50 nanometers (nm), 100 nm, 250 nm, 500 nm, or 1000 nm. Alternatively, the first discrete wavelength and/or range of wavelengths and the second discrete wavelength and/or range of wavelengths can be the same. The energy source and the one or more additional energy source energy beams can be optical beams (e.g., optically visible beams). The energy source may be a source of sound wave. The energy source may emit a sound wave. The additional energy source can be operated at a plurality of powers and/or intensities.

The energy beam can be scanned over at least a portion of the material bed along a path (e.g., in a pattern). The path may be a predetermined pattern. The beam can be "on" while continuously scanning, alternatively the beam can modulate between the "on" mode while in a stationary location and the "off" mode while moving (e.g., scanning). In some cases the energy source can provide a pulsed energy emission when the energy source is operating in "on" mode. The energy pulses can have a dwell time of at least about 0.01 microseconds (μs), 0.1 μs, 1 μs, 10 μs, 50 μs, 100 μs, 500 s, 1000 μs, 5000 μs, or 10000 μs. The energy pulses can be locked in to a predetermined frequency. In cases where the system comprises two or more energy sources pulse energy emissions from the two or more energy sources can be synchronized. Alternatively, the pulse energy emissions from the two or more energy sources can be independent of each other and/or not synchronized. The dwell time can comprise a time that the energy source is dwelling (e.g., incident) on a given point and/or portion of the powder bed. Alternatively the dwell time can comprise a time that it takes the energy source to traverse a beam spot size in situations where the energy source is moving continuously. The beam can be scanned in a raster and/or a vector pattern. The beam can be applied at a plurality of powers.

The systems and/or apparatuses disclosed herein may comprise one or more motors. The motors may comprise servomotors. The servomotors may comprise actuated linear lead screw drive motors. The motors may comprise belt drive motors. The motors may comprise rotary encoders. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators.

In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump.

Figure 12:
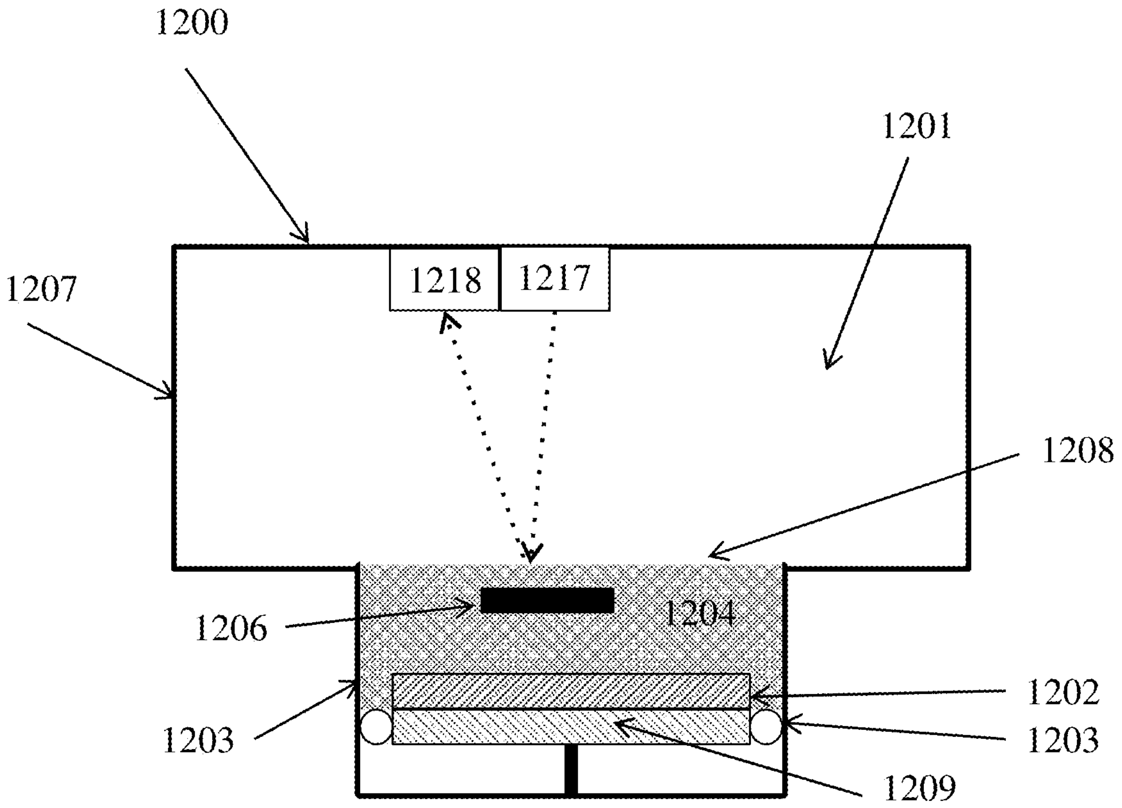
FIG. 12 shows a schematic of a system and apparatuses for forming a three-dimensional object by a three-dimensional printing methodology.

One or more sensors (at least one sensor) can detect the topology of the exposed surface of the material bed and/or the exposed surface of the 3D object or any part thereof. The sensor can detect the amount of material deposited in the material bed. The sensor may detect one or more particles in a certain are of the enclosure. For example, the sensor may detect one or more particles in the atmosphere of the enclosure (e.g., FIGS. 6, 616 and/or 617). The sensor may detect one or more particles in an optical window (FIG. 6, 615) of the enclosure (e.g., FIG. 6, 607). The sensor may detect plasma in the enclosure. The sensor may detect 3D object (e.g., FIG. 6, 606) within the material bed (e.g., FIG. 6, 604). The sensor may detect the shape and/or size of the 3D object (e.g., FIG. 6, 606) within the material bed (e.g., FIG. 6, 604). The sensor may detect the flatness and/or roughness of the surface of the 3D object and/or of the material bed (e.g., exposed surface of the material bed. FIG. 12 shows an example of a system and/or apparatus that may be used in the methods disclosed herein. Energy source 1217 emits an energy beam towards the exposed surface of a material bed 1204. The energy beam deflects and is sensed by an energy beam sensor 1218. The sensor and/or energy source can be stationary or translatable. The sensor can be a proximity sensor. For example, the sensor can detect the amount of un-transformed material deposited on the exposes surface of a material bed or platform. The sensor can detect the amount of material transferred by the material dispensing mechanism. The sensor can detect the amount of relocated by a leveling mechanism. The sensor can detect the temperature of the material. For example, the sensor may detect the temperature of the un-transformed material in a material (e.g., powder) dispensing mechanism, and/or in the material bed. The sensor may detect the temperature of the material during and/or after its transformation. The sensor may detect the temperature and/or pressure of the atmosphere within an enclosure (e.g., chamber). The sensor may detect the temperature of the material (e.g., powder) bed at one or more locations. The sensor may detect location of an item (e.g., 3D object) in the material bed. The temperature may be sensed in a delay relative to the point in time at which the energy beam transforms a position in the material bed. The temperature sensor may correspond to a delayed temperature response. The temperature of the transformed position may form temperature equilibration within the material bed. The temperature of the transformed position may heat up at least a portion of the material bed and form a temperature gradient. The temperature gradient may reach one or more sensors (e.g., an array or a matrix of sensors). The heated sensor(s) may serve as an indicator to the position of the transformed material in the material bed (e.g., powder bed). The indication of the position may include processing of the temperature sensor by the controller (e.g., by a computer). One or more parameters in the three-dimensional printing methodology may be adjusted based on the indication. For example, the position, power and/or path (e.g., hatch spacing or shape) of the energy beam that transforms at least a portion of the material bed may be adjusted.

The at least one sensor can be operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material. The layer of material may be an un-transformed material (e.g., powder), transformed material, or hardened material. The metrology sensor may measure at least a portion of the 3D object. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensors, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the material bed can be monitored by one or more weight sensors in, or adjacent to, the material. For example, a weight sensor in the material bed can be at the bottom of the material bed. The weight sensor can be between the bottom of the enclosure (e.g., FIG. 6, 611) and the substrate (e.g., FIG. 6, 609) on which the base (e.g., FIG. 6, 602) or the material bed (e.g., FIG. 6, 604) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance. At least a portion of the pressure sensor can be exposed on a bottom surface of the material bed. In some cases, the weight sensor can comprise a button load cell. The button load cell can sense pressure from powder adjacent to the load cell. In another example, one or more sensors (e.g., optical sensors or optical level sensors) can be provided adjacent to the material bed such as above, below, or to the side of the material bed. In some examples, the one or more sensors can sense the level of pre-transformed material with the material bed. The material (e.g., powder) level sensor can be in communication with a material dispensing mechanism (e.g., powder dispenser). Alternatively, or additionally a sensor can be configured to monitor the weight of the material bed by monitoring a weight of a structure that contains the material bed. One or more position sensors (e.g., height sensors) can measure the height of the material bed relative to the substrate. The position sensors can be optical sensors. The position sensors can determine a distance between one or more energy beams (e.g., a laser or an electron beam.) and a surface of the material (e.g., powder). The one or more sensors may be connected to a control system (e.g., to a processor, to a computer).

Figure 24:
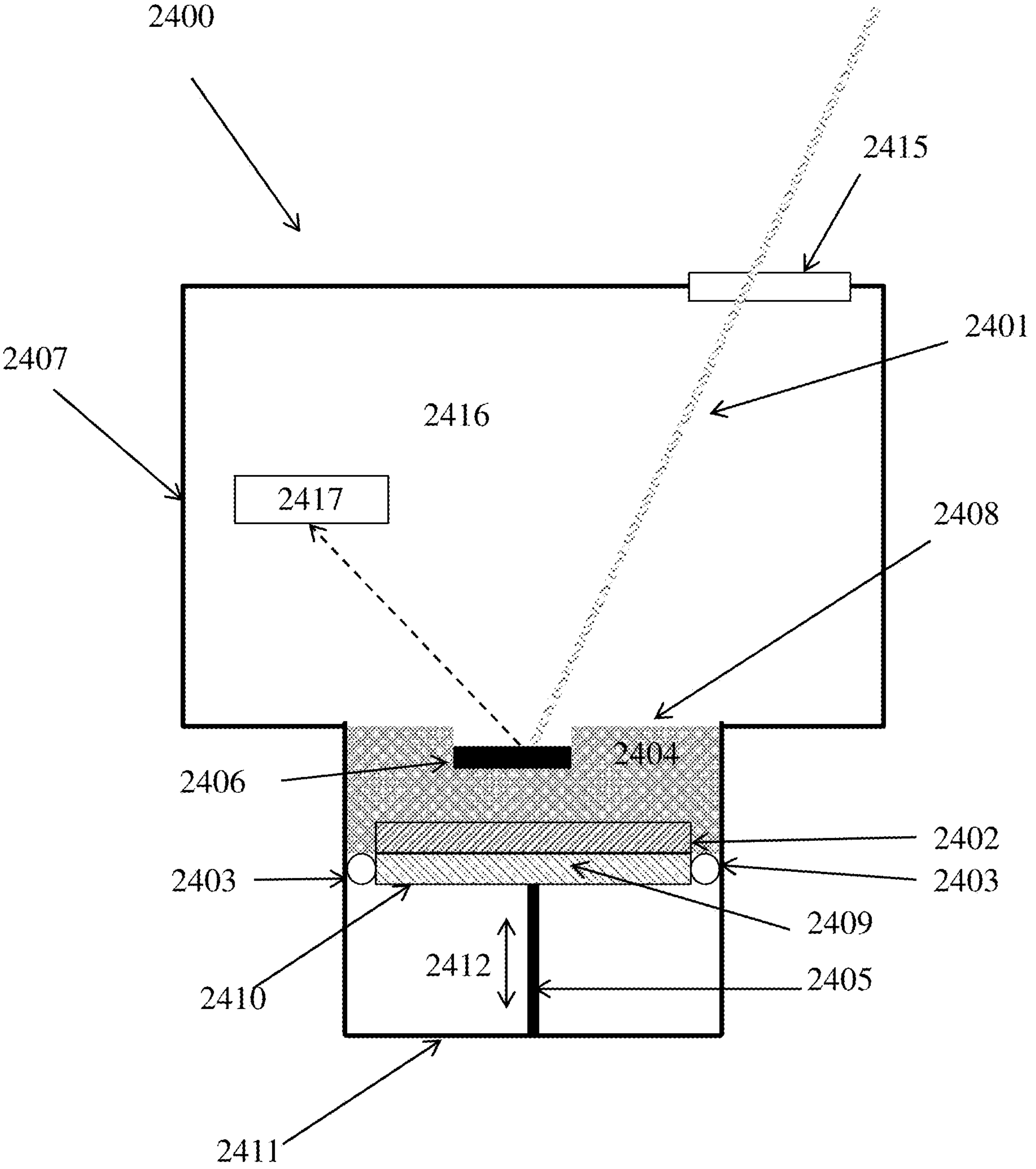
FIG. 24 shows a schematic of a system and apparatuses for forming a three-dimensional object by a three-dimensional printing methodology.

In some embodiments, as the energy beam (e.g., that transforms the pre-transformed material in the material bed into a transformed material) may reflect from a target surface (e.g., exposed surface of the material bed, or top surface of a 3D object) as it travels along a path. The 3D object may be embedded in the material bed. The power and/or speed of the energy beam may be controlled (e.g., varied, regulated and/or directed) by the controller. One or more sensors may detect the reflection of the energy beam. The reflection of the energy beam from the target surface can be detected by an optical detector (e.g., optical sensor). The reflection of the energy beam from the target surface can be detected by an imaging device (e.g., camera) and/or by a spectrum analyzer. The controller may vary one or more characteristics of the energy beam based on an output of the sensor. The characteristics of the energy beam may comprise its power, power per unit area, speed, cross section, or footprint on the exposed surface of the material bed. The controller may comprise performing image analysis (e.g., image processing) using the output of the sensor (e.g., optical sensor, and/or imaging device), to provide a result. The reflection from the target surface may be sensed (e.g., imaged) from one or more angles (e.g., sequentially, simultaneously, or at random). The result may be used in the control of the energy beam (e.g., to alter the at least one of its characteristics). The result may be used in the evaluation of the height and/or planarity of the target surface. The result may be used in the evaluation of the height at various points within the target surface. The height may be relative to a known height (e.g., control), to the platform, or to other positions within the target surface. The result may be used in the evaluation of the planarity of the target surface. The result may provide a height and/or planarity profile of the target surface. The resolution of the height and/or planarity profile may correspond to the FLS of a cross section of the energy beam, and/or the FLS of a footprint of the energy beam on the target surface. The energy beam may be the energy beam that transforms at least a portion of the material bed to form a transformed material. The energy beam may be an energy beam different from the energy beam that transforms at least a portion of the material bed to form a transformed material. FIG. 24 shows an example of an energy beam 2401 that is used to generate the 3D object. A portion of that beam is reflected and detected by a detector (e.g., sensor) 2417. The detector may be coupled to the controller. The controller may analyze the signal. The detector may alter at least one characteristic of the energy beam (e.g., 2401) as a result of the analysis.

The system can comprise one or more detectors (e.g., FIG. 1, 105). The detectors can comprise the sensors. The detectors (e.g., sensors) can be configured to measure one or more properties of the 3D object and/or the pre-transformed material (e.g., powder). The detectors can collect one or more signals from the 3D object and/or the material bed. In some cases, the detectors can collect signals from one or more optical sensors (e.g., as disclosed herein). The detectors can collect signals from one or more vision sensors (e.g. camera), thermal sensors, acoustic sensors, vibration sensors, spectroscopic sensor, radar sensors, and/or motion sensors. In some cases, at least one of the detectors can be a charge-coupled device (CCD) camera. At least one of the detectors can be a pyrometer and/or a bolometer. The radar sensor may comprise an antenna. The antenna may be a scanning antenna. The radar sensor may comprise an electronically scanned array (ESA), or a phase array. The ESA may be passive or active. The antenna may comprise an aperture. The radar frequency can be at least about 1 GigaHertz (GHz), 3 GHz, 10 GHz, 24 GHz, 35 GHz, 77 GHz, 94 GHz, or 100 GHz. The radar frequency can be at most about 3 GHz, 10 GHz, 24 GHz, 35 GHz, 77 GHz, 94 GHz, or 100 GHz. The radar frequency can be any value between the above mentioned values (e.g., from about 1 GHz to about 100 GHz)

At least one of the detectors can be an InGaAs sensor. The one or more detectors can comprise proximity detectors (e.g., sensors) configured to detect one or more signals that can be processed to determine a proximity of a first object (e.g., 3D object) or region to a second object (e.g., 3D object) or region. In some cases, one or more of the detectors can be mounted to a heat transfer member (e.g., FIG. 1, 107; FIG. 6, 613) adjacent to the material bed. The heat transfer member can be a cooling plate and/or heating plate. The heat transfer member can be configured to transfer energy to and/or from the material bed and/or the 3D object before, during and/or after its formation. One or more signals can be detected using different filters to attain coarse spectral segregation of the one or more signals. Each filter can isolate one or more wavelengths or narrow a range of wavelengths. The filters can be optical and/or audio filters.

In some cases, one or more of the detectors can be movable. The one or more detectors can be movable along a plane that is parallel to the material bed (e.g., to the exposed surface of the material bed. The one or more detectors can be movable horizontally, vertically, and/or in an angle (e.g., planar or compound). The one or more detectors can be movable along a plane that is parallel to a surface of the material bed. The one or more detectors can be movable along an axis this is orthogonal to the material bed and/or a surface of the material bed. The one or more detectors can be translated, rotated, and/or tilted at an angle (e.g., planar or compound).

The one or more detectors (e.g., FIG. 1, 105) can be disposed within the enclosure, outside the enclosure, within the structure of the enclosure (e.g., within a wall of the enclosure), or any combination thereof. The one or more detectors can be oriented in a location such that the detector can receive one or more signals in the field of view of the detector. A viewing angle and/or field of view of at least one of the one or more detectors can be maneuverable via a scanner. In some cases the viewing angle and/or field of view can be maneuverable relative to an energy beam that is employed to additively generate the 3D object. In some cases, movement (e.g., scanning) of the energy beam and maneuvering of the viewing angle and/or field of view of one or more detectors can be synchronized. The detectors and/or energy beams may be movable using a scanner. The scanner may comprise a galvanometer scanner, a polygon, a mechanical stage (e.g., X-Y stage), a piezoelectric device, gimble, or any combination of thereof. The galvanometer may comprise a mirror. The scanner may comprise a modulator. The scanner may comprise a polygonal mirror.

The scanner can be the same scanner for two or more detectors. At least two (e.g., each) detectors may have a separate scanner. The detectors can be translated independently of each other. The scanner can be the same scanner for two or more energy sources and/or beams. At least two (e.g., each) energy source and/or beam may have a separate scanner. The energy sources can be translated independently of each other. In some cases at least two energy sources and/or beams can be translated at different rates, and/or along different paths. For example, the movement of the first energy source may be faster (e.g., greater rate) as compared to the movement of the second energy source. The systems and/or apparatuses disclosed herein may comprise one or more shutters (e.g., safety shutters). The energy beam(s), energy source(s), and/or the platform can be moved by the scanner. The galvanometer scanner may comprise a two-axis galvanometer scanner. The scanner may comprise a modulator (e.g., as described herein). The energy source(s) can project energy using a DLP modulator, a one-dimensional scanner, a two-dimensional scanner, or any combination thereof. The energy source(s) and/or detectors can be stationary or translatable. The energy source(s) and/or detectors can translate vertically, horizontally, or in an angle (e.g., planar or compound angle). The energy source(s) can be modulated. The scanner can be included in an optical system that is configured to direct energy from the energy source to a predetermined position on a target surface (e.g., exposed surface of the material bed). The controller can be programmed to control a trajectory of the energy source(s) with the aid of the optical system. The controller can regulate a supply of energy from the energy source to the material (e.g., at the target surface) to form a transformed material.

The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

A controller (e.g., FIG. 1, 106) can be operatively coupled to the energy source (e.g., FIG. 1, 104) and/or the one or more detectors (e.g., FIG. 1, 105). The controller can be a computer system with one or more computer processors that are programmed to direct a supply of energy from the energy source to the material bed. The energy can be supplied from the energy source to the pre-transformed material by an energy beam. The controller can direct the energy source along a path that is selected in accordance with a model design of the 3D object. The controller can also control maneuvering of the detector and/or the field of view of the detector. The controller can process one or more signals collected by the detector to determine a deviation (e.g. error) of the emitted energy beam from the energy source. Additionally, the controller can process one or more signals collected by the detector to determine a deviation (e.g. error) of the 3D object or portion thereof from a model design of the 3D object. The controller can process one or more signals (e.g., collected by the detector) to generate a map of the enclosure, the optical window, the material bed and/or at least a portion of the 3D object (e.g., within the material bed). The controller can alter the path of the energy beam as necessary to reduce or maintain the deviation form a model design of the 3D object. In some cases, the controller can increase a local deviation to decrease an overall deviation. In some cases the controller can abort the process of forming the 3D object when the deviation is at or above a predetermined threshold value.

The system of FIG. 1 can be used to additively generate a 3D object. In an additive 3D printing process, pre-transformed material (e.g., powder) can be provided adjacent to a platform. At least a portion of the 3D object can be additively generated from the pre-transformed material (e.g., within the material bed). Additively generating the object can comprise transforming at least a portion of the material bed with the one or more energy sources. An energy beam from the one or more energy sources can be incident on an exposed surface of the material bed (e.g., top surface) in a predetermined path (e.g., pattern) to form at least a portion of the 3D object. The predetermined pattern can correspond to a model of the 3D object.

While forming the 3D object, signals can be collected from at least a portion of the 3D object, material bed, enclosure atmosphere, optical window, and/or energy beam by at least one detector in sensing communication with the 3D object, material bed, enclosure atmosphere, optical window, and/or energy beam. The signals can be detected in real time (e.g., while forming the 3D object). The signals can be detected continuously or at discrete intervals (e.g., while forming the 3D object). In some cases, the discrete intervals can correspond to predetermined checkpoints, which can be selected, for example, based on a model design of the 3D object.

The signals collected by the detector can be processed to determine one or more properties of at least a portion of the 3D object, the material bed, the pre-transformed material, the enclosure atmosphere, the optical window, or any combination thereof. The signals collected by the detector can be processed to determine one or more properties of a boundary between the material bed and at least a portion of the 3D or the atmosphere of the enclosure. The signals collected by the detector can be processed to determine one or more properties of cleanliness of the material bed. The signals collected by the detector can be processed to determine a roughness of a surface (e.g., the exposed surface of the material bed and/or of the 3D object). The signals collected by the detector can be processed to determine one or more properties of the melt pool comprising the 3D object. For example, at what temperature the melt pool was formed and/or how quickly the melt pool solidified (e.g., cooled). The signals can be processed to determine a state or property of the three-dimensional object of the powder. The signals can be processed to determine a state or progression of the additive printing process. The signals can be processed to determine a cooling rate profile, heat profile, and/or solidification rate profile of the 3D object. The state and/or properties determined from the signals can be specified by a user. In some cases, one or more states and/or properties can be determined concurrently, sequentially, and/or separately. The signals can be processed with a triangulation technique. The enclosure atmosphere may comprise one or more gases.

Signals can be detected and processed to determine one or more material or state properties of the material bed and/or 3D object before, during, at, or after the completion of a manufacturing process. For example, a material state or property of the 3D object and/or the material bed can include on or more of a depth of the material bed relative to the platform, a uniformity of the pre-transformed material within the material bed (e.g. spatial uniformity, temperature uniformity, composition uniformity, and/or density uniformity), roughness of the exposed surface of the material bed and/or a surface of the 3D object, stress of the 3D object (e.g. internal or external thermal, compressive, or tension stress), a location or state of the boundary and/or interface between at least a portion of the 3D object and the material bed, a height of the 3D object with respect to a surface within the material bed or with respect to the substrate, one or more defects in the 3D object (e.g. deviation of dimension or shape of the 3D object relative to a model of the 3D object above a predetermined threshold), porosity and/or voids in the 3D object, discontinuity at the interface, curvature of a surface of the 3D object, a height of one location on the 3D object with respect to another location on the 3D object, a color uniformity map of the 3D object (e.g., surface thereof), and/or an chemical transformation (e.g., oxidation) uniformity of a surface of the 3D object.

Spatial properties can be determined by one or more signals collected at the detector. In some cases, the spatial properties can comprise depth of the pre-transformed material (e.g., powder) relative to a predetermined plane, spatial uniformity of the material bed, spatial properties of the interface between at least a portion of the 3D object and the pre-transformed material (e.g., material bed), location of one or more stresses in at least a portion of the 3D object, and/or the size and location of one or more features of the 3D object. The signals can be processed to produce a spatial measurement with an accuracy within at least about 100 micrometers (μm), 50 μm, 10 μm, 1 μm, 0.5 μm, or 0.25 μm.

The signals that are detected can be processed. In some cases processing the signals can comprise generating at least one map. The map can comprise a visual, graphical, and/or numerical representation of one or more measurements. The measurements can be derived from processing of one or more signals collected by one or more detectors. The map can be a map may comprise a differential contrast map between the 3D object and the un-transformed material, spatial color map of the 3D object and/or the un-transformed material, spatial map of an interface between the 3D object and the un-transformed material, temperature map of the 3D object and/or the un-transformed material, thermal dissipation map, dark field map, a bright field map, stress and/or deformation map of the 3D object and/or the untransformed material, proximity map of the untransformed material, scattering map of the signals, spectral map from the signals, integral untransformed material emission map of the 3D object and/or the untransformed material, integral power emission map of the 3D object and/or the untransformed material, reflectivity map, temperature decay map, oxidation map, or curvature map (e.g., of at least one surface of the 3D object). The untransformed material may be a powder material. The untransformed material may be within the material bed.

Figure 2:
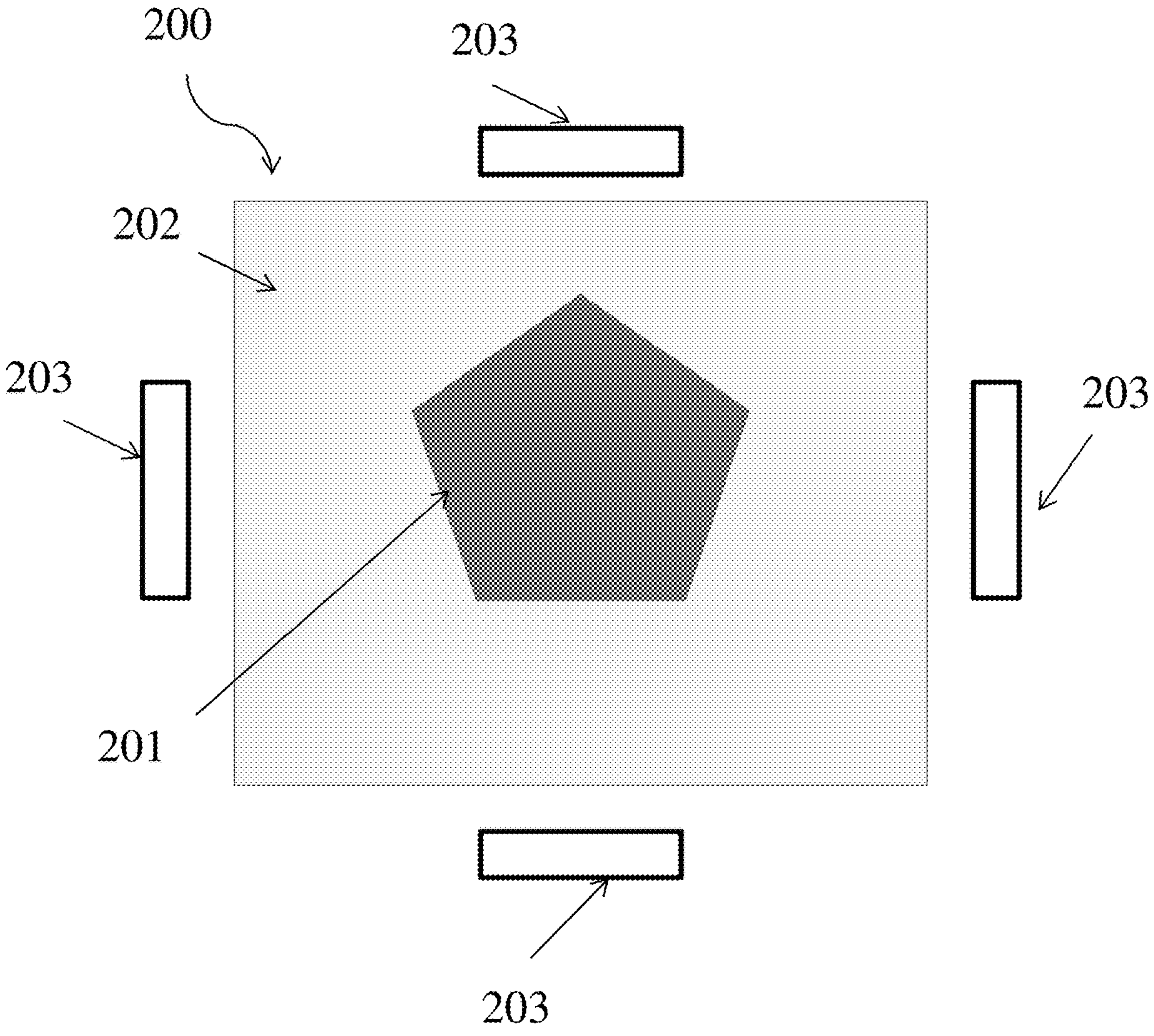
FIG. 2 shows a schematic of a surface comprising pre-transformed material (e.g., powder) and a three-dimensional object.

Detectors (e.g., sensors) can be provided adjacent to the material bed (e.g., powder bed). The material bed can have a surface comprising untransformed material and at least a portion of the 3D object. In some cases two or more detectors can be located at different angles and/or distances from the surface of the material bed. FIG. 2 shows a horizontal (top) view of a system with an exposed surface 202 of a material bed 200. The exposed surface (e.g., top surface) can comprise at least a fraction of a 3D object 201. The exposed surface can comprise untransformed material within a material bed adjacent to the 3D object. The 3D object 201 can be floating (e.g., suspended anchorless) in the material bed. For example, the 3D object 201 can be in contact with the untransformed material but no other surface (e.g., platform) within the enclosure. The one or more detectors can scan the exposed surface to generate a map of the exposed surface. The one or more detectors can be stationary or moving. The moving one or more detectors may scan the surface. The one or more detectors may be stationary while the material bed may be moving. The detectors (e.g., sensors) may be sensitive to one or more energy beam (e.g., sound wave, electromagnetic beam, and/or charged particle beam, energy emission). The one or more energy beam may be generated from one or more energy sources. The energy source can be stationary or moving. The energy source may be moving while the material bed is stationary. The energy source may be stationary while the material bed is moving. In some instances the material bed is moving and at least one of the energy source and detector is moving. The movement may be synchronized and/or controlled (e.g., regulated and/or directed). The control may comprise a controller. In some cases the one or more detectors, and/or energy sources can scan the surface at predetermined time intervals to generate a map at multiple time points. In some cases, the location and/or angle of the detectors can be varied relative to the surface to generate one or more maps corresponding to different perspective angles (e.g., planar or compound) and/or orientations of the detector or energy source respectively. In some cases, one or more boundaries of the material bed surface can have fiducial markers 203. The fiducial markers can be lights, patterns, and/or symbols that can be observed by the detector.

A cross section (e.g., vertical cross section) of the generated (i.e., formed) 3D object may reveal a microstructure or a grain structure indicative of a layered deposition. Without wishing to be bound to theory, the microstructure or grain structure may arise due to the solidification of transformed powder material that is typical to and/or indicative of the 3D printing method. For example, a cross section may reveal a microstructure resembling ripples or waves that are indicative of solidified melt pools that may be formed during the 3D printing process. The repetitive layered structure of the solidified melt pools may reveal the orientation at which the part was printed. The melt pools may be arranged in layers. The cross section may reveal a substantially repetitive microstructure or grain structure. The microstructure or grain structure may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure or grain structure may comprise substantially repetitive solidification of layered melt pools. The substantially repetitive microstructure may have an average layer width of at least about 0.57 μm, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, or 500 μm. The substantially repetitive microstructure may have an average layer width of at most about 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, 30 μm, 20 μm, or 10 μm. The substantially repetitive microstructure may have an average layer size of any value between the aforementioned values of layer widths (e.g., from about 0.5 μm to about 500 μm, from about 15 μm to about 50 μm, from about 5 μm to about 150 μm, from about 20 μm to about 100 μm, or from about 10 μm to about 80 μm).

The un-transformed material within the material bed (e.g., powder) can be configured to provide support to the 3D object. For example, the supportive powder may be of the same type of powder from which the 3D object is generated, of a different type, or any combination thereof. In some instances, a low flowability powder can be capable of supporting a 3D object better than a high flowability powder. A low flowability powder can be achieved inter alia with a powder composed of relatively small particles, with particles of non-uniform size or with particles that attract each other. The powder may be of low, medium, or high flowability. The powder material may have compressibility of at least about 1%, 2%, 3%, 4%, 5%, 6%, 7%, 8%, 9%, or 10% in response to an applied force of 15 kilo Pascals (kPa). The powder may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The powder may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The powder may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The powder may have basic flow energy in between the above listed values of basic flow energy (e.g., from about 100 mj to about 1000 mJ, from about 100 mj to about 600 mJ, or from about 500 mj to about 1000 mJ). The powder may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The powder may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The powder may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

Optical measurements can distinguish between the untransformed material and at least a portion of the 3D object. In some cases, the untransformed material can be a substantially diffuse reflector. The portion of the three-dimensional object can be a substantially specular reflector. The optical measurement can be a dark field and/or bright field measurement. The dark field and/or bright field measurement can isolate non-specular reflection (e.g., diffuse reflection) arising from the material bed. The dark field and/or bright field measurement can be processed to produce a map of spatial properties of the material bed.

Signals can be collected and processed to determine planar uniformity of the 3D object and the material bed. Signals can be collected and processed to determine respective planar uniformity and/or planar uniformity between the 3D object and the material bed. Respective planar uniformity can be achieved when a 3D object and a surface of the material bed are in substantially parallel planes. Planar uniformity can be achieved when a 3D object and a surface of the material bed are in the same planes.

Figure 3A:
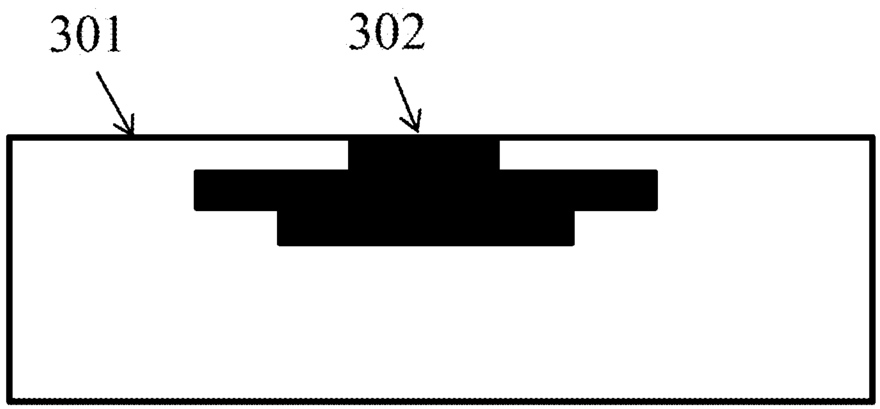
FIGS. 3A-3B show schematics of planar alignment between three-dimensional objects and various surfaces of a material bed.
Figure 3B:
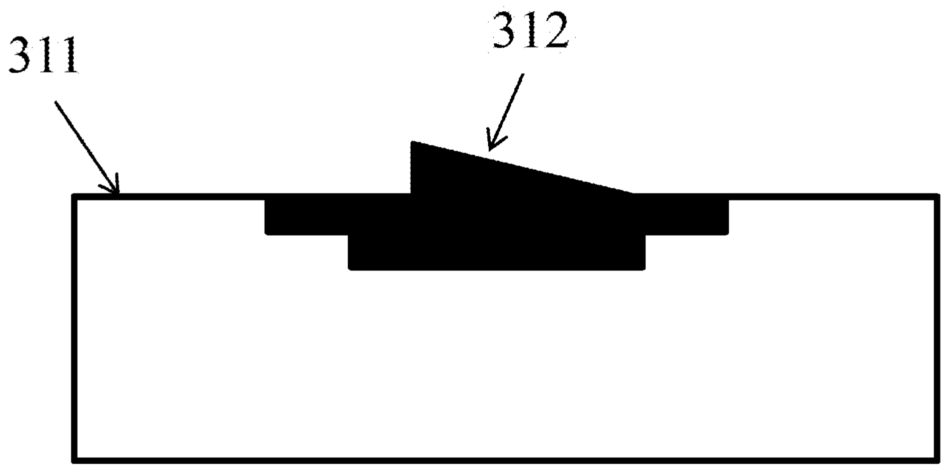

FIG. 3A shows an example of an exposed (e.g., top) surface of a material bed 301 and an exposed surface of a 3D object 302 which lay in the same plane. In some cases, a 3D object and a surface of the material bed can lay in different planes. For example, FIG. 3B shows a surface of a 3D object 312 and a surface of the powder bed 311 that lay in different planes. In some cases, a deviation from planar uniformity can be identified by one or more signals and detectors. A deviation from planar uniformity can be corrected.

Planar uniformity can be continuously monitored during a fabrication process of the 3D object. Planar uniformity can be monitored by one or more scanning proximity sensors. The proximity sensors can determine the height of the exposed surface of the material bed and/or the 3D object. The proximity sensors can determine the absolute height and/or a relative height of the material bed and/or the 3D object. In some instances, the proximity sensor can be disposed on the heat transfer plate. Planar uniformity can be measured by interferometry.

In some cases, reflectivity measurements can be processed to distinguish between the exposed surface of the material bed and a surface of the 3D object. For example, the untransformed material in the material bed can be a diffuse reflector and the 3D object can be a specular reflector. One or more optical detectors (e.g., optical sensors), for example a CCD camera, can image a surface of the material bed comprising untransformed material and at least a portion of the 3D object. A signal that can be detected by the CCD camera can be generated using background lighting. The background lighting can be incident on the surface to be imaged. The background lighting can be provided at a predetermined discrete wavelength or within a range of wavelengths. The wavelength or range of wavelengths of the background lighting can be different from the wavelength or range of wavelengths of an energy beam that is forming the 3D object. In some cases, the background lighting can be provided at a predetermined wavelength or range of wavelengths with the aid of an optical filter and/or charge coupled device (CCD). The optical filter or CCD can allow only transmission of background lighting at a predetermined wavelength or within a range of wavelengths. The background lighting can be provided with a constant, oscillating, and/or varying intensity. The intensity of the background lighting can be varied with a regular or irregular periodicity. Oscillation and/or variation of the intensity of the background lighting can be synchronized with at least one detector. Similarly, oscillation and/or variation of the intensity of the background lighting can additionally be synchronized with emission from an energy source that is forming the 3D object.

Signals from the background lighting or another source of electromagnetic radiation can be processed to determine surface topography and/or roughness. The signals can comprise reflected and/or scattered light from the surface. The signals can be identified and collected by one or more detectors (e.g., sensors), for example a CCD camera, InGaAs sensor, pyrometer, or bolometer. The detectors can image the surface at variable heights and/or angles relative to the surface. Images from the detectors can be processed to determine topography, roughness, and/or reflectivity of the surface comprising the untransformed material and the 3D object. The surface can be measured with dark-field and/or light field illumination and a map and/or image of the illumination can be generated from signals detected during the dark-field and/or light field illumination. The maps from the dark-field and/or light field illumination can be compared to characterize the surface (e.g., of the material bed and/or of the 3D object). For example, surface roughness can be determined from a comparison of dark-field and/or light field detection measurements. In some cases analyzing the signals can include polarization analysis of reflected or scattered light signals.

Figure 4:
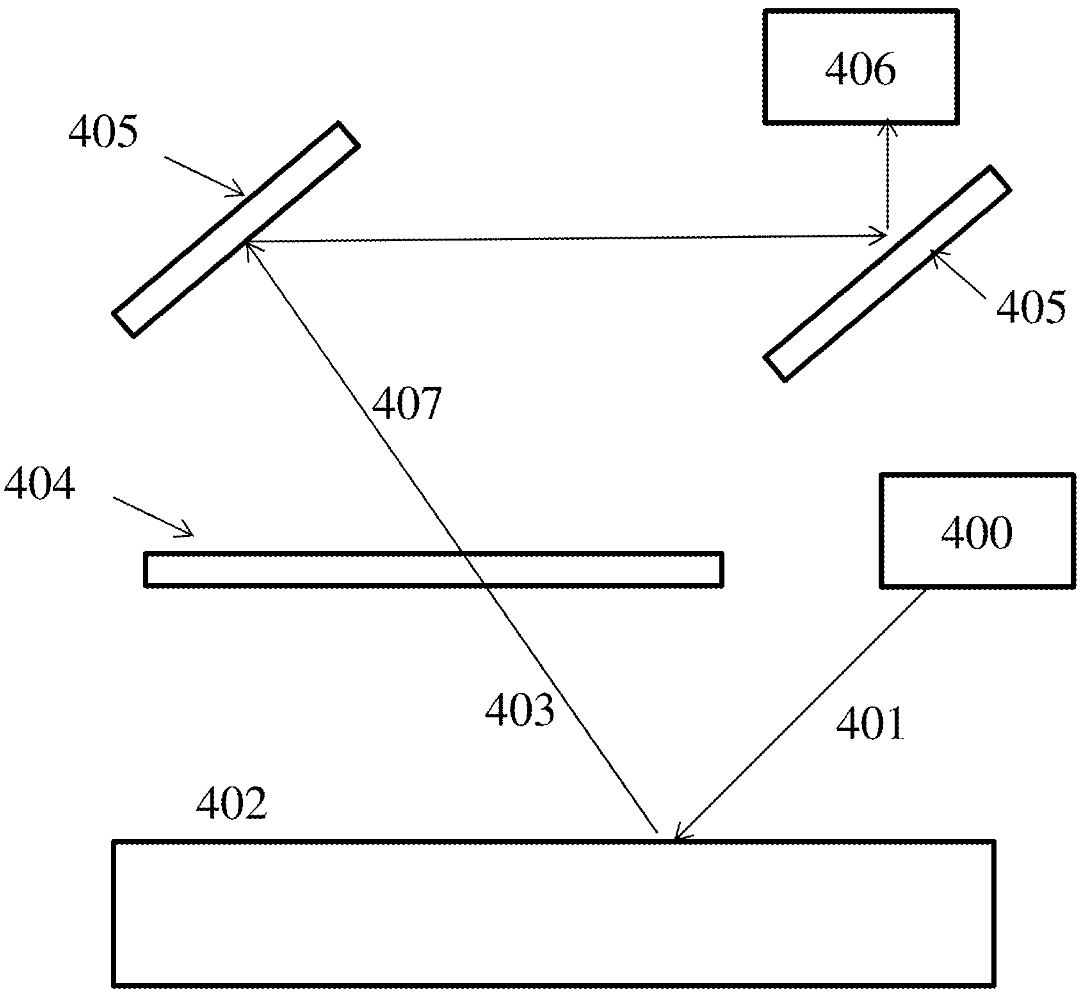
FIG. 4 shows an optical system and apparatuses used in the present disclosure.

FIG. 4 shows an example of a schematic optical system that can perform measurements on a surface to determine surface topography (e.g., relative and/or absolute heights of surface features). The surface can be the exposed surface of the material bed and/or a surface of the 3D object (or a portion thereof). An energy source 400 may emit an energy beam (e.g., an electromagnetic beam, charged particle beam, or sound wave). The energy beam 401 can be incident on a surface 402. In some cases the energy beam 401 can be focused through at least one focusing device (e.g., a lens, not shown). At least a fraction of the incident energy beam can be scattered by and/or reflected off of the surface 402. The scattered and/or reflected energy beam can be a signal 403 that can be optionally transmitted through an optical device (e.g., a lens) 404 that alters (e.g., modulates) the reflected energy beam 403 in at least one energy beam characteristics to form an altered reflected energy beam 407. At least one mirror 405 can direct the reflected energy beam to one or more detectors 406. The angle and orientation of the one or more mirrors can be varied to collect signals from the surface at different angles of reflection and/or scattering. The optical device may alter at least one path of the energy beam (e.g., converge or diverge rays) or magnify the cross section of the energy beam. In some cases, the reflection and/or scattering angle can be processed to determine the topography and or roughness of the surface. The intensity of a reflected and/or scattered energy beam (i.e., signal) can be processed to determine the spatial location of the untransformed material and/or 3D object that reflected the signal received by the detector. The incident energy beam can be provided at a plurality of powers. The detector can collect reflected and/or scattered energy beams (e.g., signals) from the untransformed material (e.g., in the material bed) and/or 3D object in response to the different incident energy powers.

In some cases, the optical system can additional comprise an amplifier (e.g., a lock-in amplifier). The lock-in amplifier can detect variations in the one or more reflected and/or scattered signals. The lock-in amplifier can isolate signals in a desired frequency range. The lock-in amplifier can isolate scattered and reflected light signals from an electromagnetic emission that is derived from a measurement system and an electromagnetic emission coming from the energy source that forms the 3D object.

The systems, apparatuses, and/or methods disclosed herein may use proximity measurements. The proximity measurements may indicate the height of various features with respect to a plane. The plane may be the substrate and/or the (e.g., average) exposed surface of the material bed. The proximity measurements may measure the height of a protruding 3D object (or any part thereof) from the exposed surface of the material bed. The proximity measurements may comprise using energy beams (e.g. laser lines) and/or stereoscopic triangulation. Triangulation can be a process of determining the location of a point by measuring angles to it from known points at either end of a fixed baseline, rather than measuring distances to the point directly (trilateration). The point can then be fixed as the third point of a triangle with one known side and two known angles. The triangulation can be based on two or more measurements of the same point from at least two different position, and comparing (e.g., aligning) the at least two different measurements. The measurements may be based on images of the point. The images may be generated using an optical sensor (e.g., as disclosed herein). The images may be generated using an imaging system (e.g., comprising a camera). The one or more sensors may be height sensors. The height sensors may be used to measure stress at a certain position on the 3D object (e.g., on surface of the 3D object).

The methods, systems and/or apparatuses disclosed herein may further incorporate using the triangulation measurements and/or image processing to evaluate the roughness of a surface (and any components used to effectuate these measurements). The surface may be a surface of the printed 3D object (or any portion thereof), an exposed surface of a material bed, or any other surface. The method may afford a resolution of at least a few micrometers. The method may afford a resolution of at least a few tenths of a micrometer. The method may afford a resolution of at most about 150 μm, 100 μm, 70 μm, 50 μm, 40 μm, 30 μm, 20 μm, 10 μm, 5 μm, 1 μm, 0.5 μm, 0.2 μm, 0.1 μm, 0.05 μm or 0.02 μm. The method may afford a resolution of at least about 150 μm, 100 μm, 70 μm, 50 μm, 40 μm, 30 μm, 20 μm, 10 μm, 5 μm, 1 μm, 0.5 μm, 0.2 μm, 0.1 μm, 0.05 μm or 0.02 μm. The method may afford a resolution of any value between the aforementioned values (e.g., from about 100 μm to about 5 μm, from about 30 μm to about 0.02 μm, from about 10 μm to about 0.02 μm, or from about 100 μm to about 0.02 μm). The techniques may include image processing. The techniques may include CCD imaging, bright field, dark field, and/or multi-angle viewing (e.g., triangular measurements).

The bright field measurement may include an un-scattered beam (i.e., a beam that was not scattered) from the image. The bright field measurements may include an absorbance of some of the transmitted light in dense areas of the position of interest. The dark field measurement may exclude an un-scattered beam from the image. The techniques may include image processing. The techniques may afford nanoscale to microscale resolution. The surface roughness may be measured as the arithmetic average of the roughness profile (hereinafter "Ra"). The techniques may evaluate a surface roughness having a Ra value of at least 0.1 micrometers (μm), 1 μm, or 8 μm. The surface roughness may be the deviations in the direction of the normal vector of a real surface, from its ideal form. The 3D object can have a Ra value of at least about 300 μm, 250 μm, 200 μm, 100 μm, 75 μm, 50 μm, 45 μm, 40 μm, 35 μm, 30 μm, 25 μm, 20 μm, 15 μm, 10 μm, 9 μm, 8 μm, 7 μm, 5 μm, 3 μm, 1 μm, 500 nm, 400 nm, 300 nm, 200 nm, 100 nm, 50 nm, 40 nm, or 30 nm. The formed object can have a Ra value of at most about 300 μm, 250 μm, 200 μm, 100 μm, 75 μm, 50 μm, 45 μm, 40 μm, 35 μm, 30 μm, 25 μm, 20 μm, 15 μm, 10 μm, 9 μm, 8 μm, 7 μm, 5 μm, 3 μm, 1 μm, 500 nm, 400 nm, 300 nm, 200 nm, 100 nm, 50 nm, 40 nm, or 30 nm. The 3D object can have a Ra value between any of the aforementioned Ra values (e.g., from about 30 nm to about 50 μm, from about 5 μm to about 40 μm, from about 3 μm to about 30 μm, from about 10 nm to about 50 μm, from about 80 μm to about 300 μm, or from about 15 nm to about 80μ□m). The methods may use collimated light. The methods may substantially not use dispersed light. The roughness measurements may serve as an indication for the powder density of the energy beam that was used to form the surface (e.g., of the 3D object). The roughness measurement may comprise using Lambert's emission law when evaluating the optical measurements. The Ra values may comprise measuring by a roughness tester and/or by a microscopy method. The measurements may be conducted at ambient temperatures (e.g., R.T.). The roughness may be measured by a method comprising contact or by a non-contact method. The roughness measurement may comprise one or more sensors (e.g., optical sensors). The roughness measurement may comprise a metrological measurement device (e.g., using metrological sensor(s)). The roughness may comprise using an electromagnetic beam (e.g., visible or IR).

The surface roughness may be the deviations in the direction of the normal vector of a real surface, from its ideal form. Ra may use absolute values. The 3D object can have a Ra value of at least about 300 μm, 250 μm, 200 μm, 100 μm, 75 μm, 50 μm, 45 μm, 40 μm, 35 μm, 30 μm, 25 μm, 20 μm, 15 μm, 10 μm, 7 μm, 5 μm, 3 μm, 1 μm, 500 nm, 400 nm, 300 nm, 200 nm, 100 nm, 50 nm, 40 nm, or 30 nm. The formed object can have a Ra value of at most about 300 μm, 250 μm, 200 μm, 100 μm, 75 μm, 50 μm, 45 μm, 40 μm, 35 μm, 30 μm, 25 μm, 20 μm, 15 μm, 10 μm, 7 μm, 5 μm, 3 μm, 1 μm, 500 nm, 400 nm, 300 nm, 200 nm, 100 nm, 50 nm, 40 nm, or 30 nm. The 3D object can have a Ra value between any of the aforementioned Ra values (e.g., the Ra value can be from about 30 nm to about 50 μm, from about 5 μm to about 40 μm, from about 3 μm to about 30 μm, from about 10 nm to about 50 μm, from about 80 μm to about 300 μm, or from about 15 nm to about 80 μm).

The systems and/or apparatuses described herein may comprise one or more optical windows. The optical window may be incorporated in the cover, coating, and/or walls of the enclosure. The optical window may allow an energy beam that is emitted from a location (e.g., energy source) outside of the enclosure, to travel to a location within the enclosure. The optical window may allow substantially in-tact preservation of the properties of the energy beam during its travel through the optical window, while allowing isolation of an atmosphere within the enclosure. The properties of the energy beam may comprise power, wavelength, beam footprint, beam collimation, or beam path. FIG. 6, 615 shows an example of an optical window that allows transmission of an energy beam 601 from a location outside the enclosure, towards a location within the enclosure 607. The optical window can become contaminated (e.g., dirty, or murky) during the manufacturing process. The contamination on the optical window can comprise untransformed material that clings to, or is condensed on the optical window, products of chemical and/or physical reactions that cling or condense on the optical window, and/or other ambient dust or dirt. The optical window can be an optical window placed between an energy source and the material bed. The optical window can be an optical window placed in the path of the energy beam that travels towards the material bed. The optical window can be an optical window placed in the path of the energy beam that travels towards the enclosure interior. An obstruction (e.g., contamination) in the optical window can reduce one or more characteristics of the energy beam that is used to generate the 3D object. In some instances, maintaining a clean optical window may ensure reliable characteristics of the energy beam that is used to generate the 3D object from at least a portion of the material bed. Maintaining a clean optical window may ensure reliable control (e.g., regulation and/or direction) of the energy beam that is used to generate the 3D object from at least a portion of the material bed. A state of progression of the additive generating of a 3D object can include maintaining a level of cleanliness of the optical window. The cleanliness of the optical window can be monitored continuously or at discrete intervals during the manufacturing process. The cleanliness of the optical window can be determined, at least in part, by a reflectivity of one or more signals from the optical window. The cleanliness (or conversely the contamination level) of the optical window can be determined, at least in part, by a reflectivity of one or more signals from an energy source located outside of the enclosure towards the optical window, and measuring any reflection of the signal by using a detector located outside of the enclosure. The cleanliness (or conversely the contamination level) of the optical window can be determined, at least in part, by a reflectivity of one or more signals from an energy source located outside of the enclosure towards the optical window, and measuring any reflection of the signal by using a detector located inside the enclosure. The cleanliness (or conversely the contamination level) of the optical window can be determined, at least in part, by a reflectivity of one or more signals from an energy source located inside the enclosure towards the optical window, and measuring any reflection of the signal by using a detector located outside of the enclosure. The cleanliness (or conversely the contamination level) of the optical window can be determined, at least in part, by a reflectivity of one or more signals from an energy source located inside the enclosure towards the optical window, and measuring any reflection of the signal by using a detector located inside the enclosure. The detection of the contamination level of the optical window can be done mostly or entirely inside the enclosure. The detection of the contamination level of the optical window can be done mostly or entirely outside of the enclosure. The detection of the contamination level of the optical window can be done mostly or entirely during the formation of the 3D object (e.g., simultaneously. E.g., in real time). In some cases, contamination on the window can cause the reflectivity of the window to vary from a known value. Multiple locations on the window can be tested to determine a reflectivity value at multiple locations on the window corresponding to a level of cleanliness at each location. When reflectivity varies from a benchmark (e.g., known, predetermined) reflectivity value beyond a (e.g., predetermined) threshold, the optical window can be cleaned automatically. When reflectivity varies from a benchmark (e.g., known, predetermined) reflectivity value, at least one characteristic of the energy beam used to generate the 3D object may be varied (e.g., power, beam footprint, intensity, wavelength, emission time at a certain position). When reflectivity varies from a benchmark reflectivity value beyond a threshold, the manufacturing process can be aborted or stalled until the optical window returns to an acceptable cleanliness level. The acceptable cleanliness level may be predetermined. The return to an acceptable cleanliness level may be done by cleaning the optical window. The cleaning may use a mechanical cleaner, energy beam cleaning, pyrolytic cleaning, chemical cleaning, or any combination thereof. The window can be cleaned by an energy beam cleaning that comprises ablation (e.g., laser ablation).

Figure 8:
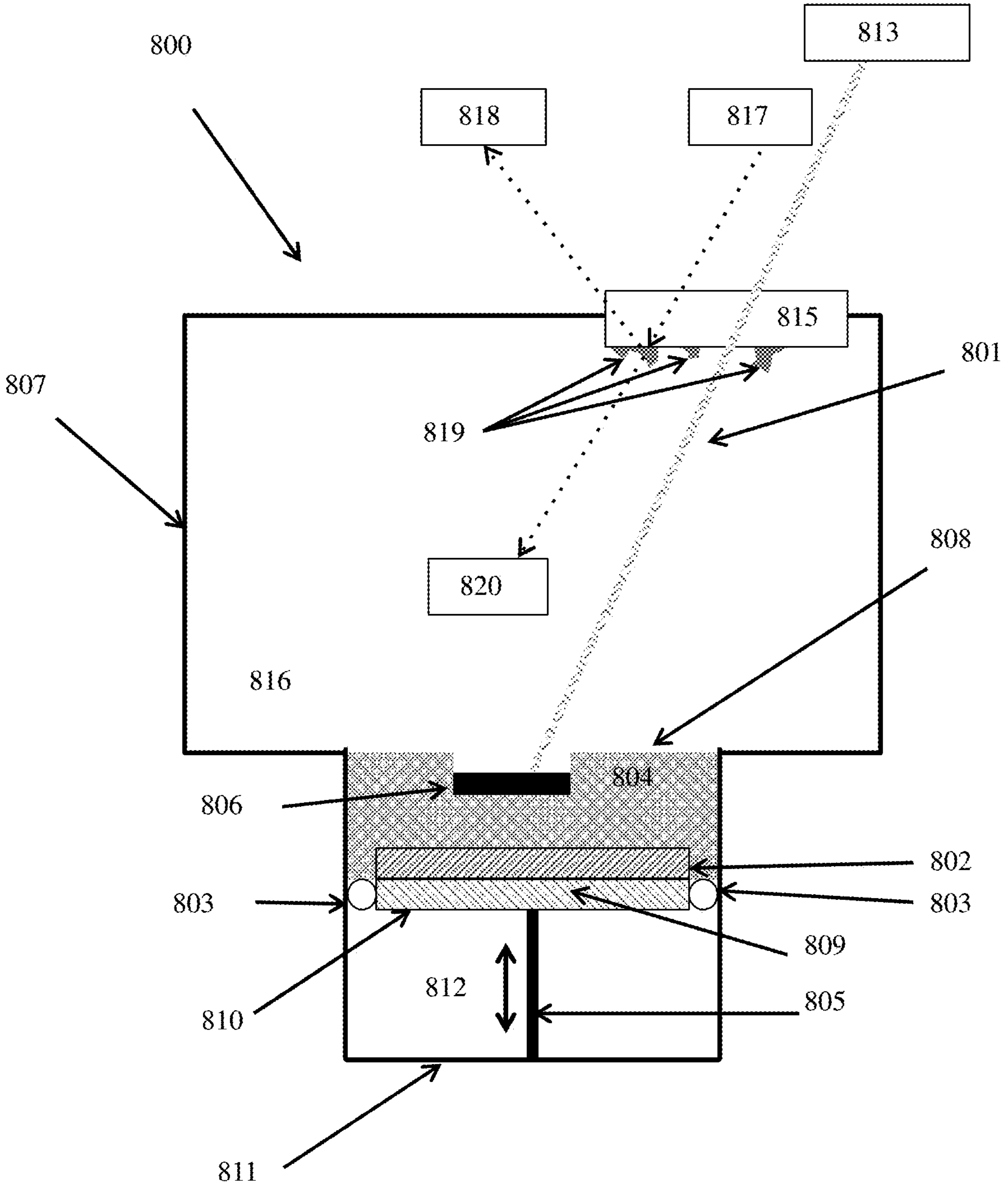
FIG. 8 shows a schematic of a system and apparatuses for forming a three-dimensional object by a three-dimensional printing methodology.
Figure 14:
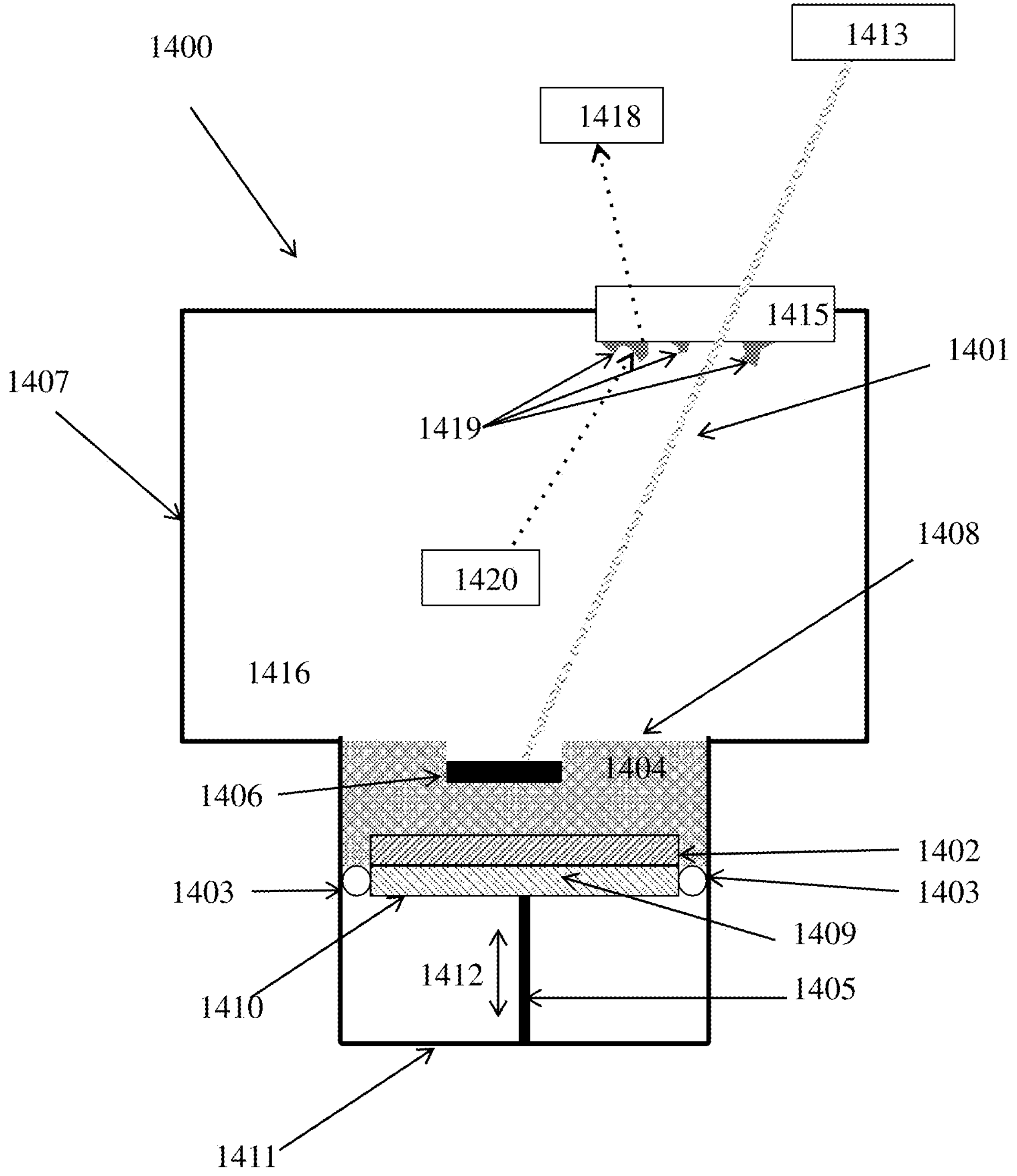
FIG. 14 shows a schematic of a system and apparatuses for forming a three-dimensional object by a three-dimensional printing methodology.

One or more detector (e.g., sensor) may evaluate the cleanliness and/or contamination of the optical window by measuring an alteration in a penetration and/or reflection of an energy beam (e.g., light beam) that is projected (e.g., shined) onto the optical window (e.g., at least one surface of the optical window). The detection mechanism may include a detector (e.g., an optical sensor), and/or an image-capturing device (e.g., as disclosed herein). The energy beam (e.g., light) measurement may be conducted outside of the enclosure. The energy beam may be projected onto the optical window (e.g., at least one surface thereof) from a position outside of the enclosure, and be reflected from the at least one surface to a position outside of the enclosure. FIG. 8 shows an example of a 3D printing system and apparatus that includes an optical window 815. The energy beam 801 used to generate the 3D object 806 is generated by a first energy source 813 located outside of the enclosure 807. A second energy source 817 located outside of the enclosure 807 generates a second energy beam that is directed to the lower surface of the optical window that faces the exposed surface of the material bed 804. Debris 819 is disposed on the lower surface of the optical window, and alters at least one property of the second energy beam (e.g., its direction). Optionally or additionally, the altered energy beam may be deflected and detected by a detector 818 located outside of the enclosure 807. Optionally or additionally, the altered energy beam may be detected by a detector 820 located inside the enclosure 807. In some examples, the detector located inside the enclosure (e.g., 820) may be disposed at a position that may detect the emitted energy beam by the second energy source (e.g., 817). The second energy beam may be different than the first energy beam (e.g., that is used to form the 3D object). The second energy beam may have one or more unique characteristics that may differentiate it from the first energy beam. The unique characteristics may comprise wavelength, power, footprint, type (e.g., electromagnetic, charge particle, or sound), angle, or position. In some instances, the first energy beam is located within the enclosure. In some instances at least one detector is disposed outside of the enclosure. In some instances at least one detector is disposed within the enclosure. FIG. 14 shows an example of a first energy source 1420 located within the enclosure 1407, a sensor 1418 located outside of the enclosure, and an optical window 1415 comprising debris 1419.

Figure 15:
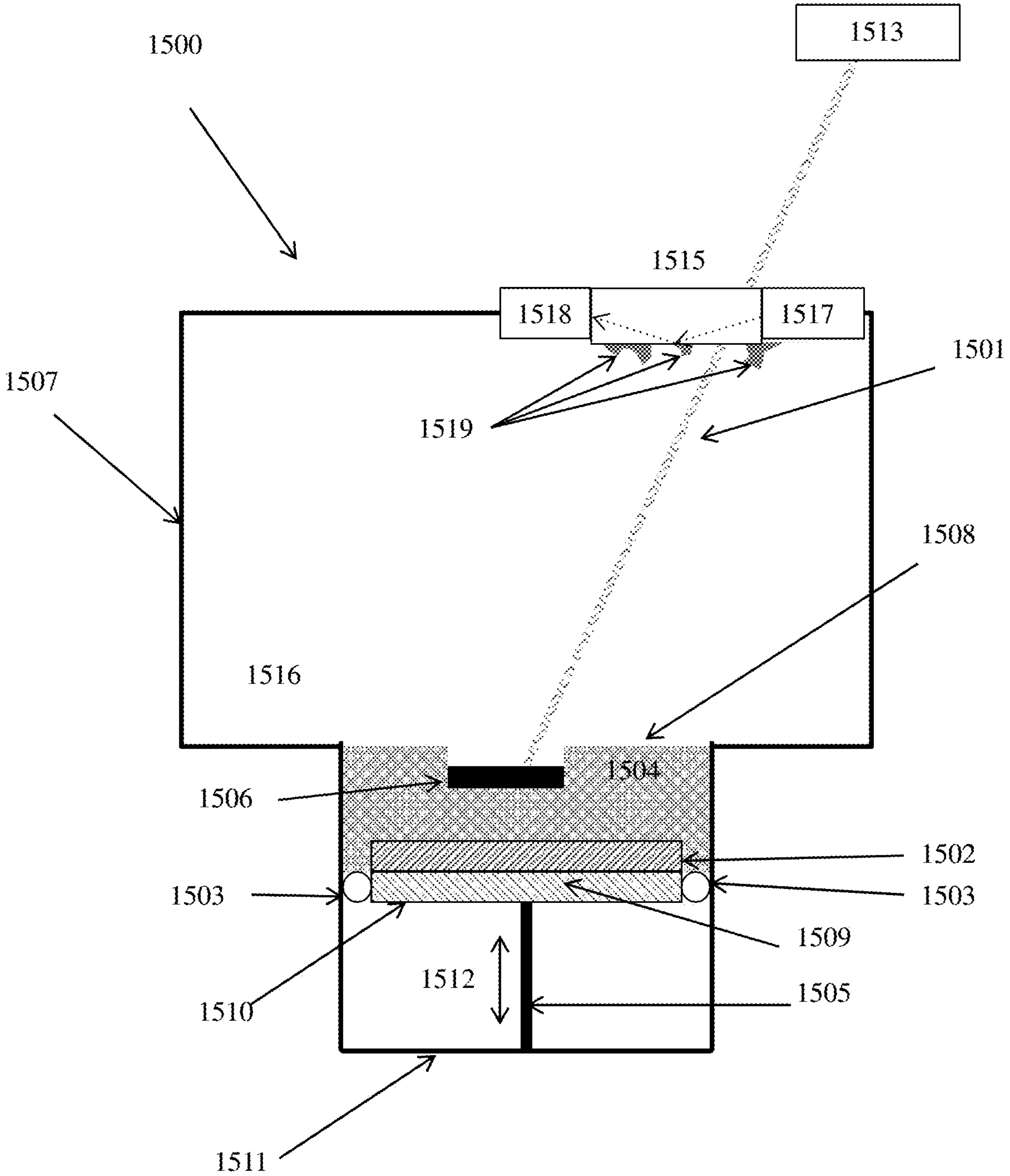
FIG. 15 shows a schematic of a system and apparatuses for forming a three-dimensional object by a three-dimensional printing methodology.

The sensor and/or energy source can be located within a wall of the enclosure. The sensor and/or energy source can be located at either side of the optical window. FIG. 15 shows an example of an optical window 1515, a first energy source 1517 disposed within the wall of the enclosure 1507 and to a first side of the optical window 1515, and a sensor 1518 disposed within the wall of the enclosure 1507 and to a second side of the optical window 1515. The first and second side can be perpendicular to each other, or directly opposite to each other (e.g., as in FIG. 15).

Figure 10:
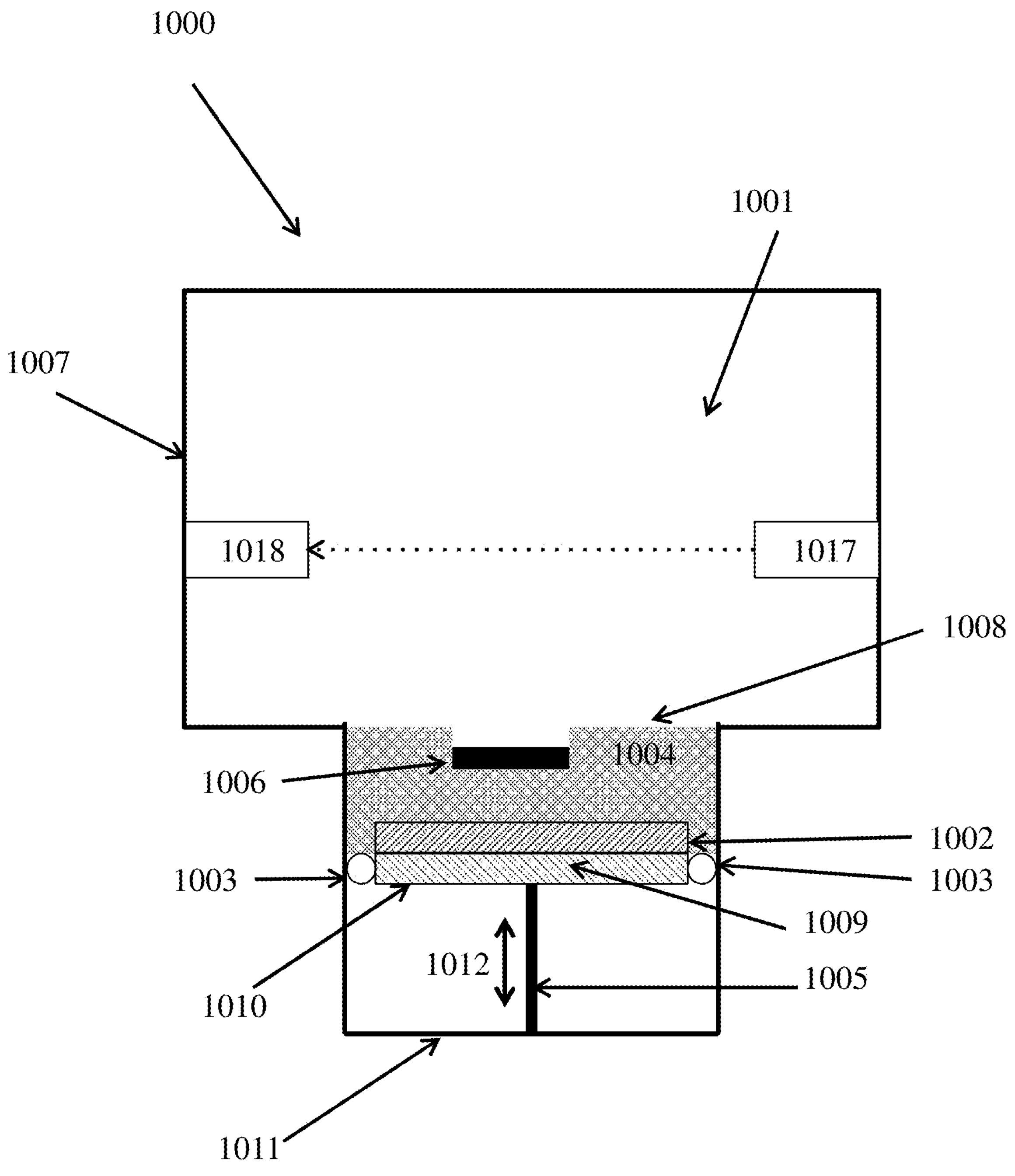
FIG. 10 shows a schematic of a system and apparatuses for forming a three-dimensional object by a three-dimensional printing methodology.

In some embodiments, the system, method, and/or apparatus disclosed herein may comprise an atmosphere cleanliness monitoring system. FIG. 10 shows an example of an atmosphere cleanliness monitoring system and/or apparatus that can be used in the methods disclosed herein. The atmosphere cleanliness monitoring system may monitor the environment (comprising a gas) within the enclosure. The atmosphere cleanliness monitoring system may comprise one or more energy beams (e.g., sound, charge, and/or electromagnetic beam such as a laser beam. E.g., FIG. 10, 1017). The energy beams may form a web of beam within the enclosure. The one or more energy beams may be collimated. Each energy beam may be directed towards a detector (e.g. an optical detector. E.g., 1018) that detects any alteration in the characteristics of the energy beam (e.g., the intensity and/or angle of the energy beam as compared to the emitted energy beam). The emitted energy beam may be altered as it encounters a species (e.g., debris) in the atmosphere of the enclosure. Any deviation from the intensity of the emitted energy beam may serve as an indication of the cleanliness of the atmosphere within the enclosure. The system measuring the cleanliness of the atmosphere may further comprise a laser beam profiler.

The atmosphere cleanliness monitoring system may comprise a device that captures, displays, and/or records the spatial intensity profile of the energy beam at a particular plane transverse to the beam propagation path. The energy beam may be a laser. The laser may be an ultraviolet, visible, infrared, continuous wave, pulsed, high-power, low-power, or any combination thereof. The beam profile can be measured using a laser beam profiler. The laser beam profiler may comprise a scanning-aperture or a charge coupled device (i.e., CCD) camera.

Figure 11:
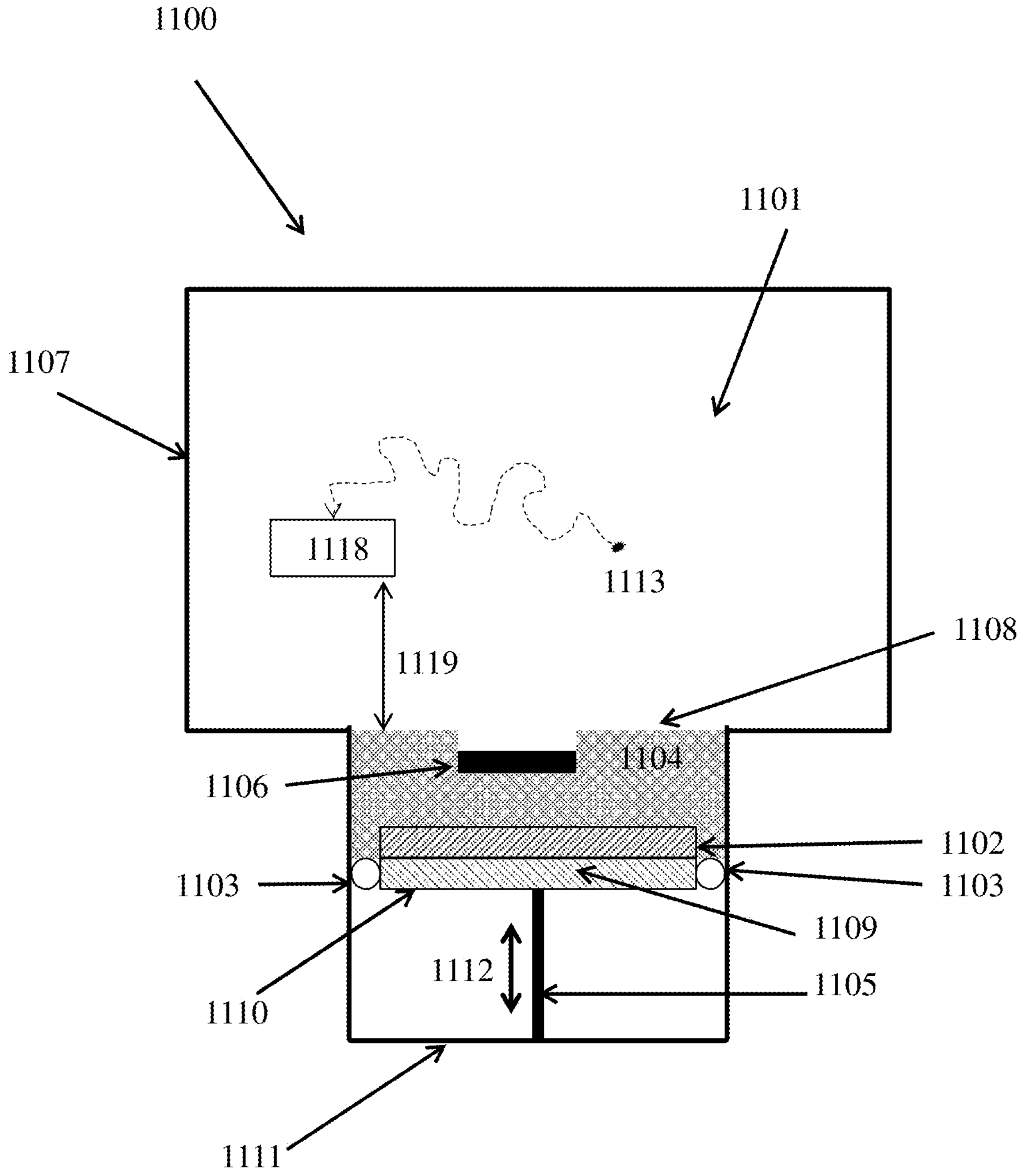
FIG. 11 shows a schematic of a system and apparatuses for forming a three-dimensional object by a three-dimensional printing methodology.

The atmosphere cleanliness monitoring system may comprise one or more particle counters to indicate the cleanliness of the atmosphere within the enclosure. FIG. 11 shows an example of a system and/or apparatus that can be used in the methods disclosed herein. The one or more particle counters (e.g., FIG. 11, 1118) may be located within the enclosure (e.g., FIG. 11, 1107). For example, the particle counter may be located at one or more walls of the enclosure. The particle counter may be embedded in any part within the enclosure (e.g., as disclosed herein). The particle detector (also designated herein as "particle counter," or "particle sensor") can measure a density of particles (e.g., FIG. 11, 1113) in the atmosphere with or without being exposed to direct particle flux originating from the material bed. The particle flux may include particle splatter, spray, sprinkle, scatter, dispersion, or any combination thereof. In some instances, the particle detector can measure a density of particles in the atmosphere without being exposed to direct particles originating from (e.g., splatter) from the material bed. The particle entrance port to the detector may be in a position that is opposing, or not looking at the material bed. The particle detector can be disposed in various positions within the enclosure, or embedded within any part of the enclosure (e.g., as disclosed herein). The particle detector may comprise obstructions that may lower the amount of particle originating from the material bed detected by the detector. The obstructions may comprise baffles. The system and/or apparatus may comprise obstructions that are connected or not connected to the particle detector, which obstructions may lower the amount of particle originating from the material bed detected by the detector. The obstructions may comprise baffles. In some instances, the particle opening port may face the exposed surface of the material bed. In some instances, the particle counter may detect particles arising from the material bed. The particle detector may be translatable (e.g., using a motor and/or scanner). The particle detector may measure particle (s) at a certain height (e.g., relative to the exposed surface of the material bed) within the enclosure (e.g., FIG. 11, 1119).

The particle counter may detect and/or counts particles (e.g., detect and/or counts particles one at a time). The particle counter may detect light scattering, light obscuration, and/or direct imaging of the particles. The particle counter may include a high intensity light source to illuminate the particle as it passes through a detection chamber. As particle passes through the light source (typically a laser or halogen light) the light may be scattered. The redirected light may be detected by an optical sensor (e.g., as used herein). The light source may be a halogen light. The light source may illuminate the particles from the back within a detection chamber. A high definition, high magnification image capturing device (e.g., video camera) may record the passing particles. The recorded video may then be analyzed by computer software to measure particle attributes. The amplitude of the light scattered or light blocked can be measured and the particle is counted and tabulated into standardized counting bins.

Direct imaging particle counting may use a high-resolution camera and light to detect particles. Vision based particle sizing units obtain 2D images that may be analyzed by a computer to obtain the particle size measurement (e.g., before, during and after formation of the 3D object). The system may determine the particle size, color and/or shape and type (e.g., chemical formula).

Stress and deformation of the 3D object can be monitored in real time during the formation the 3D object. The control system can alleviate, reduce, or counterbalance stress and or deformation that can occur in the 3D object during formation. When stress and/or deformation are detected in the 3D object above a (e.g., predetermined) threshold, the manufacturing process can be aborted or altered to reduce the deformation. Stress and/or deformation of the 3D object can be detected with high resolution triangulation of the part surface curvature, power measurements through a narrow slit, distance to part proximity mapping, scanning of a pyrometer and/or bolometer, colorimetry mapping, and or gap/layering detection using ultrasonic waves.

In some embodiments, the systems, apparatus, and method described herein for printing a 3D object may include an object detection system. The object detection system may comprise an ultrasound, radio wave, nuclear magnetic resonance, X-ray, or a magnetic field generator and/or detector. The object detection system may comprise ultrasound, radio wave, nuclear magnetic resonance, X-ray, or a magnetic field. The object detection system may comprise radar, magnetic resonance imaging, or computer tomography (CT). The computer tomography may be X-ray computer tomography. The object detection system may detect at least the volume of the 3D object or parts thereof (e.g., as they are being printed). The object detection system may detect at least a portion of a surface of the 3D object or parts thereof (e.g., as they are being printed). The object detection system may detect at least a portion of an interface between the 3D object and non-transformed material. The object detection system may detect at least a portion of an interface between the 3D object and the remaining substance in the material bed that excludes the 3D object.

Figure 13:
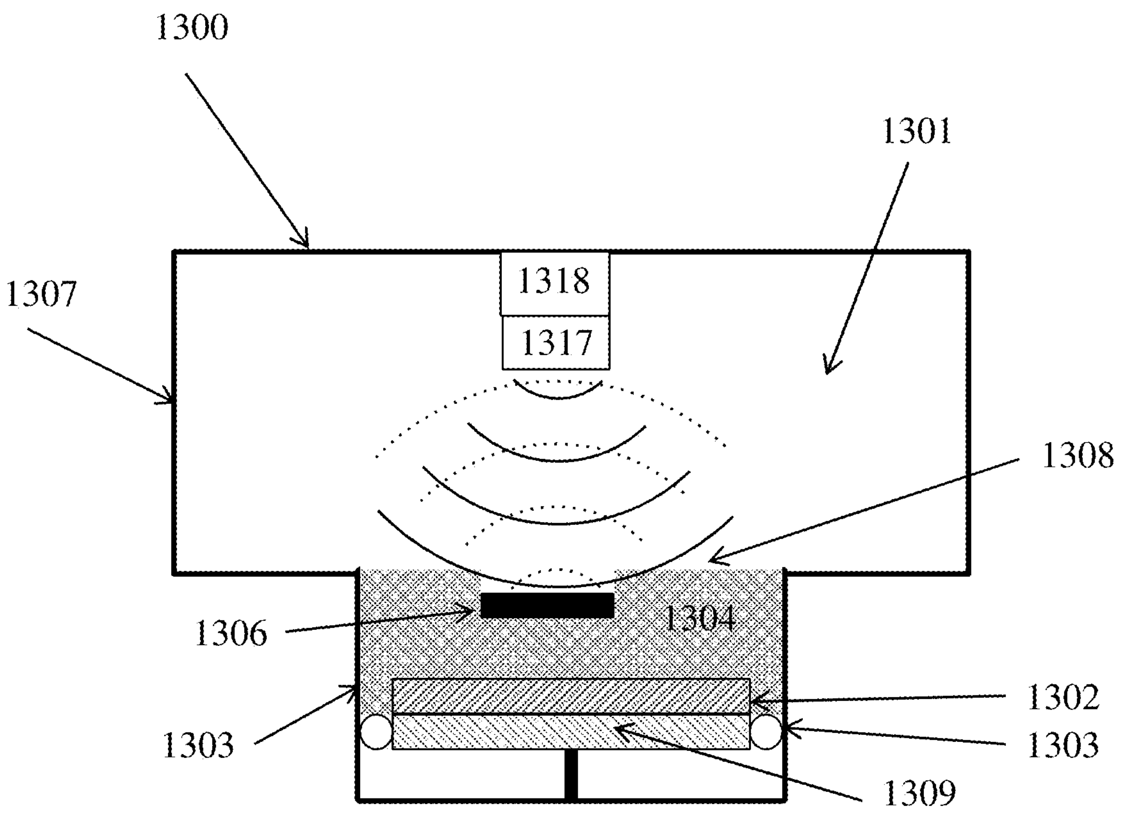
FIG. 13 shows a schematic of a system and apparatuses for forming a three-dimensional object by a three-dimensional printing methodology.

FIG. 13 shows an example of an object detection system and/or apparatuses that can be used in the methods described herein, comprising a wave emitter 1317 and a wave detector 1318, which may be an integral part of a transceiver (comprising 1317 and 1318), which detect a three dimensional structure of the object 1306 that is embedded in the material bed 1304.

Figure 18:
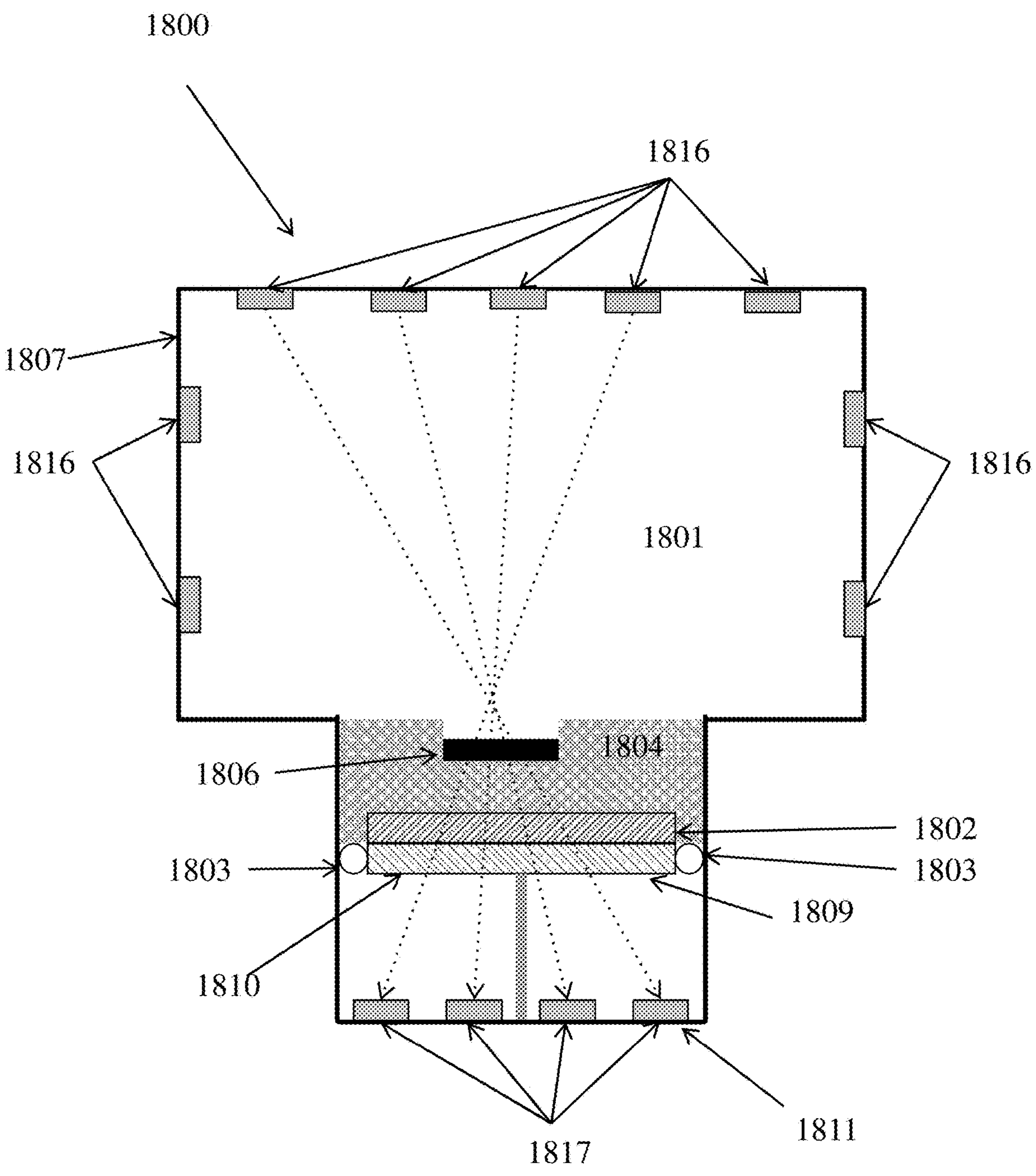
FIG. 18 shows a schematic of a system and apparatuses for forming a three-dimensional object by a three-dimensional printing methodology.

FIG. 18 shows an example of an object detection system and/or apparatuses that can be used in the methods described herein, comprising a multiplicity of beam (e.g., X-ray) emitters (e.g., sources) 1816 disposed above the material bed 1804, and a multiplicity of beam detectors 1817 disposed at the bottom of the enclosure and below the material bed 1804, which detect a three dimensional structure of the object 1806 that is embedded in the material bed 1804.

Figure 19:
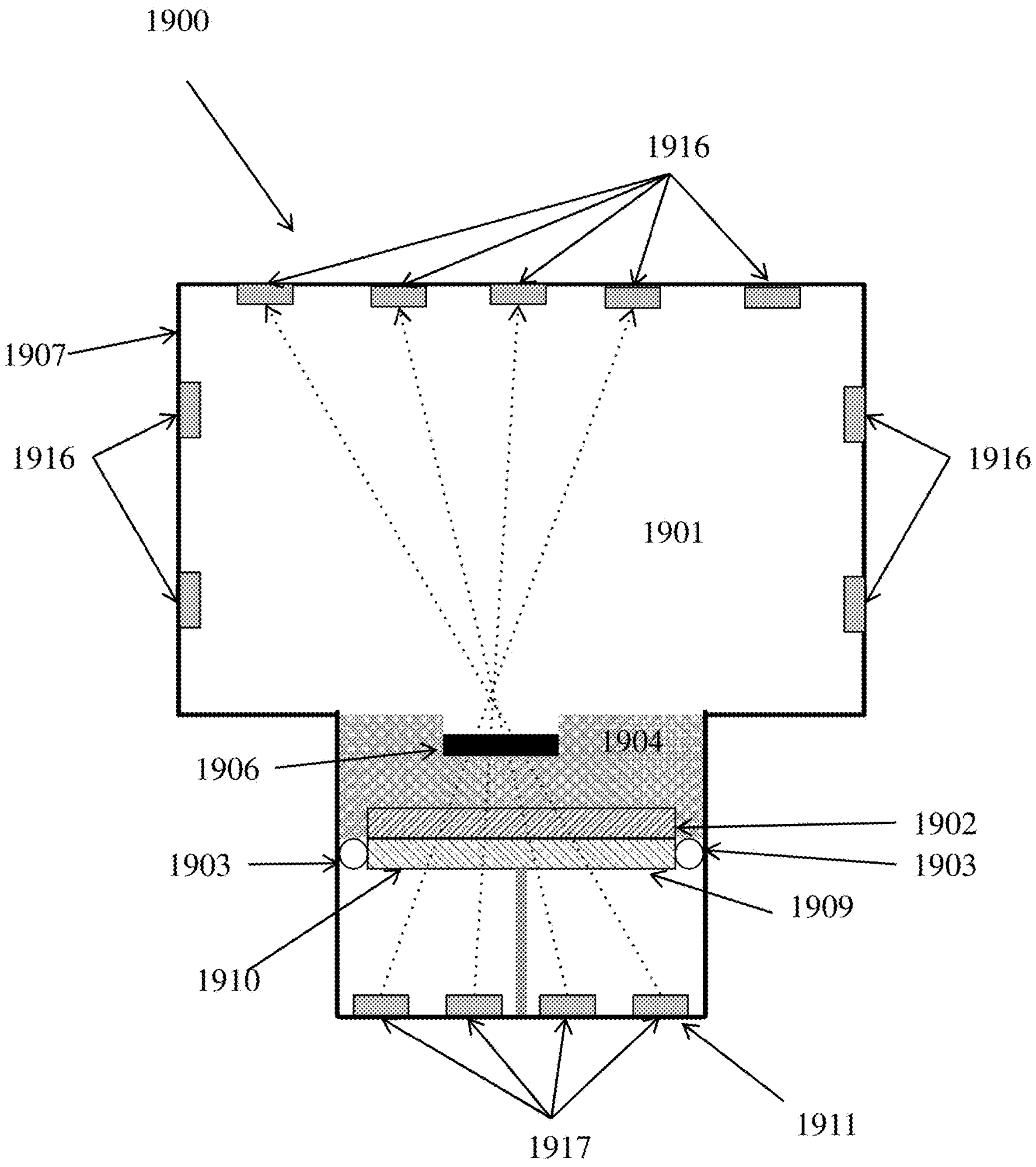
FIG. 19 shows a schematic of a system and apparatuses for forming a three-dimensional object by a three-dimensional printing methodology.

FIG. 19 shows an example of an object detection system and/or apparatuses that can be used in the methods described herein, comprising a multiplicity of beam (e.g., X-ray) emitters (e.g., sources) 1917 disposed at the bottom of the enclosure and below the material bed 1904, and a multiplicity of beam detectors 1916 disposed above the material bed 1904, which detect a three dimensional structure of the object 1906 that is embedded in the material bed 1904.

Figure 20:
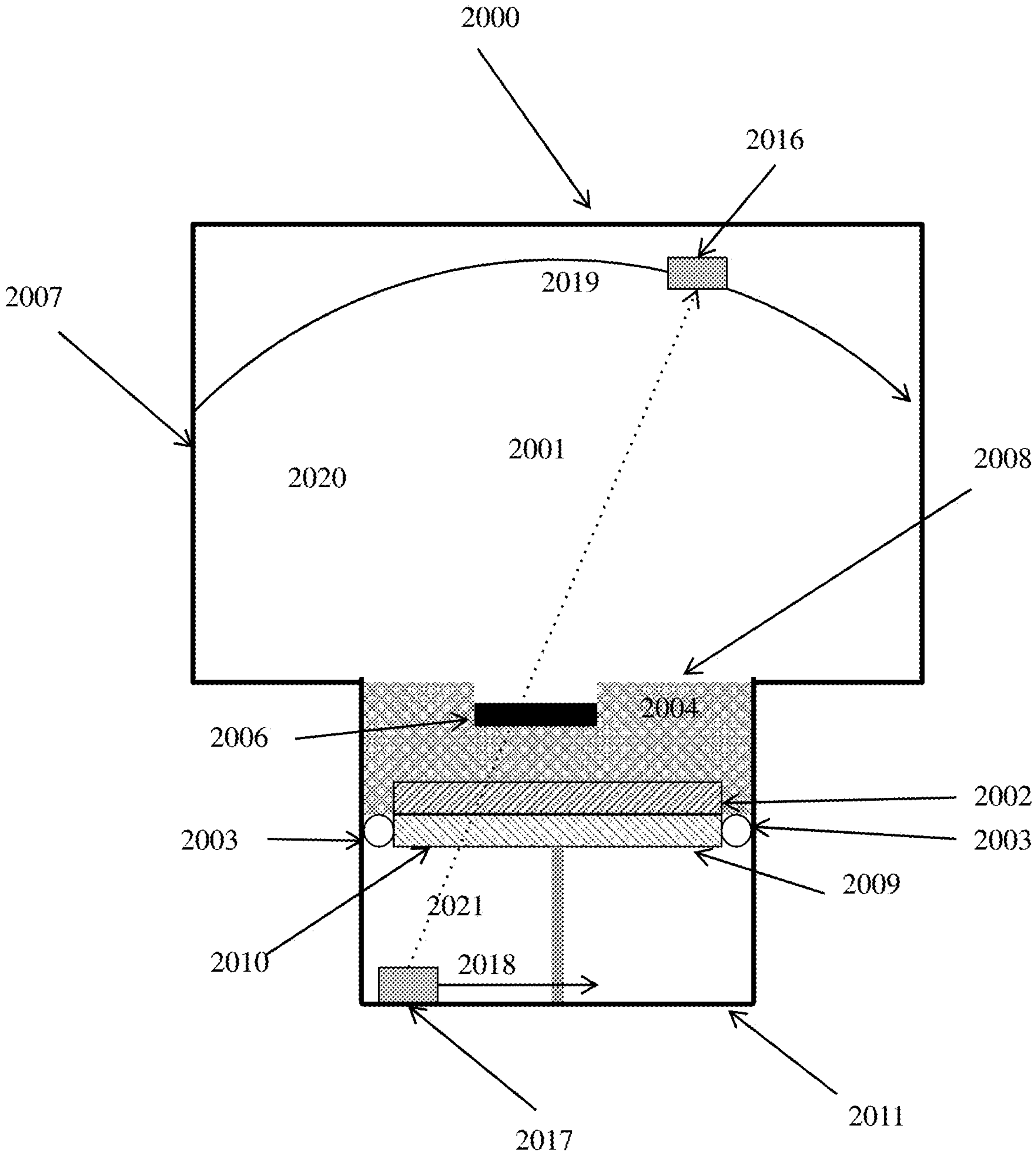
FIG. 20 shows a schematic of a system and apparatuses for forming a three-dimensional object by a three-dimensional printing methodology.

FIG. 20 shows an example of an object detection system and/or apparatuses that can be used in the methods described herein, comprising a beam (e.g., X-ray) source 2017 disposed below the material bed 2004, and a beam detector 2016 disposed above the material bed 2004, which detect a three dimensional structure of the object 2006 that is embedded in the material bed 2004. The source is translatable along a path 2018. The detector 2016 is translatable along a path 2019.

The translation of the detector may be coupled to the angle at which the energy beam is projected to (e.g., so that the detector may detect any non-dispersed angle). The translation of the detector may be coupled to the translation of the energy beam (e.g., so that the detector may detect any non-dispersed angle). In some instances, at least one of (e.g., both) the energy source and sensor can be moving. In some instances, at least one of (e.g., both) the energy source and sensor can be stationary.

Figure 21:
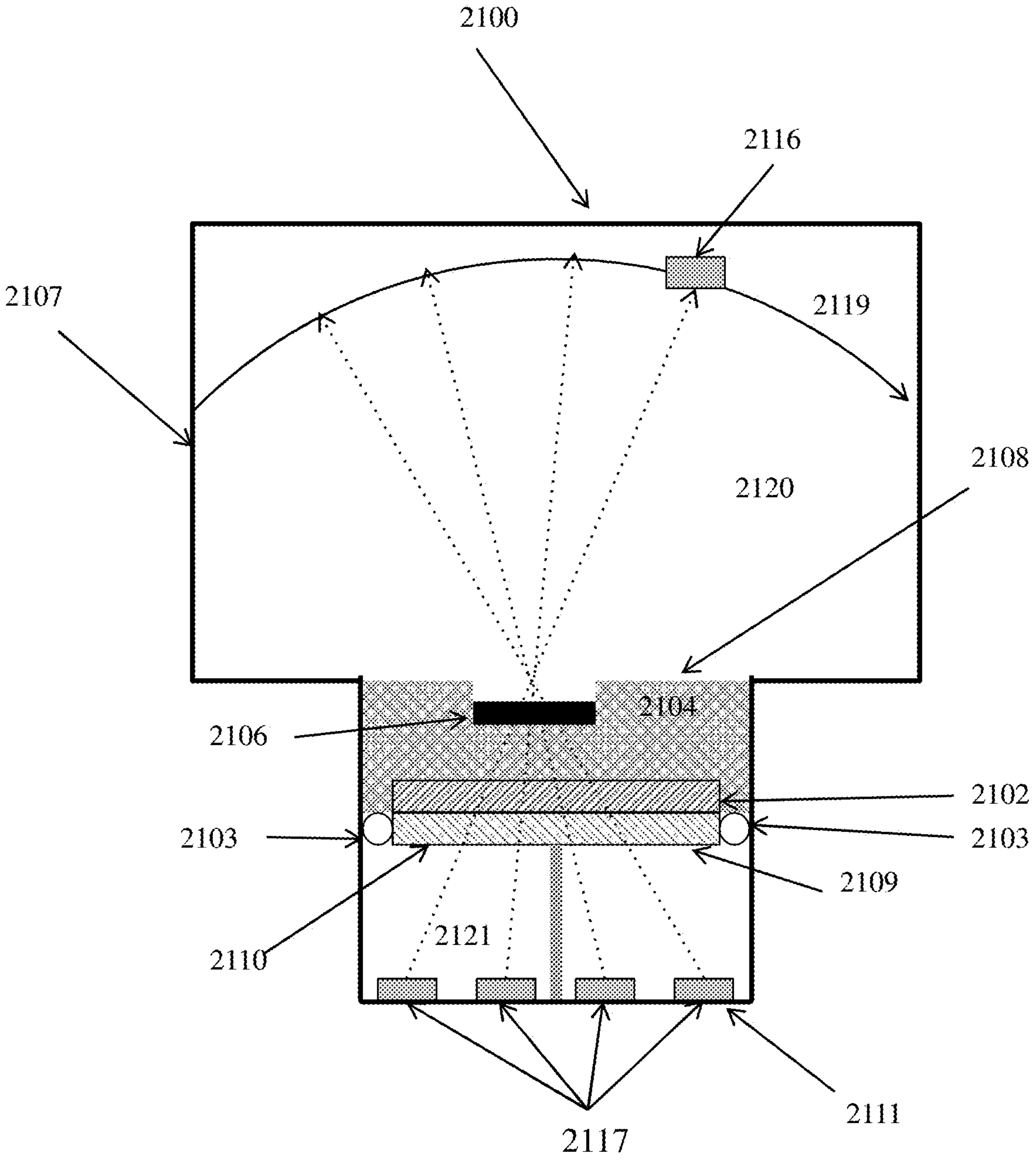
FIG. 21 shows a schematic of a system and apparatuses for forming a three-dimensional object by a three-dimensional printing methodology.

FIG. 21 shows an example of an object detection system and/or apparatuses that can be used in the methods described herein, comprising a beam (e.g., X-ray) source array 2117 disposed below the material bed 2104 (e.g., in the area 2121) at the bottom of the enclosure 2111, and a beam detector 2116 disposed above the material bed 2104 (e.g., in the area 2120) that travels along a path 2119, which detect a three-dimensional structure of the object 2106 that is embedded in the material bed 2104.

Figure 23:
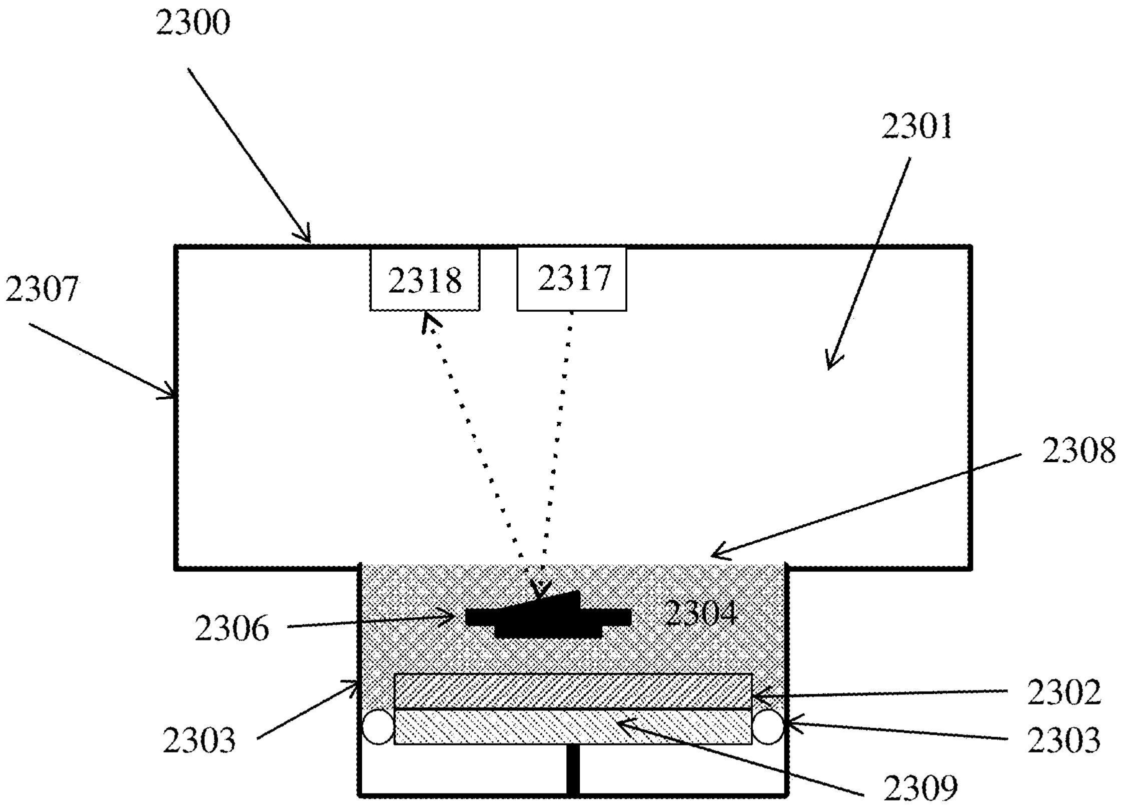
FIG. 23 shows a schematic of a system and apparatuses for forming a three-dimensional object by a three-dimensional printing methodology.

In some embodiments, the material bed (e.g., powder bed) portion comprising the pre-transformed material is at least partially transparent to an (e.g., incoming) energy beam. For example, the material bed portion comprising the pre-transformed material may be at least partially transparent to a sound wave, or electromagnetic beam (e.g., laser or X-ray beam). The electromagnetic beam may a visible beam. The material bed (e.g., powder bed) portion comprising the pre-transformed material (e.g., powder material) may be at least partially transparent to an energy beam, while the hardened material within the material bed (e.g., at least a portion of the 3D object) may be substantially less transparent (e.g., non transparent). The energy beam may travel through the at least a portion of the material bed that comprises the pre-transformed material and substantially reflect from the 3D object (or a portion thereof) within the material bed. The reflection of the energy beam from a surface of the hardened material (e.g., 3D object) may be greater than its reflection from the portion of the material bed comprising pre-transformed material. The at least partial transparency of the material bed as opposed to its reflection from the surface of the hardened material may allow the generation of an image of the surface of the hardened material from which the energy beam reflects (e.g., 3D object). The image may be generated in situ and in real time during the generation of the 3D object. The image may be generated in situ at an intermission from the 3D object printing process. The image may be generated in situ subsequent to the 3D object printing process. “In situ” refers to the object being in the enclosure and at least partially within the material bed. The image may allow evaluation of the height of a surface of the hardened material (e.g., from which the energy beam reflects). The image may allow evaluation of the planarity, evenness, and/or smoothness of the surface of the hardened material. The height may be calibrated using known absorption, reflection, and/or penetration of the energy beam through a volume of the material bed. Known may be experimental and/or theoretical. The height may be calibrated using a reference object that is embedded with known height marks within the material bed (e.g., a ruler). The method may comprise measuring absorption and/or reflection of the energy beam at one or more positions above the exposed surface of the material bed. The method may comprise imaging (e.g., using an optical sensor such as an imaging device) the hardened material. The method may comprise image processing. The method may comprise analyzing the spectrum of the energy beam (e.g., that is reflected and/or absorbed). The energy beam may be the energy beam that transforms at least a portion of the material bed to form a transformed material. The energy beam may be an energy beam different from the energy beam that transforms at least a portion of the material bed to form a transformed material. FIG. 23 shows an example of a 3D object 2306 that is embedded within a material bed 2304. An energy source 2317 generates an energy beam that is irradiated towards the substrate 2309. The energy beam penetrates at least in part into the material bed 2304. As the energy beam travels through the material bed 2304, it interacts with the surface of the 3D object 2306, from which it is (at least in part) reflected from. The reflected energy beam is detected by a detector 2318. The detector and the energy source may be separate. A transceiver may comprise the energy source and the detector. The detector may be an optical sensor (e.g., an imaging device).

The object detection system may comprise an energy source that produces an energy beam, a detector receiving altered and/or non-altered energy beams, a system that interprets the altered and/or non-altered energy beams detected by the detector, or any combination thereof. The object detection system may comprise a wave source that produces a wave (e.g., sound or light), a detector receiving an altered or non-altered wave, a system that interprets the altered or non-altered wave detected by the detector, or any combination thereof. The object detection system may comprise a field generator that produces a field (e.g., magnetic or electric), a detector sensing any alteration or non-alteration in the field, a system that interprets the altered or non-altered field detected by the detector, or any combination thereof. The object detection system may comprise transmission of an energy beam (e.g., sound, electromagnetic, or charged particle energy beam) by an energy source. The object detection system may comprise transmission of a wave (e.g., sound or light) by an energy source. The object detection system may comprise transmission of a field (e.g., electric or magnetic) by an energy source. The object detection system may rely on different dielectric constants, diamagnetic constants, density between the untransformed material and the 3D object, or density between the 3D object and the remainder of the material bed (e.g., that excludes the 3D object). Without wishing to be bound to theory, these differences may cause the generated energy beam, wave, or field to become altered due to the interaction with the boundary between the materials (e.g., of the untransformed material and the 3D object). The alteration may comprise deflection and/or scattering of energy (e.g., energy beam, wave). The alteration may comprise alteration in field lines (e.g., magnetic field lines), for example, alteration in the course, direction, and/or density of the field lines (e.g., vectors). The alteration may comprise alteration in the course, intensity, and/or footprint of the energy beam or wave. The object detection system may comprise transmission of a field (e.g., magnetic or electric), an energy beam (e.g., X-ray), sound wave (e.g., ultrasound or radio), or any combination thereof.

The object detection system may exclude transmission of an energy beam, wave, or field. The object detection system may exclude an energy source. The object detection system may rely on energy (e.g., field) that is emitted by the 3D object as it is being formed (e.g., magnetic field, electric field, or heat energy such as infrared energy (IR)). The electromagnetic energy may comprise X-ray.

The sound wave may be generated using a transducer (e.g., piezoelectric or capacitive transducer. E.g., ultrasound transducer). The sound generator may comprise a crystal (e.g., piezoelectric crystal). The transducer can comprise a contact or immersion transducer. The transducer may comprise a dual element, delay line, angle beam, normal incidence shear wave, or paint brush transducer. The transducer may comprise piston source transducer. Electrical pulses may drive the transducer at the desired frequency. The frequencies can be anywhere between 1 and 18 Mega Hertz (MHz). The transducers may alter the sound beam using lenses and/or phase array techniques. The alteration may comprise focusing, direction changing, or penetration depth of the beam. The energy source may comprise a scanner. The scanner may control the sound pulses (e.g., using beamforming). The sound wave may return to the transducer. The returned sound wave may vibrate the transducer. The transducer may turn the vibrations into electrical pulses that travel to the scanner (e.g., ultrasonic scanner) where they may be processed and transformed into a digital image.

The sound detector may comprise flow-meter (e.g., acoustic flow-meter such as an ultrasound flow-meter). The ultrasound detector may use the Doppler effect. The ultrasound detector may comprise fluid. The ultrasound detector may comprise a transducer. The sound generator and/or detector may comprise a device that is able to convert sound waves to electrical signals and/or vice versa (e.g., a transducer). The sound generator and/or detector can be a device that both transmits and receives (e.g., detects) sound wave (e.g., a transceiver). The sound generator and/or detector can comprise a material able to generate a voltage when force is applied to it. The sound generator and/or detector can comprise a material that can change size slightly when exposed to a magnetic field (e.g., using the principle of magnetostriction). The sound generator and/or detector can comprise a capacitor (e.g., condenser) microphone. The sound generator and/or detector can comprise a (thin) diaphragm that responds to sound waves. Changes in the electric field between the diaphragm and a closely spaced backing plate may convert sound signals to electric currents. The electric current can be amplified.

The object detection system may comprise a system that interprets the altered energy beams, wave, or field received by the detector. The interpretation may comprise determination of time elapsed from sending the energy (e.g., energy beam, wave, or field) to receiving the returning (e.g., altered or non-altered) energy and the strength of the altered energy. The altered energy may include deflected and/or returning energy beam or wave (e.g., echo).

In some embodiments, an energy beam (e.g., comprising a sound and/or electromagnetic wave) may be used to map at least a portion of the 3D object and generate a special map of the 3D object (e.g., volume of the 3D object or a portion thereof). In some embodiments, a field (e.g., comprising a magnetic and/or electric field) may be used to map at least a portion of the 3D object and generate a special map of the 3D object (e.g., volume of the 3D object or a portion thereof). The map may measure the progression of the 3D object formation in real time. The mapping may be conducted in real time (e.g., while the 3D object is being formed). The mapping may be conducted after the 3D object was formed, but while it is embedded within the material bed. The energy beam may have a wavelength that is greater than the FLS (e.g., median, average, or maximal size) of the particulate material that forms the material (e.g., powder) bed. The energy beam may travel within the material bed, and be reflected from an object (e.g., 3D object or parts thereof) within the material bed, and/or from the sides (e.g., walls and/or platform) that defines the boundaries of the material bed. The energy beam may travel within the material bed, and substantially not be deflected by the untransformed material within the material bed (e.g., powder particles). The energy beam (e.g., sound or electromagnetic wave) may be reflected when it approaches an object (e.g., 3D object) that has a dimension that is greater than or equal to its wavelength. For example, the sound wave may be an ultrasound, acoustic, or infrasound wave. The sound wave may be an ultrasound wave. The electromagnetic wave may be an X-ray, infrared, microwave, or radio wave. The radio wave may be an FM, AM, or long radio wave. The electromagnetic wave may have a wavelength that is at least about 0.1 μm, 1 μm, 10 μm, 100 μm, 1 mm, 10 mm, 100 mm, or 1 m. The sound or electromagnetic wave may have a wavelength that is at most about 0.5 μm, 1 μm, 10 μm, 100 μm, 1 mm, 10 mm, 100 mm, or 1 m. The sound or electromagnetic wave may have a wavelength that is any value between the afore-mentioned values (e.g., from about 0.1 μm to about 1 mm, from about 1 mm to about 100 mm, from about 100 mm to about 1 m). The sound wave may have a frequency that is higher than the upper audible limit of average human hearing. The frequency of the sound wave may be at least about 20 kilo Hertz (kHz), 50 kHz, 100 kHz, 200 kHz, 1000 kHz, 2000 kHz, 5000 kHz, 8000 Hz, 10000 kHz, 20000 kHz, 50000 kHz, 100000 kHz, 200000 kHz, 500000 kHz, or 10000000 kHz. The frequency of the sound or electromagnetic wave may be any value between the aforementioned values (e.g., from about 20 kHz to about 10000000 Hz, from about 20 kHz to about 200 kHz, from about 200 kHz to about 10000 kHz, from about 10000 kHz to about 10000000 kHz). At times the system and/or apparatus disclosed herein may use a combination of sound and electromagnetic waves.

The magnetic field may be generated by a magnetic field generator. The electric field may be generated by an electric field generator. The sound wave may be generated by a sound wave generator. The energy beam may be generated by an energy source (e.g., energy beam generator). The magnetic field may be detected by a magnetic field detector. The electric field may be detected by an electric field detector. The sound wave may be detected by a sound detector. The energy beam may be detected by an energy beam detector (e.g., an optical detector such as a spectrum analyzer). The generator may comprise a direct (DC) or alternating (AC) current. The generator may comprise a motor. The generator may comprise a magnet. The generator and/or detector may be operatively coupled and/or controlled (e.g., regulated and/or directed) by the controller. The generator may produce pulsed field or non-pulsed field. The generator may comprise a dynamo. The generator may comprise a solid state generator. The generator may comprise a magnet. The generator may comprise electric current (e.g., DC or AC). The generator may comprise a coil (e.g., Solenoid coil). The generator may comprise a coil whose length is greater (e.g., substantially greater) than its diameter. The magnetic field detector (e.g., sensor) can be a magnetometer.

The magnetic field detector (e.g., sensor) may comprise a Hall effect sensor, magneto-diode, magneto-transistor, anisotropic magnetoresistance (AMR) magnetometer, giant magnetoresistance (GMR) magnetometer, magnetic tunnel junction magnetometer, magneto-optical sensor, Lorenz force based MEMS sensor, Electron Tunneling based microelectromechanical systems (MEMS) sensor, MEMS compass, Nuclear precession magnetic field sensor, optically pumped magnetic field sensor, fluxgate magnetometer, search coil magnetic field sensor, or superconducting quantum interference device (SQUID) magnetometer. The magnetic field detector may comprise a coil through which current passes (e.g., induction coil). The electric field sensor may comprise an electric field proximity sensor. The electric field sensor may comprise MOS. The electric field sensor may comprise a dielectric material.

Sound waves (e.g., sound signals. E.g., ultrasound) can be used to monitor stress and/or deformation of the 3D object. Sound energy can be directed to the 3D object and/or the material bed. Sound signals can be emitted from the 3D object and/or material bed. Sound signals can be processed to detect discontinuities where discontinuities can comprise cracks, defects, gaps, and/or voids in the 3D object during and/or after formation. In some cases sound energy can be directed to the 3D object during formation. Sound energy can be directed with one or more sound (e.g., ultrasound transducers). A sound transducer can be a piezoelectric device. Sound signals from the 3D object can be detected by one or more sound (e.g., ultrasound) detectors to generate a sound map and/or image. Sound signals can have a frequency from about 20 kHz to about 2 MHz. Sound signals can have a frequency from about 100 kHz to about 500 kHz. The frequency of the Sound signals may have any value disclosed herein for the frequency of the sound or electromagnetic wave disclosed herein.

The one or more sound detectors can be adjacent to the platform. In some cases, one or more sound detectors can be under the platform such that the detectors are opposite an exposed surface of the material bed. The sound map and/or image can be compared to a model of an expected map and/or image to identify errors such as cracks, voids, and/or discontinuities in the 3D object.

A state of progression of the 3D printing process can be monitored using the system, apparatus and/or method disclosed herein (e.g., using the mapping process). The progress of printing the 3D object (e.g., generation of the volume map of the printed 3D object) can be monitored continuously or at discrete intervals during the manufacturing process. The volume of the printed 3D object can be determined, at least in part, by a reflectivity of one or more signals from the at least a portion of the 3D object that is embedded in the material bed. The progress of the 3D printing can be determined, at least in part, by a reflectivity of one or more signals from an energy source located outside of the enclosure towards the material bed, and measuring any reflection of the signal by using a detector located outside of the enclosure. The progress of the 3D printing can be determined, at least in part, by a reflectivity of one or more signals from an energy source located outside of the enclosure towards the material bed, and measuring any reflection of the signal by using a detector located inside the enclosure. The progress of the 3D printing can be determined, at least in part, by a reflectivity of one or more signals from an energy source located inside the enclosure towards the material bed, and measuring any reflection of the signal by using a detector located outside of the enclosure. Progress of the 3D printing can be determined, at least in part, by a reflectivity of one or more signals from an energy source located inside the enclosure towards the material bed, and measuring any reflection of the signal by using a detector located inside the enclosure. The progress of the 3D printing can be determined mostly or entirely inside the enclosure. The progress of the 3D printing can be determined mostly or entirely outside of the enclosure. The progress of the 3D printing can be determined mostly or entirely during the formation of the 3D object (e.g., simultaneously. E.g., in real time). In some embodiments, the energy beam may scan at least a portion (e.g., the entire) material bed. In some embodiments, the energy beam may penetrate at least a portion (e.g., the entire) material bed. Multiple locations in the material bed can be tested to determine a reflectivity value at multiple locations in the material bed corresponding to a volume of at least a portion of the 3D object. When the volume of the printed 3D object deviates from an expected volume, the printing process may be altered (e.g., using a controller). When the volume of the printed 3D object indicates a completion of the 3D printing process, the printing process may stop (e.g., using a controller).

At least one of (e.g., both) the energy source that produces the energy beam and/or the detector receiving altered energy beams of the object detection system may be embedded in the platform (e.g., in the base), walls of the enclosure, any other part within the enclosure, or any combination thereof. The sources and/or detectors can be stationary, moveable, or any combination thereof.

FIG. 7 shows an example of a platform (e.g., base 702) that includes detectors and/or energy sources 717. In an analogous manner, the base 702 may include at least part of the components of the object detection system (e.g., the energy source and/or the detector). In some embodiments, the platform excludes a detector (e.g., sensor). For example, the platform may exclude a temperature and/or a weight sensor.

In some embodiments, the spectral characteristics (e.g. the color) of at least a portion of the formed 3D object (or pats thereof) may be detected and/or evaluated using a detector (e.g., sensor). This method may be referred herein as "colorimetry". The detector may comprise an optical sensor (e.g., as described herein), an image-capturing device, a spectrum analyzer. The spectrum analyzer may be a device measuring absorption and/or emission wavelengths (e.g., FTIR, or UV-Vis measuring device). The image-capturing device may be a camera or an optical scanner.

The color of a position in/on the 3D object may indicate the temperature at which it was formed, and/or the time spent by the energy beam forming the 3D object in that position and/or at that temperature. The color may be of a position on a surface of the 3D object. The color may be affected by presence of a reactive (e.g., chemical) species in the atmosphere of the chamber during formation of the 3D object. The color of a position on the 3D object may indicate the temperature at which the meltpool(s) at that position was formed, and/or the time spent by the energy beam at that position and/or at that temperature in a known atmosphere. The known atmosphere may allow cancellation of any chemical effects (e.g., reaction of the surface with reactive species present in the atmosphere). The reactive species may include hydrogen, humidity, oxygen, hydrogen sulfide, sulfur dioxide, carbon monoxide, oxidized nitrogen compounds ($NO_x$), volatile organic compounds (VOC), ozone, or any combination thereof.

Discontinuities in the 3D object can be detected using colorimetry. Colorimetry can be used to identify difference in heat transfer through the 3D object and/or chemical reactions on the surface (e.g., oxidation and/or nitrogenation) of the 3D object. Colorimetry measurements of the 3D object can be processed to identify stress and/or discontinuities that occur in the 3D object during formation.

One or more signals can be emitted from the untransformed material and/or at least a portion of the 3D object. In some cases, the signals can be electromagnetic energy (e.g., light) that is reflected and/or scattered by the untransformed material and/or the 3D object. The signals can be detected (e.g., by a spectrum analyzer). The detected signals can be associated with a spatial location on the material bed. The detectors can be single cell detectors. The detected signals can be time stamped such that they can correspond to a predetermined time interval during the manufacturing of the 3D object. One or more spatial and/or material profiles of the 3D object and or the untransformed material can be generated from the signals collected at one or more detectors.

Figure 9:
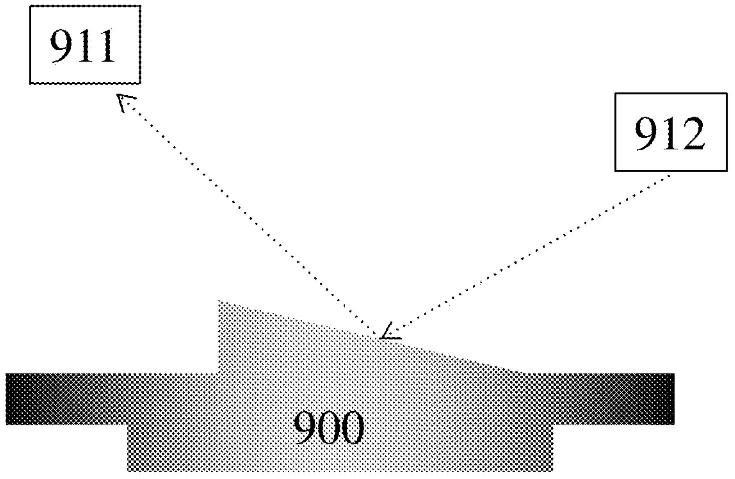
FIG. 9 shows a schematic of a system and apparatuses for detecting the roughness of a three-dimensional object surface.

FIG. 9 shows an example of a 3D object 900 that exhibits a spectral diversity at its surface. An energy source 912 emits an energy beam towards a surface of the 3D object 900, which is deflected and captured by a detector 911 that analyzes at least one characteristic of the altered energy beam (e.g., its spectrum, angle, and/or intensity).

The spatial and/or material profile can be a map selected from the group consisting of differential contrast map between the 3D object and the untransformed material, spatial color map of the 3D object and/or the untransformed material, spatial map of an interface between the 3D object and the untransformed material, temperature map of the 3D object and/or the untransformed material, thermal dissipation map, dark field map, bright field map, stress or deformation map of the 3D object and/or the untransformed material, proximity map of the untransformed material, scattering map of the one or more signals, spectral map from the one or more signals, integral power emission map of the 3D object and/or the untransformed material, reflectivity map, temperature decay map, roughness map, and/or height uniformity map.

A spatial and/or material profile can be a thermal profile. A thermal profile can be measured by an array of detectors. The thermal profile can be a hardening (e.g., solidification) profile and/or a cooling profile. The cooling profile can be a time history of a temperature gradient in one or more spatial locations in the untransformed material. In some cases, a hardening and/or cooling profile can be processed to determine one or more material properties of the 3D object, for example grain size and/or melt pools forming the 3D object. The thermal profile can be a temperature profile as a function of time and/or space.

The systems, apparatuses, and/or methods used herein may comprise using spontaneously or at predetermined times a closed loop control based on at least one temperature measurement conducted by a sensor. The closed loop control may comprise adjusting a 3D printing system to reach a target temperature based on one or more sensor measurements. The sensor may include an optical and/or plasma sensor. The sensor may include any temperature sensor (e.g., as disclosed herein).

The heat measurements may be a measurement of a particular position that is being heated, was heated, or is being heated by an energy beam (e.g., laser). The heat measurement may be in the range of at least about 500° C., 250° C., 100° C., 50° C., 25° C., or 10° C. below the melting point (m.p.) of the powder material, up to at most about 10° C., 25° C., 50° C., 100° C., 250° C., or 500° C. above the m.p. of the powder material.

The heat measurement may facilitate creation of a heat map, solidification map, and/or solidification profile of a 3D object or any part thereof (e.g., a layer of the 3D object, or a surface of the 3D). The heat measurement may facilitate an indication of the temperature at a position of the 3D object during its formation.

The heat measurement may measure the temperature and/or solidification rate at a position before, during and/or after the laser beam reached that position. The heat measurements may allow prediction of the temperature and/or solidification rate at a position before the energy beam reached that position to form at least a portion of the 3D object. The heat measurements may allow manipulation of the temperature of the material bed, the target position, the energy beam power, intensity, and/or footprint before the energy beam transforms at least a portion of the material bed at the target position. The temperature manipulation may include lowering, maintaining, or elevating the temperature at the target position. The manipulation may be a manipulation to reach a target temperature value. The manipulation may be a manipulation to reach a target temperature value. The temperature manipulation may allow control of the temperature and/or solidification rate at the target position. The control may allow maintenance of a homogenous temperature and/or solidification rate of a desired portion of the 3D object (e.g., the entire 3D object).

The optical sensor may be used for temperature measurements. The optical sensor may include any optical sensor disclosed herein. For example, the optical sensor may include an analogue device (e.g., CCD). The optical sensor may include a p-doped metal-oxide-semiconductor (MOS) capacitor, charge-coupled device (CCD), active-pixel sensor (APS), micro/nano-electro-mechanical-system (MEMS/NEMS) based sensor, or any combination thereof. The APS may be a complementary MOS (CMOS) sensor. The MEMS/NEMS sensor may include a MEMS/NEMS inertial sensor. The MEMS/NEMS sensor may be based on silicon, polymer, metal, ceramics, or any combination thereof.

In some embodiments, plasma can be created during the 3D printing process by causing heating of a gas or subjecting the gas to a strong electromagnetic field. The appearance of plasma may reduce the throughput of the 3D printing process. The electromagnetic field can be applied, for example, with a laser or microwave generator. The heating may be caused by heating and/or transforming a material (e.g., pre-transformed material) within the material bed (e.g., using an energy beam). The plasma may be formed in the enclosure during the process of 3D printing, for example, due to evaporating ionized material at a high temperature and/or speed of the energy beam while projecting it on at least a portion of the material bed. The at least one gas in the enclosure atmosphere may absorb at least a portion of the energy of the energy beam (e.g., become over heated) and may become ionized (i.e., form plasma). A plasma monitoring system may comprise measuring the amount of conductivity in the plasma using at least one conductivity sensor. The plasma monitoring system may comprise measuring the emission wavelength of the plasma using at least one optical sensor (e.g., as disclosed herein). The plasma monitoring system may comprise measuring the plasma density (e.g., electrical density). The plasma monitoring system may comprise measuring the plasma temperature. The formed plasma may subsequently be quenched, for example, by interacting with the material bed, the platform, the walls of the enclosure and/or with any other part within the enclosure.

The ionization of the atmosphere may cause a positive feedback of additional ionization of the enclosure atmosphere. The ionization of the atmosphere may cause an enhancement and/or amplification of the plasma formation by its own influence on the process that gives rise to it. In order to maintain a constant level of plasma, the speed, cross section, and/or power of the energy beam may be adjusted. The adjustment may be manual and/or automatic (e.g., by a controller). In order to maintain a constant level of plasma, a cooling member (e.g., heat sink) may be introduced to reduce the temperature of the plasma.

The appearance of plasma, its location and/or its intensity, may serve as an indication of the temperature at the position in the material that is being transformed. The appearance of plasma, its location and/or its intensity may indicate a system instability (e.g., system drift). The appearance of plasma, its location and/or its intensity may indicate an instability (e.g., drift) in the 3D printing process.

The plasma may emit in wavelengths that are not otherwise emitted in the system, and thus may be used as a distinct (e.g., unique) detector of the temperature (e.g., at a specific position in the material bed). The usage of the distinct wavelength may allow fast detection of the temperature at the particular (e.g., melting) position. The plasma monitoring system may comprise an optical detector (e.g., spectrometer). The plasma monitoring system may comprise a computer that analyzes the detected signals. The plasma monitoring system may comprise one or more detectors that reside inside, outside, or embedded within at least one part of the enclosure. The detector may be embedded within the wall and/or platform of the enclosure. The plasma monitoring system may be controlled by a controller. The controller may adjust at least one characteristic of the energy beam in response to an output of the plasma monitoring system. The controller may adjust at least one characteristic of the energy beam in response to an output of a detection signal gathered by at least one of the plasma monitoring system detectors. The plasma detector may comprise a magnetic field detector (e.g., as described herein). The plasma detector may comprise a coil. The plasma detector may comprise a pick-up coil, or Hall probe. The plasma detector may rely on the magneto-optic effect (e.g., Faraday effect). The plasma sensor may be an optical sensor (e.g., spectrum analyzer).

The wavelength regiment of the plasma sensor (e.g., spectrometer) may be from at least about 5 nanometers (nm), 10 nm, 50 nm, 100 nm, 150 nm, 200 nm, 250 nm, 300 nm, 350 nm, 400 nm, 450 nm, 500 nm, 600 nm, 700 nm, or 800 nm. The wavelength regiment of the plasma sensor may be up to at most about 10 nm, 50 nm, 100 nm, 150 nm, 200 nm, 250 nm, 300 nm, 350 nm, 400 nm, 450 nm, 500 nm, 600 nm, 700 nm, or 800 nm. The wavelength regiment of the plasma sensor may be between any value between the aforementioned values (e.g., from about 5 nm to about 500 nm, from about 5 nm to about 250 nm, from about 5 nm to about 50 nm, from about 250 nm to about 500 nm, or from about 500 nm to about 800 nm).

A computer system can be in communication with the detectors, sensors, and/or controller. The computer system can comprise one or more computer processors programmed or otherwise configured to process one or more signals collected at the one or more detectors. The processing of the signals can comprise multi-wavelength analysis of the signals. The signals can be processed by the computer system to monitor a manufacturing process. The signals can be used in a feedback loop control during formation of a 3D object. The feedback loop can be used to, without limitation, (i) assess a quality of the 3D object during formation, (ii) make any necessary corrections to the 3D object during formation, (iii) optimize the formation of the 3D object to minimize material use and/or overall processing time, and/or (iv) to generate sample working conditions that will allow the system to fabricate the 3D object without using a feedback loop control. For example, signals collected during formation of the 3D object can be used to regulate the supply of energy to a material bed in real time to correct deviation of the 3D object from a model design.

One or more signals can be collected from the 3D object and/or the untransformed material by at least one detector in sensing communication with the 3D object and/or the untransformed material, as described herein. The sensing communication can be electronic and/or optical communication. The computer system can process the signals collected by the at least one detector to determine a deviation of the 3D object or portion thereon from a model design. A map that is generated based on one or more signals can be compared to a model of the 3D object to determine a state or property of the 3D object and/or untransformed material and/or a state or progression of the 3D printing process. The state of the 3D printing process can comprise a degree of completion of the 3D object. The model design can comprise a temporal evolution component such that the model design includes a model for a complete 3D object as well as a model for the 3D object at intermediate manufacturing steps. The temporal evolution model can depend, at least in part, on temperature decay of the 3D object in the material bed. The computer system can instruct a controller to alter a pattern of scanning by the energy source to reduce or maintain the deviation. Corrective measures can be employed to the additive manufacturing process to decrease or eliminate the deviation. The deviation can be reduced to less than or equal to about 10%, 5%, or 1%, where the deviation percent can be the current deviation relative to an ideal model value. When the deviation exceeds a (e.g., predetermined) threshold the computer system can instruct the controller to abort the manufacturing process.

In some cases, the signals can be processed using a triangulation technique. The triangulation technique can produce spatial data about the powder bed and/or the 3D object. In some cases the triangulation technique can process the one or more signals to determine a location of the 3D object relative to the material bed.

Figure 5:
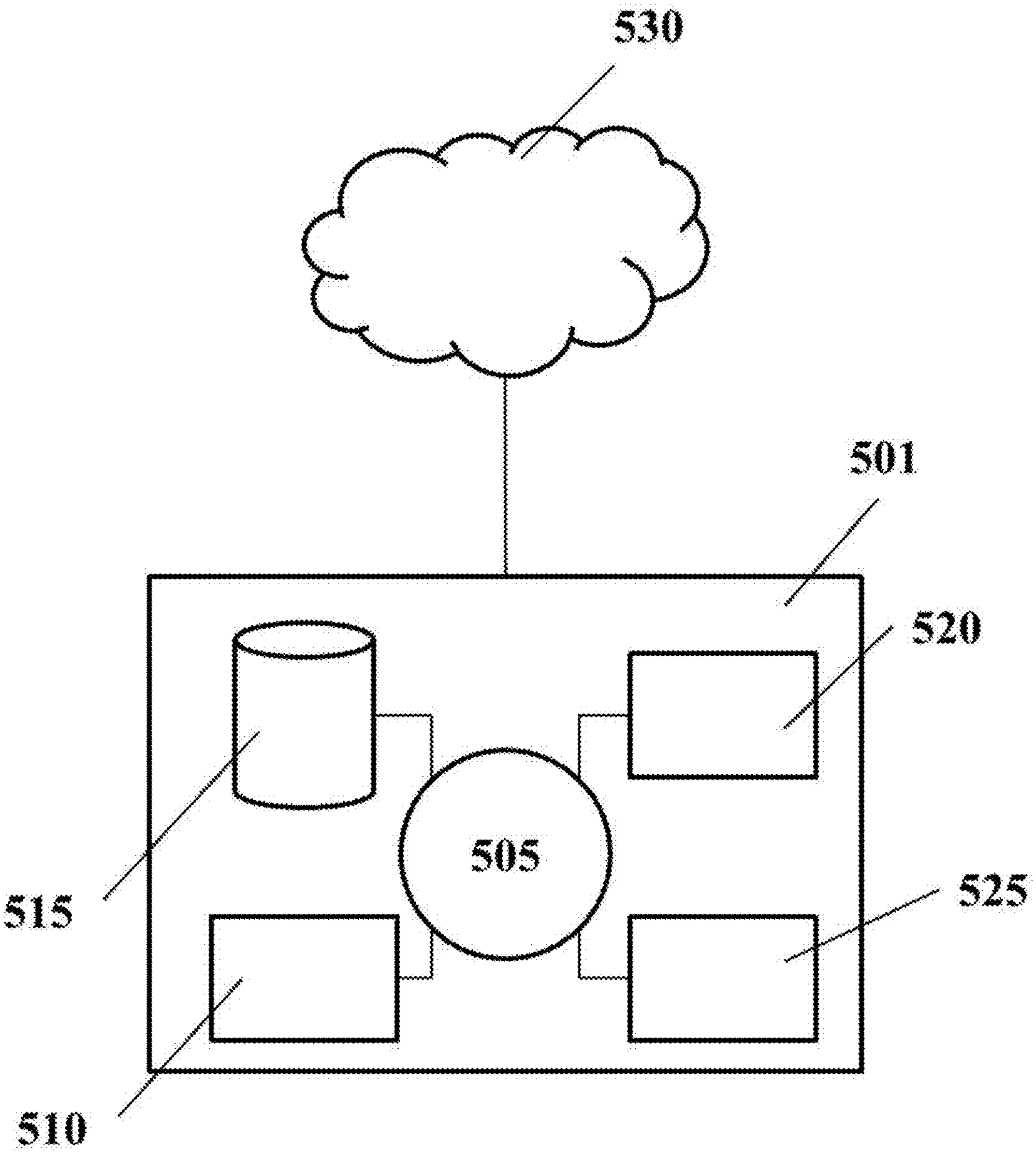
FIG. 5 shows a schematic of a computer system programmed or otherwise configured to regulate the formation of a three-dimensional object.

FIG. 5 shows a computer system 501 that is programmed or otherwise configured to control additive manufacturing system provided herein. The computer system can include various parameters of such systems, such as, for example, the rate at which an object is additively generated, the supply of energy from one or more energy sources that supply energy to a untransformed material adjacent to the platform, environmental conditions in the enclosure (e.g., chamber) in which the 3D object is formed (e.g., pressure and/or gas composition).

For example, the computer system 501 controls the scanning rate and/or location of energy supplied from an energy source to at least a portion of the material bed. In some cases, energy is supplied to the material bed along a path. The computer system 501 can direct a scan of the energy beam in a raster and/or vector pattern on the surface of the material bed to form the 3D object or a portion thereof. The computer system can control the material bed and dwell time of the energy beam. When the energy beam is supplied from an energy source, then the computer system can control (e.g., regulate and/or direct) the modulation of the energy beam (e.g., turn the energy source on/off). When the energy beam is supplied from a laser system having an array of laser diodes, then the computer system can turn different diodes on and off.

The computer system 501 can include processing unit 505. The processing unit may be any processing unit disclosed in patent application No. 62/252,330, titled "APPARATUSES, SYSTEMS AND METHODS FOR THREE-DIMENSIONAL PRINTING," filed on Nov. 6, 2015, which is entirely incorporated herein by reference. The processing unit may be a central processing unit (e.g., CPU). The processing unit may be referred herein as "processor" or "computer processor." The processing unit can be a single core or multi core processor, or a plurality of processors for parallel processing. The computer system also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory, storage unit, interface, and peripheral devices are in communication with the processing unit through a communication bus (solid lines), such as a motherboard. The storage unit can be a data storage unit (or data repository) for storing data. The computer system can be operatively coupled to a computer network ("network") 530 with the aid of the communication interface. The network can be the Internet, an internet and/or extranet, or an intranet and/or extranet that is in communication with the Internet. The network can be a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory. Examples of operations performed by the processing unit can include fetch, decode, execute, and write-back.

The processing unit can be part of a circuit, such as an integrated circuit. One or more other components of the system can be included in the circuit. In some cases, the circuit is an application specific integrated circuit (ASIC).

The storage unit can store files, such as drivers, libraries and saved programs. The storage unit can store user data, e.g., user preferences and user programs. The computer system in some cases can include one or more additional data storage units that are external to the computer system, such as located on a remote server that is in communication with the computer system through an intranet or the Internet.

The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory or electronic storage unit. The machine executable or machine readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) for providing, for example, a design of an object to be formed by the additive manufacturing system, status of one or more components in the additive manufacturing system, or time remaining to form an object. Examples of UI's include, without limitation, a graphical user interface (GUI) and web-based user interface.

Methods and systems of the present disclosure can be implemented by way of one or more algorithms. An algorithm can be implemented by way of software upon execution by one or more computer processors.

In some cases, a layer of the 3D object can be formed within at most about 1 hour (h), 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A layer of the 3D object can be formed within at least about 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A layer of the 3D can be formed within any time between the aforementioned time scales (e.g., from about 1 h to about 1 s, from about 10 min to about 1 s, from about 40 s to about 1 s, from about 10 s to about 1 s, or from about 5 s to about 1 s).

The final form of the 3D object can be retrieved soon after cooling of a final material layer. Soon after hardening (e.g., cooling) may be at most about 1 day, 12 hours (h), 6 h, 5 h, 4 h, 3 h, 2 h, 1 h, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the aforementioned time values (e.g., from about 1 s to about 1 day, from about 1 s to about 1 hour, from about 30 minutes to about 1 day, or from about 20 s to about 240 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen. Cooling may be cooling to a temperature that allows a person to handle the 3D object. Cooling may be cooling to a handling temperature. The 3D object can be retrieved during a time period between any of the aforementioned time periods (e.g., from about 12 h to about 1 s, from about 12 h to about 30 min, from about 1 h to about 1 s, or from about 30 min to about 40 s).

The generated 3D object can require very little or no further processing after its retrieval. In some examples, the diminished further processing or lack thereof, will afford a 3D printing process that requires smaller amount of energy and/or less waste as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the aforementioned values (e.g., from about 1.1 to about 10, or from about 1.5 to about 5). Further processing may comprise trimming, as disclosed herein. Further processing may comprise polishing (e.g., sanding). For example, in some cases the generated 3D object can be retrieved and finalized without removal of transformed material and/or auxiliary features. The 3D object can be retrieved when the 3D part, composed of hardened (e.g., solidified) material, is at a handling temperature that is suitable to permit the removal of the 3D object from the material bed without substantial deformation. The handling temperature can be a temperature that is suitable for packaging of the 3D object. The handling temperature a can be at most about 120° C., 100° C., 80° C., 60° C., 40° C., 30° C., 25° C., 20° C., 10° C., or 5° C. The handling temperature can be of any value between the aforementioned temperature values (e.g., from about 120° C. to about 20° C., from about 40° C. to about 5° C., or from about 40° C. to about 10° C.).

The methods and systems provided herein can result in fast and efficient formation of 3D objects. In some cases, the 3D object can be transported within at most about 120 min, 100 min, 80 min, 60 min, 40 min, 30 min, 20 in, 10 min, or 5 min after the last layer of the object hardens (e.g., solidifies). In some cases, the 3D object can be transported within at least about 120 min, 100 min, 80 min, 60 min, 40 min, 30 min, 20 min, 10 min, or 5 min after the last layer of the object hardens. In some cases, the 3D object can be transported within any time between the above-mentioned values (e.g., from about 5 min to about 120 min, from about 5 min to about 60 min, or from about 60 min to about 120 min). The 3D object can be transported once it cools to a temperature of at most about 100° C., 90° C., 80° C., 70° C., 60° C., 50° C., 40° C., 30° C., 25° C., 20° C., 15° C., 10° C., or 5° C. The 3D object can be transported once it cools to a temperature value between the above-mentioned temperature values (e.g., from about 5° C. to about 100° C., from about 5° C. to about 40° C., or from about 15° C. to about 40° C.). Transporting the 3D object can comprise packaging and/or labeling the 3D object. In some cases the 3D object can be transported directly to a consumer.

Systems and methods presented herein can facilitate formation of custom or stock 3D objects for a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form of a stereo lithography (STL) file. The customer can provide a design where the design can be a definition of the shape and dimensions of the 3D object in any other numerical or physical form. In some cases, the customer can provide a 3D model, sketch, or image as a design of an object to be generated. The design can be transformed in to instructions usable by the printing system to additively generate the 3D object. The customer can provide a request to form the 3D object from a specific material or group of materials (e.g., a material as described herein). In some cases, the design may not contain auxiliary features or marks of any past presence of auxiliary support features.

In response to the customer request the 3D object can be formed or generated with the printing method, system and/or apparatus as described herein. In some cases, the 3D object can be formed by an additive 3D printing process. Additively generating the 3D object can comprise successively depositing and melting a powder comprising one or more materials as specified by the customer. The 3D object can subsequently be delivered to the customer. The 3D object can be formed without generation or removal of auxiliary features (e.g., that is indicative of a presence or removal of the auxiliary support feature). Auxiliary features can be support features that prevent a 3D object from shifting, deforming or moving during formation.

The 3D object (e.g., solidified material) that is generated for the customer can have an average deviation value from the intended dimensions of at most about 0.5 microns (μm), 1 μm, 3 μm, 10 μm, 30 μm, 100 μm, 300 μm, or less. The deviation can be any value between the aforementioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $Dv+L/K_{Dv}$, wherein Dv is a deviation value, L is the length of the 3D object in a specific direction, and $K_{Dv}$ is a constant. Dv can have a value of at most about 300 μm, 200 μm, 100 μm, 50 μm, 40 μm, 30 μm, 20 m, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, or 300 μm. Dv can have any value between the aforementioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the aforementioned values (e.g., from about 3000 to about 500, from about 1000 to about 2500, from about 500 to about 2000, from about 1000 to about 3000, or from about 1000 to about 2500).

The intended dimensions can be derived from a model design. The 3D part can have the stated accuracy value immediately after its formation, without additional processing or manipulation. Receiving the order for the object, formation of the object, and delivery of the object to the customer can take at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. In some cases, the 3D object can be additively generated in a period between any of the aforementioned time periods (e.g., from about 10 seconds to about 7 days, from about 10 seconds to about 12 hours, from about 12 hours to about 7 days, or from about 12 hours to about 10 minutes). The time can vary based on the physical characteristics of the object, including the size and/or complexity of the object.

While some methods, apparatuses and/or systems provided herein have been described in the context of powders, such methods and systems may be applied in other contexts. For example, methods and systems of the present disclosure may be used in fused deposition modeling (FDM), which can be used to additively generate a 3D object by laying down material in layers. In FDM, a plastic filament or metal wire, for example, may be unwound from a coil and supplies material to produce the 3D object. As an alternative, methods and systems of the present disclosure may be used in stereolithography (SLA), which may be used to additively generate the 3D object one layer at a time, for example, by curing a photo-reactive resin with a UV laser or another similar power source. As another alternative, methods and systems of the present disclosure may be used in poly-jet printing, which may be used to additively generate the 3D object by providing liquids through one or more jetting heads along a pattern. The liquids may be photopolymers, which may be cured by an ultraviolet (UV) lamp.

While some methods, apparatuses and/or systems provided herein have been described in the context of additive formation of 3D objects, such methods and systems may be used with subtractive formation of 3D objects. The subtractive formation of a 3D object may include machining, etching, fluid jetting (e.g., water jetting), and/or laser cutting. Additive and subtractive approaches may be used separately or in combination with one another.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A system for printing one or more three-dimensional (3D) objects, the system comprising:

an enclosure configured to enclose an atmosphere, the enclosure configured to enclose the one or more 3D objects during the printing in the enclosure, wherein during the printing of the one or more 3D objects in the enclosure, the enclosure has (a) a fixed volume and/or (b) a sidewall that is vertically stationary;

a platform configured to support a material bed from which the one or more 3D objects are printed during the printing, the platform being disposed in the enclosure;

an energy source disposed adjacent to the enclosure, the energy source configured to generate an energy beam projected through the atmosphere of the enclosure during the printing, the energy beam being configured to transform at least a portion of the material bed to print the one or more 3D objects;

an optical window disposed in a wall of the enclosure opposing the platform, the optical window configured to facilitate traversal of the energy beam from the energy source into the enclosure during the printing;

at least one sensor configured to sense the energy beam during the printing to generate sensor signals, the sensor being disposed in or adjacent to the enclosure; and at least one processor operatively coupled to the at least one sensor, the at least one processor being configured to process the sensor signals to (i) identify an alteration in the energy beam with respect to the generated energy beam, the alteration comprising an energy density alteration, and (ii) based at least in part on the alteration in the energy beam, generate a result utilized to indicate a detectable change in cleanliness in the enclosure during the printing, the detectable change in the cleanliness being of the atmosphere of the enclosure, wherein the result is generated based at least in part on sensing the energy beam across a portion of the atmosphere within the enclosure.

2. The system of claim 1, wherein the at least one processor is configured to, during the printing, direct the energy source to project the energy beam to transform at least the portion of the material bed to generate a transformed material as at least the portion of the one or more 3D objects; and optionally wherein the at least one processor is configured to use the result to adjust at least one characteristic of the energy beam to affect transformation of the at least the portion of the material bed to generate the one or more 3D objects.

3. The system of claim 1, wherein the at least one processor is configured to process the sensor signals at a time comprising subsequent to printing a layer of material during the printing, the layer of the material being of the one or more 3D objects.

4. The system of claim 1, wherein the at least one processor is configured to generate the result indicative of the detectable change in the cleanliness of the atmosphere in real time during the printing of the one or more 3D objects.

5. The system of claim 1, wherein the at least one processor is configured to use the detectable change in the cleanliness of the atmosphere to determine an initiation of an atmosphere cleaning procedure.

6. The system of claim 5, wherein the atmosphere cleaning procedure comprises (a) purging the atmosphere, (b) irradiating the atmosphere, (c) physically removing debris from the atmosphere or (d) chemically removing the debris from the atmosphere, the debris being generated during the printing, the debris being disposed in the atmosphere.

7. The system of claim 1, wherein the at least one processor is configured to use the detectable change in the cleanliness of the atmosphere to alter at least one characteristic of the energy beam, the at least one characteristic comprising a footprint of the energy beam, a focus parameter of the energy beam, a pulsing sequence of the energy beam, or a rate of movement of the energy beam.

8. The system of claim 7, wherein the at least one processor is configured to use the detectable change in the cleanliness of the atmosphere to alter at least one characteristic of the energy beam, the at least one characteristic comprising the footprint of the energy beam on an exposed surface of the material bed.

9. The system of claim 7, wherein the at least one processor is configured to use the detectable change in the cleanliness of the atmosphere to alter at least one characteristic of the energy beam, the at least one characteristic comprising alteration in a traversal direction of the energy beam during the printing.

10. The system of claim 1, wherein the cleanliness is a first cleanliness; and wherein the at least one processor is configured to (a) operatively coupled to at least one mechanism of a 3D printer and to one or more detectors configured to detect a second cleanliness of the optical window; and (b) receive signals from the one or more detectors to generate an assessment; and (c) direct the at least one mechanism to alter at least one function based at least in part on the assessment, the at least one mechanism comprising the platform, the energy source, and the enclosure.

11. The system of claim 10, wherein the detectable change is a first detectable change; and wherein the at least one processor is configured to use a second detectable change in the cleanliness of the optical window to adjust at least one characteristic of the energy beam.

12. The system of claim 11, wherein the at least one characteristic comprises a footprint of the energy beam, a focus parameter of the energy beam, a pulsing sequence of the energy beam, or a rate of movement of the energy beam.

13. The system of claim 1, wherein the at least one processor is programmed to monitor cleanliness of the optical window during the printing of the one or more 3D objects; and optionally wherein monitoring the cleanliness of the optical window is executed in intervals.

14. The system of claim 1, wherein the at least one sensor is configured to sense signals reflected from an exposed surface of the material bed.

15. The system of claim 1, wherein the at least one sensor is configured to facilitate isolation of non-specular reflection from an exposed surface of the material bed.

16. The system of claim 1, wherein the at least one sensor comprises a spectrum analyzer or a beam profiler.

17. The system of claim 1, wherein the at least one sensor comprises an optical sensor; and optionally wherein the at least one sensor comprises an optical fiber.

18. An apparatus for the printing of the one or more 3D objects, the apparatus comprising: a control system configured to (a) operatively couple to electricity and to the system of claim 1; and (b) execute, or direct execution of, one or more operations associated with the system to print the one or more 3D objects; and optionally wherein the control system comprises the at least one processor.

* * * * *